US011290957B2

(12) United States Patent
Lin et al.

(10) Patent No.: US 11,290,957 B2
(45) Date of Patent: Mar. 29, 2022

(54) SEQUENCE DESIGN OF WAKE-UP SIGNALS AND RESYNCHRONIZATION SEQUENCE

(71) Applicant: Samsung Electronics Co., Ltd, Suwon-si (KR)

(72) Inventors: Qiongjie Lin, Mountain View, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/171,316

(22) Filed: Oct. 25, 2018

(65) Prior Publication Data

US 2019/0159128 A1 May 23, 2019

Related U.S. Application Data

(60) Provisional application No. 62/670,355, filed on May 11, 2018, provisional application No. 62/669,755, (Continued)

(51) Int. Cl.
*H04W 52/02* (2009.01)
*H04W 4/70* (2018.01)
(Continued)

(52) U.S. Cl.
CPC ......... *H04W 52/0229* (2013.01); *H04W 4/70* (2018.02); *H04W 68/02* (2013.01); *H04W 76/28* (2018.02)

(58) Field of Classification Search
CPC . H04W 52/0229; H04W 76/28; H04W 68/02; H04W 4/70; H04W 68/00; H04L 5/0048; H04L 5/0023
See application file for complete search history.

(56) References Cited

U.S. PATENT DOCUMENTS

2010/0135316 A1* 6/2010 Atungsiri ............ H04L 27/2613
370/436
2011/0237267 A1* 9/2011 Chen ..................... H04J 11/003
455/450
(Continued)

FOREIGN PATENT DOCUMENTS

WO 2017/018966 A1 2/2017
WO 2017/054134 A1 4/2017

OTHER PUBLICATIONS

3GPP TS 36.211 version 14.4.0 (Oct. 2017) (Year: 2017).*
(Continued)

*Primary Examiner* — Un C Cho
*Assistant Examiner* — Yu-Wen Chang

(57) ABSTRACT

A method of a base station (BS) in a wireless communication system is provided. The method comprises identifying a first configuration including a first set of resources for a first type of user equipment (UE) and a second configuration including a second set of resources for a second type of UE, generating a first sequence and a second sequence based on (i) the first set of resources and the second set of resources, respectively, and (ii) a physical cell identifier (PCID), generating, using the first sequence, a first signal to be transmitted to the first type of UE in the first set of resources, generating, using the second sequence, a second signal to be transmitted to the second type of UE in the second set of resources, transmitting, to the first type of UE, the first signal, and transmitting, to the second type of UE, the second signal.

20 Claims, 12 Drawing Sheets

Related U.S. Application Data filed on May 10, 2018, provisional application No. 62/653,849, filed on Apr. 6, 2018, provisional application No. 62/642,880, filed on Mar. 14, 2018, provisional application No. 62/710,368, filed on Feb. 16, 2018, provisional application No. 62/630,954, filed on Feb. 15, 2018, provisional application No. 62/628,499, filed on Feb. 9, 2018, provisional application No. 62/587,963, filed on Nov. 17, 2017.

(51) Int. Cl.
*H04W 68/02* (2009.01)
*H04W 76/28* (2018.01)

(56) References Cited

U.S. PATENT DOCUMENTS

| | | | | |
|---|---|---|---|---|
| 2015/0078348 | A1* | 3/2015 | Han | H04B 7/2643 370/336 |
| 2016/0127918 | A1* | 5/2016 | Yi | H04W 84/047 370/329 |
| 2016/0249355 | A1* | 8/2016 | Chae | H04L 5/0091 |
| 2017/0223649 | A1* | 8/2017 | Ko | H04L 27/2601 |
| 2017/0237584 | A1 | 8/2017 | Yan et al. | |
| 2017/0265156 | A1 | 9/2017 | Xue et al. | |
| 2017/0273078 | A1* | 9/2017 | Rico Alvarino | H04W 68/00 |
| 2017/0289935 | A1 | 10/2017 | Yoon | |
| 2018/0270756 | A1* | 9/2018 | Bhattad | H04W 52/0216 |
| 2018/0316464 | A1* | 11/2018 | Stern-Berkowitz | H04L 1/1657 |
| 2018/0351724 | A1* | 12/2018 | Wang | H04L 5/0053 |
| 2019/0044761 | A1* | 2/2019 | Kwak | H04L 9/06 |
| 2019/0090193 | A1* | 3/2019 | Liu | H04W 52/028 |
| 2019/0349884 | A1* | 11/2019 | Ji | H04W 52/0229 |
| 2020/0029302 | A1* | 1/2020 | Cox | H04W 52/0216 |
| 2020/0245303 | A1* | 7/2020 | Hwang | H04W 72/04 |
| 2020/0383084 | A1* | 12/2020 | Kim | H04W 68/02 |

OTHER PUBLICATIONS

62559356,Specification,Sep. 15, 2017 (Year: 2017).*
62585430,Specification,Nov. 13, 2017 (Year: 2017).*
62567022_SPEC_2017-10-02_Entiredocument (Year: 2017).*
62480556,Specification (Year: 2017).*
62475986,Specification (Year: 2017).*
62562504,Specification (Year: 2017).*

Intel Corporation, "Design of synchronization signals and system information for TDD support in feNB-IoT", 3GPP TSG RAN WG1 Meeting #90bis, Oct. 9-13, 2017, 7 pages, R1-1717347.
Notification of Transmittal of the International Search Report and the Written Opinion of the International Searching Authority, or the Declaration dated Mar. 12, 2019 in connection with International Patent Application No. PCT/KR2018/014234, 10 pages.
3rd Generation Partnership Project; Technical Specification Group Radio Access Network; Evolved Universal Terrestrial Radio Access (E-UTRA); Physical channels and modulation; 3GPP TS 36.211 V13.2.0 (Jun. 2016)—168 Pages.
3rd Generation Partnership Project; Technical Specification Group Radio Access Network; Evolved Universal Terrestrial Radio Access (E-UTRA); Multiplexing and channel coding; 3GPP TS 36.212 V13.2.0 (Jun. 2016)—140 Pages.
3rd Generation Partnership Project; Technical Specification Group Radio Access Network; Evolved Universal Terrestrial Radio Access (E-UTRA); Physical layer procedures; 3GPP TS 36.213 V13.2.0 (Jun. 2016)—381 Pages.
3rd Generation Partnership Project; Technical Specification Group Radio Access Network; Evolved Universal Terrestrial Radio Access (E-UTRA); Medium Access Control (MAC) protocol specification; 3GPP TS 36.321 V13.2.0 (Jun. 2016)—91 Pages.
3rd Generation Partnership Project; Technical Specification Group Radio Access Network; Evolved Universal Terrestrial Radio Access (E-UTRA); Radio Resource Control (RRC); Protocol specification—3GPP TS 36.331 V13.2.0 (Jun. 2016)—623 Pages.
LTE; Evolved Universal terrestrial radio access (e-UTRA); User Equipment (UE) procedures in idle mode (3GPP TS 36.304 v13 2.0, Release 13) (Aug. 2016)—48 Pages.
LG Electronics, "Design of power saving signal/channel", 3GPP TSG RAN WG1 Meeting 90bis, Oct. 9-13, 2017, R1-1717274, 9 pages.
Intel Corporation, "Power saving signal for efeMTC", 3GPP TSG RAN WG1 Meeting #90bis, Oct. 9-13, 2017, R1-1717340, 9 pages.
Qualcomm Incorporated, "Wake-up signal design", 3GPP TSG RAN WG1 Meeting #90bis, Oct. 9-13, 2017, R1-1718142, 13 pages.
Supplementary Partial European Search Report dated Nov. 17, 2020 in connection with European Patent Application No. 18 87 8047, 16 pages.
Ericsson, "Downlink channel power efficiency for MTC", 3GPP TSG-RAN WG1 Meeting #90bis, Oct. 9-13, 2017, R1-1716997, 16 pages.
Supplementary European Search Report dated Feb. 23, 2021 in connection with European Patent Application No. 18 87 8047, 19 pages.

* cited by examiner

SEQUENCE DESIGN OF WAKE-UP SIGNALS AND RESYNCHRONIZATION SEQUENCE

CROSS-REFERENCE TO RELATED APPLICATION(S) AND CLAIM OF PRIORITY

The present application claims priority to:
U.S. Provisional Patent Application Ser. No. 62/587,963, filed on Nov. 17, 2017;
U.S. Provisional Patent Application Ser. No. 62/628,499, filed on Feb. 9, 2018;
U.S. Provisional Patent Application Ser. No. 62/630,954, filed on Feb. 15, 2018;
U.S. Provisional Patent Application Ser. No. 62/710,368, filed on Feb. 16, 2018;
U.S. Provisional Patent Application Ser. No. 62/642,880, filed on Mar. 14, 2018;
U.S. Provisional Patent Application Ser. No. 62/653,849, filed on Apr. 6, 2018;
U.S. Provisional Patent Application Ser. No. 62/669,755, filed on May 10, 2018; and
U.S. Provisional Patent Application Ser. No. 62/670,355, filed on May 11, 2018.
The content of the above-identified patent documents are incorporated herein by reference.

TECHNICAL FIELD

The present application relates generally to sequence design. More specifically, this disclosure relates to sequence design of wake up signals and the resynchronization sequence for MTC.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide a sequence design of wake-up signals and resynchronization sequence.

In one embodiment, a user equipment (UE) in a wireless communication system, the UE comprises a processor configured to identify a set of resources configured for the UE on a physical cell identifier (PCID), wherein the identified set of resources is one of a first set of resources configured for a first type of UE or a second set of resources configured for a second type of UE, and wherein the UE is one of the first type of UE or the second type of UE. The UE further comprises a transceiver operably connected to the processor, the transceiver configured to receive a signal over a downlink channel based on the identified set of resources. The processor is further configured to identify a sequence based on the identified set of resources and the PCID, and detect information carried by the received signal based on the identified sequence, wherein the identified sequence is one of a first sequence generated based on the first set of resources and the PCID, or a second sequence generated based on the second set of resources and the PCID.

In another embodiment, a base station (BS) in a wireless communication system is provided. The BS comprises a processor configured to identify a first configuration including a first set of resources for a first type of user equipment (UE) and a second configuration including a second set of resources for a second type of UE, generate a first sequence and a second sequence based on (i) the first set of resources and the second set of resources, respectively, and (ii) a physical cell identifier (PCID), generate, using the first sequence, a first signal to be transmitted to the first type of UE in the first set of resources, and generate, using the second sequence, a second signal to be transmitted to the second type of UE in the second set of resources. The BS further comprises a transceiver operably connected to the processor, the transceiver configured to transmit, to the first type of UE, the first signal over a first downlink channel, and transmit, to the second type of UE, the second signal over a second downlink channel.

In yet another embodiment, a method of a base station (BS) in a wireless communication system is provided. The method comprises identifying a first configuration including a first set of resources for a first type of user equipment (UE) and a second configuration including a second set of resources for a second type of UE, generating a first sequence and a second sequence based on (i) the first set of resources and the second set of resources, respectively, and (ii) a physical cell identifier (PCID), generating, using the first sequence, a first signal to be transmitted to the first type of UE in the first set of resources, generating, using the second sequence, a second signal to be transmitted to the second type of UE in the second set of resources, transmitting, to the first type of UE, the first signal over a first downlink channel, and transmitting, to the second type of UE, the second signal over a second downlink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" 3GPP TS 36.331 v13.2.0, "E-UTRA, Radio Resource Control (RRC) protocol specification;" and 3GPP TS 36.304 v13.2.0, "E-UTRA, User Equipment (UE) procedures in idle mode."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
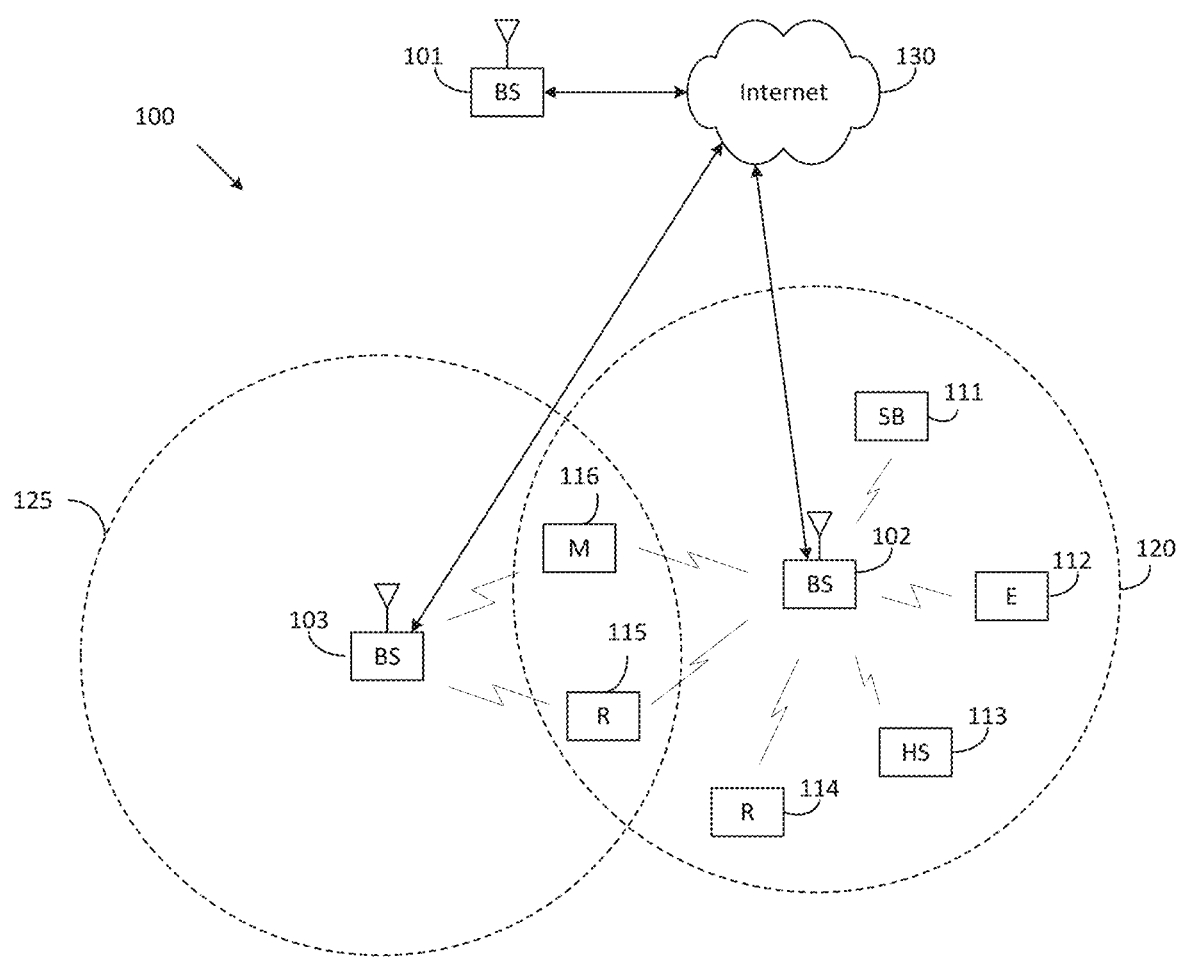
FIG. 1 illustrates an example wireless network according to embodiments of the present disclosure.
Figure 2:
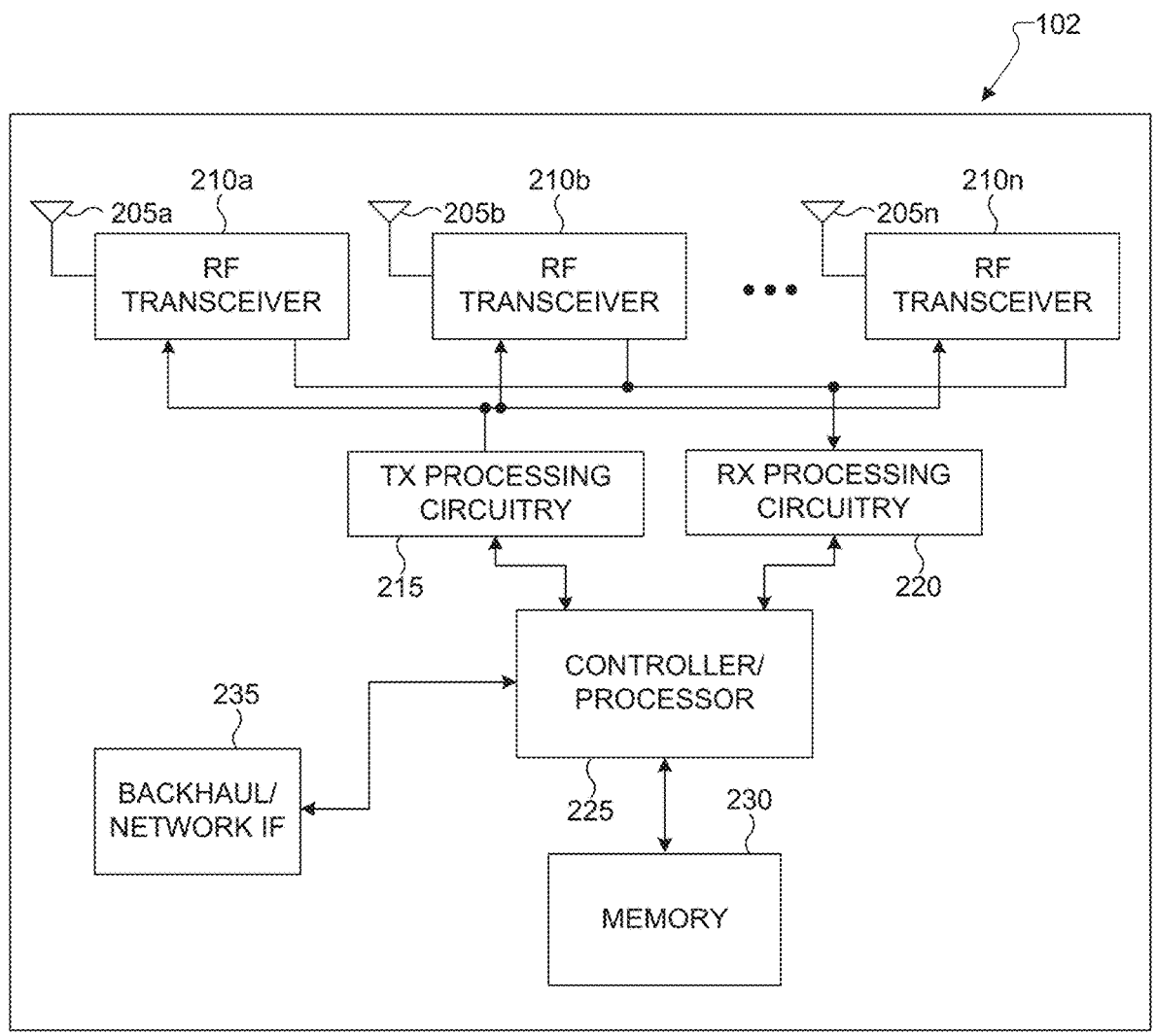
FIG. 2 illustrates an example eNB according to embodiments of the present disclosure.
Figure 3:
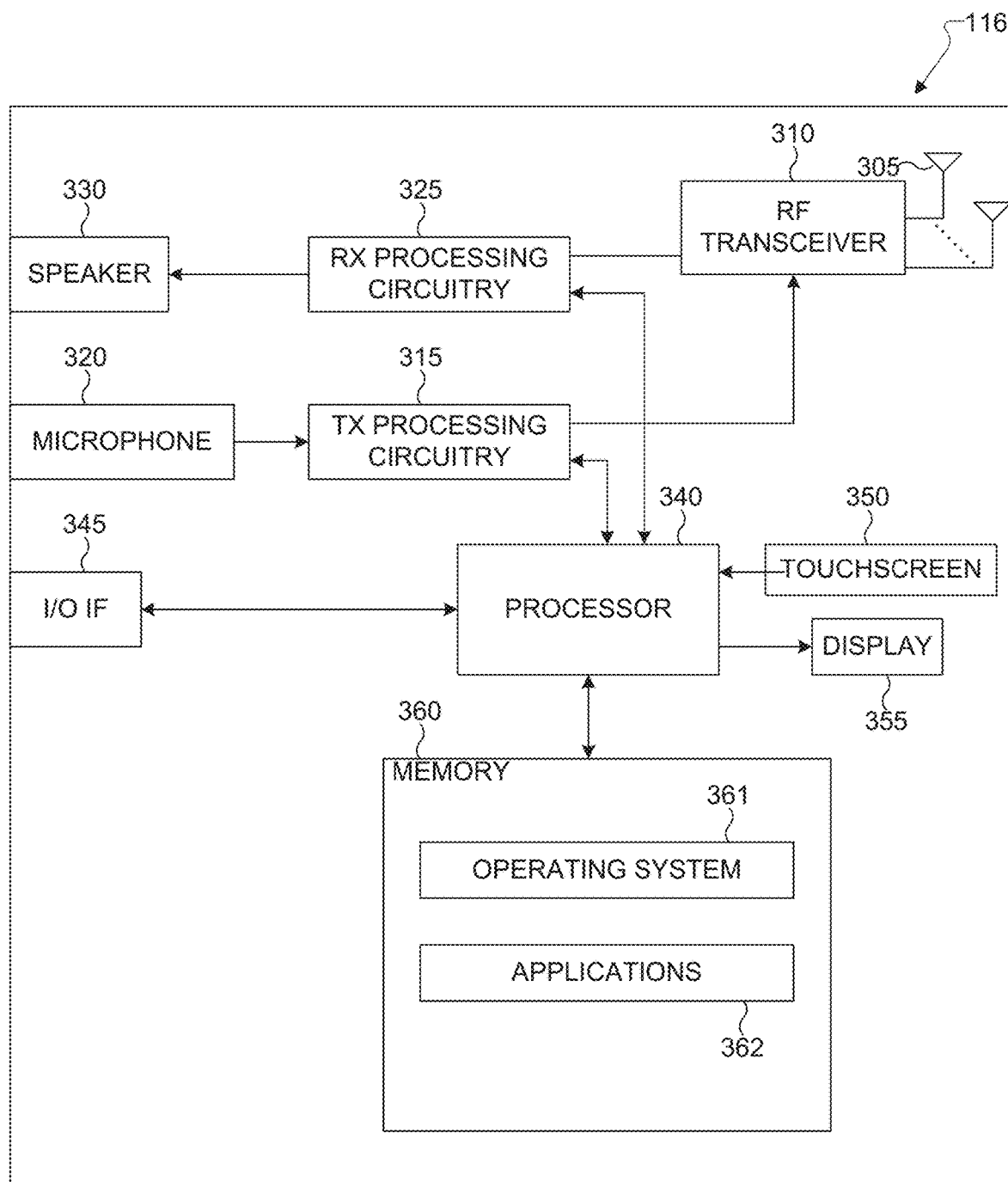
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNB s, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient wake up signal design for NB-IoT. In certain embodiments, and one or more of the eNBs 101-103 includes circuitry, programing, or a combination thereof, for efficient wake up signal design for NB-IoT.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
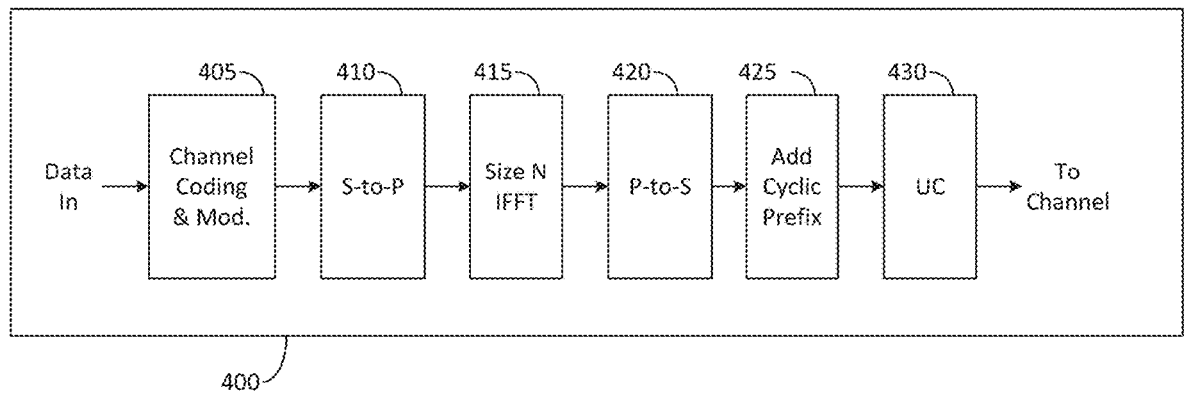
FIG. 4A illustrates a high-level diagram of an orthogonal frequency division multiple access transmit path according to embodiments of the present disclosure.
Figure 4B:
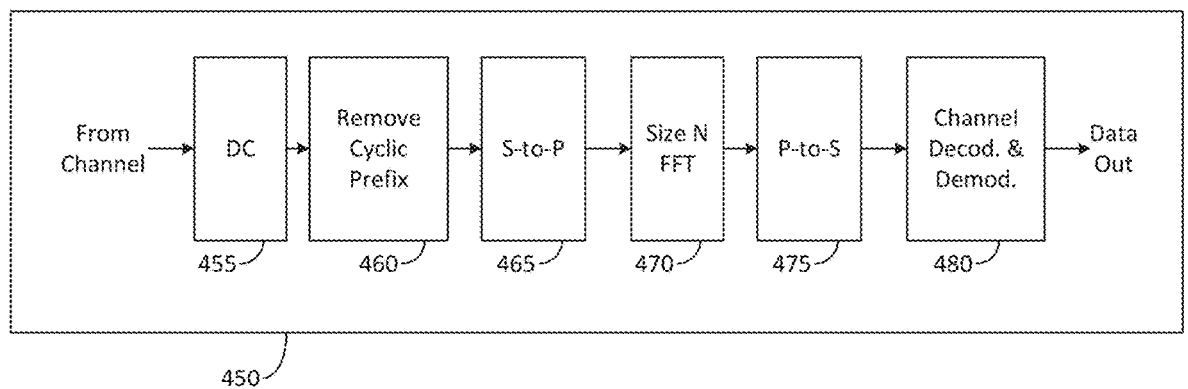
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 740 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BS s) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with special system nformation RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $NR_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_x^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$ where $N_{SRS}=1$ if a last subframe symbol is used to transmit SRS and $N_{SRS}=0$ otherwise.

Figure 5:
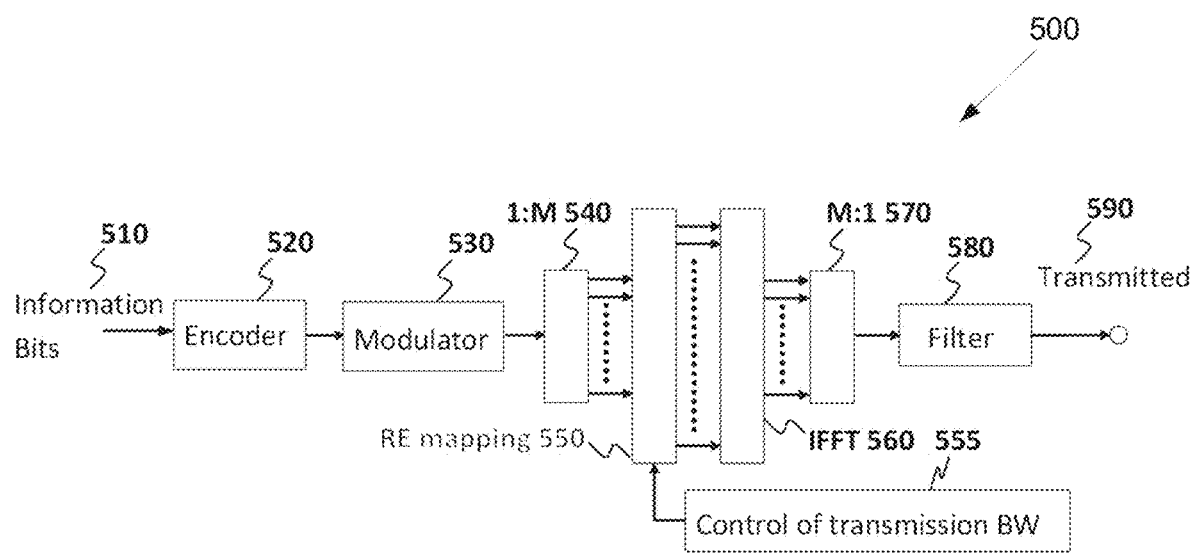
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
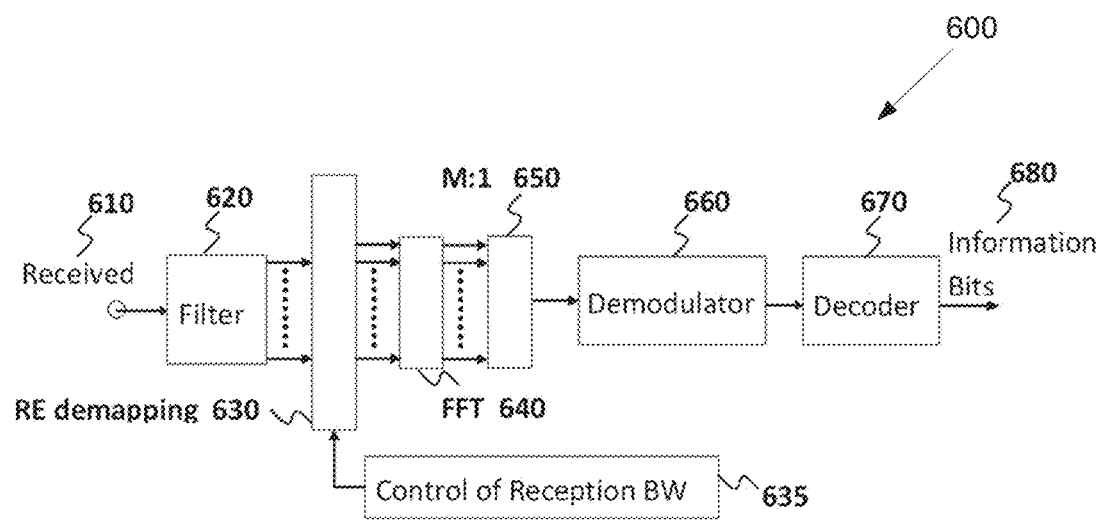
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
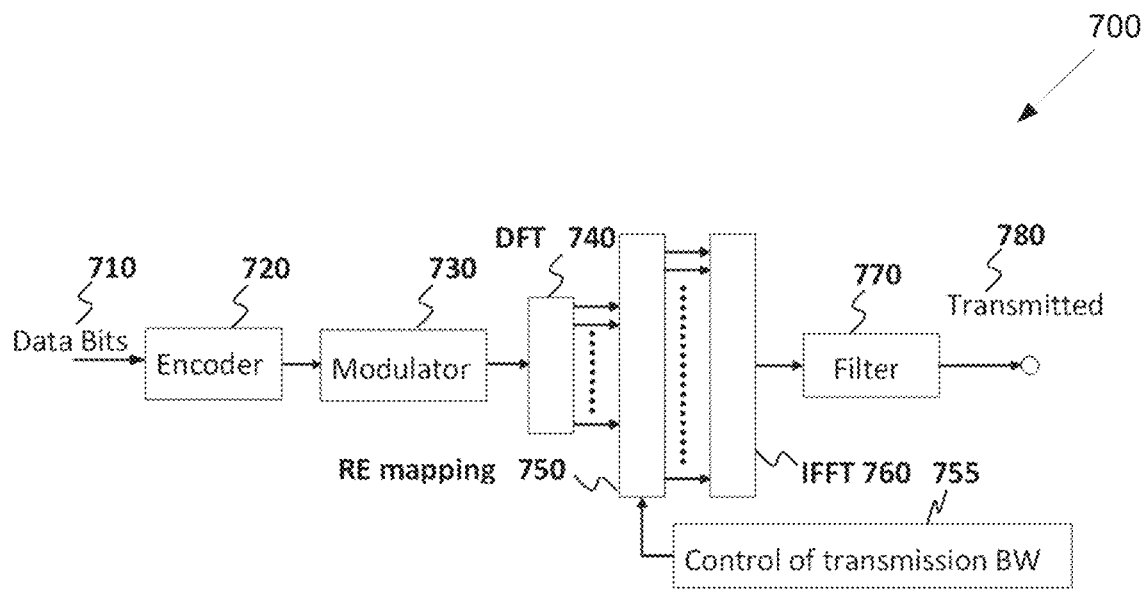
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
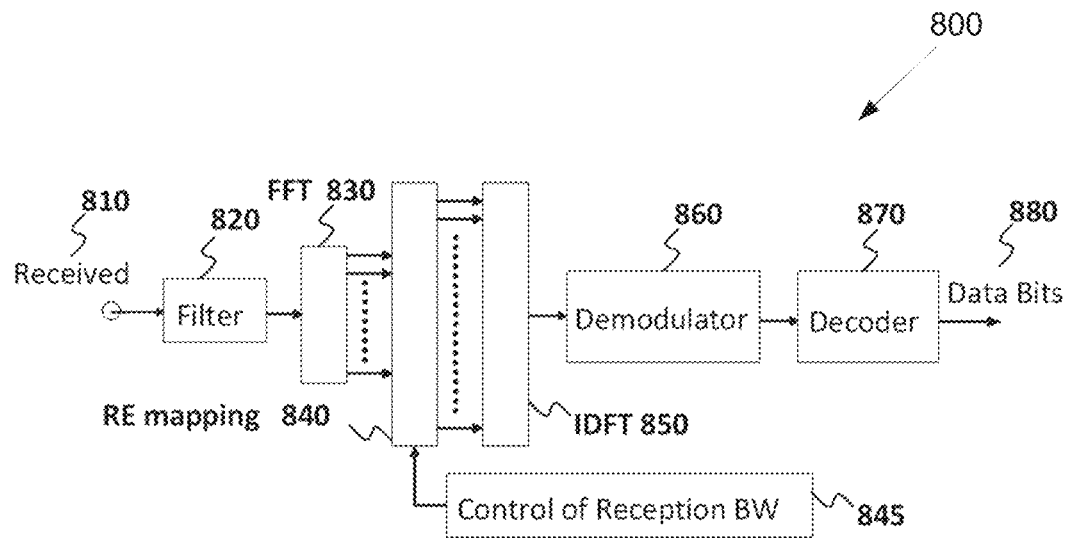
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Power consumption and battery life are very important for terminals in an internet of thing (IoT). In a narrowband IoT (NB-IoT) or an enhanced machine type communication (eMTC) system, the power of terminal devices can be saved by means of configuring a power saving mode (PSM) or an extended discontinuous reception (eDRX) mode. However, a UE is unable to listen paging messages during sleep in the PSM mode or the eDRX mode. In some IoT application scenarios, a UE is required to establish a connection with a network within a certain period of time after receiving a network command. Then the UE that has the requirement cannot be configured with the PSM mode or the eDRX mode that has a relatively long period.

In NB-IoT and an enhanced version of eMTC system, to enable a UE to be paged, and meanwhile to save power, a wake-up or sleep signal/channel is introduced after study and research. The wake-up signal/channel is configured to wake up a UE, i.e., a case where the UE needs to continue to monitor a subsequent MTC physical downlink control channel (MPDCCH) that is used to indicate a paging message. The sleep signal/channel is configured to instruct that a UE may enter into a sleep state, i.e., a case where the UE does not need to monitor a subsequent MPDCCH that is used to indicate a paging message.

In a multi-carrier system, a carrier that transmits a synchronization signal is called an anchor carrier, and in an LTE system, a paging signal is transmitted on an anchor carrier. In an NB-IoT system, a scheme for transmitting paging messages on non-anchor carriers is introduced. In the eMTC system, multiple narrowbands are defined, in which a narrowband has 6 physical resource blocks (PRBs), and the concept of paging narrowband is introduced. In addition, in the eMTC system, a downlink control channel for MTC, MPDCCH, is configured to indicate a paging message, and different UEs may monitor MPDCCHs on different narrowbands. Similarly, in an ongoing 5G new radio (NR) system, there is a situation where the bandwidth of a UE is smaller than a system bandwidth, and in this case, multiple bandwidth parts may be defined for a paging channel. For the case of multi-carrier or narrowbands or partial bandwidths, it is an issue yet to be solved that how to transmit and receive a wake-up or sleep signal.

The present disclosure discusses the sequence design for generating ware up signal for NB-IoT and MTC. The following designs are included in the present disclosure. In one example, ZC-sequence based WUS is included: without cover code; with N1-sequence as cover code; with Gold-sequence as cover code; and/or with cover code and/or phase shift. In one example, the design is included with cover code and/or cyclic shift M-sequence based WUS. In one example, gold-sequence based WUS is used for the design.

The present disclosure focuses on the design of sequences and mappings of wake up signal (WUS) for NB-IoT.

In the present disclosure, denote the UE group ID as N_ID^UEgroup, and range is $0 \leq N\_ID\hat{}UEgroup \leq N\_UEgroup-1$, where N_UEgroup can be 1 or 2 or 4, and denote the narrowband cell ID as N_ID^cell, and range is $0 \leq N\_ID\hat{}cell \leq 503$.

Component I: Design Aspects for WUS Sequences.

In some embodiments, the number of WUS sequences. The number of WUS sequences corresponds to the amount of information carried by the WUS sequence. For example, one WUS sequence corresponds to one piece of information or one combination of pieces of information carried by WUS.

In one embodiment, the information carried by WUS can be cell ID (i.e., N_ID^cell) or part of the cell ID information (e.g. ⌊N_ID^cell/a⌋, and/or N_ID^cell mod b, where a and b are predefined constants).

In another embodiment, the information carried by WUS can be UE group ID (i.e., N_ID^UEgroup) or part of the UE group ID (e.g. ⌊N_ID^UEgroup/c⌋, and/or N_ID^UEgroup mod d, where c and d are predefined constants).

In yet another embodiment, the information carried by WUS can be timing-related information (e.g. subframe index, or subframe index mod e, or SFN, or SFN mod f, where e and f are predefined constants).

In yet another embodiment, the information carried by WUS can be a combination of two or all from the above embodiments. For example, part of the cell ID and timing-related information, or the whole cell ID and timing-related information, or part of the cell ID and timing-related information and UE group ID, or part of the cell ID and UE group ID.

In some embodiments, WUS sequence generation scheme and mapping scheme. These two design aspects are closely related.

In one embodiment, the sequence is generated and mapped per subframe, and same sequence is repeated across multiple subframes, wherein the base sequence to generate the WUS is short (e.g. shorter than the number of available REs within a subframe).

In another embodiment, the sequence is generated and mapped per subframe wherein timing information is contained in the sequence, and subframe-specific sequence is mapped across multiple subframes, wherein the base sequence to generate the WUS is short (e.g. shorter than the number of available REs within a subframe). Note that there may be repeated sequences if the number of sequences in term of timing information is smaller than the number of subframes to be mapped to.

In yet another embodiment, the sequence is generated and mapped for multiple subframes, wherein the base sequence to generate the WUS is long (e.g. longer than the number of available REs within a subframe).

In some embodiments, WUS sequence type is related to the generation scheme and mapping scheme of WUS.

In one embodiment, WUS sequence is based on ZC-sequence, wherein different root and/or phase shift and/or cyclic shift of the ZC sequence is utilized to represent the information carried by WUS. In such embodiment, a possible variant of this embodiment is, WUS sequence is based on ZC-sequence with a cover code (e.g. M-sequence or Gold-sequence or other sequence with good orthogonality), wherein different root and/or phase shift and/or cyclic shift of the ZC sequence as well as the cover code are utilized to represent the information carried by WUS.

In yet another embodiment, WUS sequence is based on M-sequence, wherein different cyclic shift or initial condition of the M-sequence is utilized to represent the information carried by WUS. In such embodiment, a possible variant of this embodiment is, WUS sequence is based on M-sequence with a cover code (e.g. M-sequence or Gold-sequence), wherein cyclic shift or initial condition of the M-sequence as well as the cover code are utilized to represent the information carried by WUS.

In yet another embodiment, WUS sequence is based on Gold-sequence, wherein different cyclic shift or initial condition of both of the M-sequences generating the Gold-sequence is utilized to represent the information carried by WUS. In such embodiment, a possible variant of this embodiment is, WUS sequence is based on Gold-sequence with a cover code (e.g. M-sequence or Gold-sequence), wherein cyclic shift or initial condition of both of the M-sequences generating the Gold-sequence as well as the cover code are utilized to represent the information carried by WUS.

Component II: ZC-Sequence based WUS

Component II.A: ZC-sequence based WUS without cover code

In this component, the number of WUS sequences is limited by the ZC-sequence length. For example, if the length of ZC-sequence is 131, at most 131 WUS sequences are supported. For another example, if the length of ZC-sequence is 127, at most 127 WUS sequences are supported.

The WUS can be constructed from length-L_ZC ZC-sequence, where different root of the ZC-sequence is utilized to represent the information carried by WUS. The sequence can be mapped in the frequency domain to the REs for WUS with potential truncation or extension (e.g. N_RE^WUS=132 for 11 symbols within one subframe) in a frequency first and time second order.

L_ZC is determined by the sequence generation scheme and mapping scheme. For example, if WUS sequence is generated and mapped per subframe, L_ZC can be 131 or 133 or 127. For another example, if WUS sequence is generated and mapped across subframes, L_ZC can be 263 or 397.

In particular, the WUS is constructed as given by d_WUS(n)=exp(−jπun'(n'+1)/L_ZC) where n=0, 1, . . . , N_RE^WUS−1, and n'=n mod L_ZC.

The mapping of root index u to the information carried by the WUS (e.g. I_info^WUS) can be according to u=I_info^WUS+1.

In one example, the information carried by WUS is cell ID (i.e., N_ID^cell) or part of the cell ID.

For one sub-example, I_info^WUS=N_ID^cell, for L_ZC>N_ID^cell−1.

For another sub-example, I_info^WUS=b*(N_ID^cell mod a), where a and b are predefined constants: (1) L_ZC=131 or 127, a=21 (single-ring cell planning with 21 cells), and b=1 (to minimize the range of roots); (2) L_ZC=131 or 127, a=21 (single-ring cell planning with 21 cells), and b=6 (to maximize the range of roots); (3) L_ZC=131 or 127, a=57 (double-ring cell planning with 57 cells), and b=1 (to minimize the range of roots); (4) L_ZC=131 or 127, a=57 (single-ring cell planning with 57 cells), and b=2 (to maximize the range of roots); (5) L_ZC=131, a=131 (using the maximum number of sequences), and b=1 (only choice to be compatible with a); and (6) L_ZC=127, a=127 (using the maximum number of sequences), and b=1 (only choice to be compatible with a).

For yet another sub-example, I_info^WUS=b*(⌊N_ID^cell/a⌋), where a and b are predefined constants: (1) L_ZC=131 or 127, a=6 (single-ring cell planning with 21 cells), and b=1 (to minimize the range of roots) (2) L_ZC=131 or 127, a=6 (single-ring cell planning with 21 cells), and b=6 (to maximize the range of roots); (3) L_ZC=131 or 127, a=2 (double-ring cell planning with 57 cells), and b=1 (to minimize the range of roots); (4) L_ZC=131 or 127, a=2 (single-ring cell planning with 57 cells), and b=2 (to maximize the range of roots); (5) L_ZC=131, a=131 (using the maximum number of sequences), and b=1 (only choice to be compatible with a); and (6) L_ZC=127, a=127 (using the maximum number of sequences), and b=1 (only choice to be compatible with a).

For yet another sub-example, I_info^WUS=b*(⌊N_ID^cell/a⌋), where a and b are predefined constants: (1) L_ZC=131 or 127, a=6 (single-ring cell planning with 21 cells), and b=1 (to minimize the range of roots) (2) L_ZC=131 or 127, a=6 (single-ring cell planning with 21 cells), and b=6 (to maximize the range of roots); (3) L_ZC=131 or 127, a=2 (double-ring cell planning with 57 cells), and b=1 (to minimize the range of roots); (4) L_ZC=131 or 127, a=2 (single-ring cell planning with 57 cells), and b=2 (to maximize the range of roots); (5) L_ZC=131, a=4 (using the maximum number of sequences), and b=1 (only choice to be compatible with a); and (6) L_ZC=127, a=4 (using the maximum number of sequences), and b=1 (only choice to be compatible with a).

In another example, the information carried by WUS is cell ID (or part of cell ID) and timing information (0≤I_t≤N_t). E.g. I_t=n_subframe mod N_t, where N_t is total number of timing indices and can be 2 or 4 or 6 or 8. For one sub-example, I_info^WUS=N_t*(N_ID^cell mod ⌊(L−1)/N_t⌋)+I_t. For another sub-example, I_info^WUS=c*(N_ID^cell mod b)*(I_t+1)+I_t, where b and c are predefined constants. Note that there is a product term of timing info and cell ID to avoid coherent combining of interference from neighboring cells.

In yet another example, the information carried by WUS is cell ID (or part of cell ID) and UE group ID (or part of UE group ID). For one sub-example, I_info^WUS=N_UEgroup* (N_ID^cell mod ⌊(L−1)/N_UEgroup⌋)+N_ID^UEgroup. For another sub-example, I_info^WUS=N_ID^UEgroup*(⌊(L−1)/N_UEgroup⌋)+N_ID^cell mod ⌊(L−1)/N_UEgroup⌋.

In yet another example, the information carried by WUS is cell ID (or part of cell ID) and UE group ID (or part of UE group ID) and timing info. For one sub-example, $I\_info^{\wedge}WUS=N\_t*(N\_UEgroup*N\_ID^{\wedge}cell+N\_ID^{\wedge}UEgroup \mod \lfloor(L-1)/N\_t\rfloor)+I\_t$. For another sub-example, $I\_info^{\wedge}WUS=c*(N\_UEgroup*N\_ID^{\wedge}cell+N\_ID^{\wedge}UEgroup \mod b)*(I\_t+1)+I\_t$, where b and c are predefined constants. Note that there is a product term of timing info and cell ID to avoid coherent combining of interference from neighboring cells.

Component II.B: ZC-Sequence Based WUS with M-Sequence Cover Cod

In this component, the number of WUS sequences is limited by the product of ZC-sequence length and M-sequence length. For example, if the length of ZC-sequence is 131 and the length of M-sequence is 127, at most 131*127 WUS sequences are supported. For another example, if the length of ZC-sequence and M-sequence are both 127, at most $12^2$ WUS sequences are supported.

The WUS can be constructed from length-L_ZC ZC-sequence covered by a BPSK modulated length-L_M M-sequence, where different root of the ZC-sequence and cyclic shift (or initial condition) of the M-sequence are utilized jointly to represent the information carried by WUS. The sequence can be mapped in the frequency domain to the REs for WUS with potential truncation or extension (e.g. $N\_RE^{\wedge}WUS=132$ for 11 symbols within one subframe) in a frequency first and time second order.

L_ZC is determined by the sequence generation scheme and mapping scheme. For example, if WUS sequence is generated and mapped per subframe, L_ZC can be 131 or 133 or 127. For another example, if WUS sequence is generated and mapped across subframes, L_ZC can be 263 or 397.

L_M is also determined by the sequence generation scheme and mapping scheme. For example, if WUS sequence is generated and mapped per subframe, L_M can be 127. For another example, if WUS sequence is generated and mapped across subframes, L_M can be 255 or 511. In one example, the choice of L_ZC and L_M can be the same. For example, if WUS sequence is generated and mapped per subframe, both L_ZC and L_M can be 127.

In particular, the WUS is constructed as given by $d\_WUS(n)=\exp(-j\pi un'(n'+1)/L\_ZC)*(1-2*d\_M((n''+c\_M) \mod L\_M))$ where $n=0, 1, \ldots, N\_RE\_WUS-1$, and $n'=n \mod L\_ZC$, and $n''=m \mod L\_M$.

The mapping of root index u to the information carried by the ZC-sequence part (i.e., $I\_info^{\wedge}ZC$) can be according to $u=I\_info^{\wedge}ZC+1$; and the mapping of the cyclic shift c_M (if using cyclic shift for carrying information, otherwise the mapping of root index is 0 and information is carried in initial condition) to the information carried by the M-sequence part (i.e., $I\_info^{\wedge}M$) can be according to $c\_M=I\_info^{\wedge}M$.

In one example, the information carried by WUS is cell ID (i.e., $N\_ID^{\wedge}cell$) or part of the cell ID. Then, the cell ID information can be separately carried by ZC-sequence and M-sequence.

For one sub-example, $I\_info^{\wedge}ZC=b*(N\_ID^{\wedge}cell \mod a)$, and $I\_info^{\wedge}M=c*\lfloor N\_ID^{\wedge}cell/a\rfloor$ where a, b, c are predefined constants: (1) L_ZC=131 or 127, L_Gold=127, a=21 (single-ring cell planning with 21 cells), b=1 and c=1 (to minimize the range of cyclic shifts); (2) L_ZC=131 or 127, L_Gold=127, a=21 (single-ring cell planning with 21 cells), b=6 and c=5 (to maximize the range of cyclic shifts); (3) L_ZC=131 or 127, L_Gold=127, a=57 (double-ring cell planning with 57 cells), b=1 and c=1 (to minimize the range of cyclic shifts); (4) L_ZC=131 or 127, L_Gold=127, a=57 (double-ring cell planning with 57 cells), b=2 and c=8 (to maximize the range of cyclic shifts); (5) L_ZC=131 or 127, L_Gold=127, a=127 (using the maximum number of sequences for one M-sequence), b=1 (only choice to be compatible with a) and c=1 (to minimize the range of cyclic shifts); and (6) L_ZC=131 or 127, L_Gold=127, a=127 (using the maximum number of sequences for one M-sequence), b=1 (only choice to be compatible with a) and c=126 (to maximize the range of cyclic shifts).

In another example, the information carried by WUS is cell ID (or part of cell ID) and timing information ($0\leq I\_t\leq N\_t$). E.g. $I\_t=n\_subframe \mod N\_t$, where N_t is total number of timing indices and can be 2 or 4 or 6 or 8. For one sub-example, only ZC-sequence carries part of the cell ID information, and M-sequence carries the remaining part of cell ID information carried by WUS (if there is any remaining) together with timing information. E.g. $I\_info^{\wedge}ZC=(N\_ID^{\wedge}cell \mod L)$, and $I\_info^{\wedge}M=c*I\_t$, where c is a constant and $c=\lfloor L\_M/N\_t\rfloor$ for example.

In yet another example, the information carried by WUS is cell ID (or part of cell ID) and UE group ID (or part of UE group ID). For one sub-example, only ZC-sequence carries part of the cell ID information, and M-sequence carries the remaining part of cell ID information carried by WUS (if there is any remaining) together with UE group ID: $I\_info^{\wedge}ZC=(N\_ID^{\wedge}cell \mod L)$, and $I\_info^{\wedge}M=c*N\_ID^{\wedge}UEgroup$, where c is a constant and $c=\lfloor L\_M/N\_UEgroup\rfloor$ for example.

In yet another example, the information carried by WUS is cell ID (or part of cell ID) and UE group ID (or part of UE group ID) and timing info. For one sub-example, only ZC-sequence carries part of the cell ID information, and M-sequence carries the remaining part of cell ID information carried by WUS (if there is any remaining) together with timing information and UE group ID: $I\_info^{\wedge}ZC=(N\_ID^{\wedge}cell \mod L)$, and $I\_info^{\wedge}M=c*N\_ID^{\wedge}UEgroup+I\_t$, where c is a constant and $c=\lfloor L\_M/N\_UEgroup\rfloor$ for example.

If L_M=127, the generation scheme (or equivalently the generating polynomial) for the M-sequence d_M(i) can be from one of the construction schemes in TABLE 1, with proper initial condition e.g. $d_M(0)=d_M(1)=d_M(2)=d_M(3)=d_M(4)=d_M(5)=0$, $d_M(6)=1$, or $d_M(1)=d_M(2)=d_M(3)=d_M(4)=d_M(5)=d_M(6)=0$, $d_M(0)=1$, if cyclic shift is utilized for indicating information (otherwise, the initial condition may carry the corresponding information).

In one example, the polynomial for generating the M-sequence can be $x^7+x+1$ for simplicity. In another example, the polynomial for generating the M-sequence can be $x^7+x^3+1$ for simplicity. In yet another example, the polynomial for generating the M-sequence can be $x^7+x^6+1$ for simplicity. In yet another example, the polynomial for generating the M-sequence can be $x^7+x^4+1$ for simplicity.

TABLE 1

The generation scheme for the M-sequence d_M(i)

| No. | Recursive construction scheme | Corresponding polynomial | Corresponding taps of register |
|---|---|---|---|
| 1 | $d_M(i + 7) = [d_M(i + 6) + d_M(i)]$ mod 2, $0 \leq i \leq 119$ | $x^7 + x^6 + 1$ | [1, 7] |
| 2 | $d_M(i + 7) = [d_M(i + 1) + d_M(i)]$ mod 2, $0 \leq i \leq 119$ | $x^7 + x + 1$ | [6, 7] |
| 3 | $d_M(i + 7) = [d_M(i + 4) + d_M(i)]$ mod 2, $0 \leq i \leq 119$ | $x^7 + x^4 + 1$ | [3, 7] |
| 4 | $d_M(i + 7) = [d_M(i + 3) + d_M(i)]$ mod 2, $0 \leq i \leq 119$ | $x^7 + x^3 + 1$ | [4, 7] |
| 5 | $d_M(i + 7) = [d_M(i + 6) + d_M(i + 5) + d_M(i + 4) + d_M(i)]$ mod 2, $0 \leq i \leq 119$ | $x^7 + x^6 + x^5 + x^4 + 1$ | [1, 2, 3, 7] |
| 6 | $d_M(i + 7) = [d_M(i + 3) + d_M(i + 2) + d_M(i + 1) + d_M(i)]$ mod 2, $0 \leq i \leq 119$ | $x^7 + x^3 + x^2 + x + 1$ | [4, 5, 6, 7] |
| 7 | $d_M(i + 7) = [d_M(i + 6) + d_M(i + 5) + d_M(i + 2) + d_M(i)]$ mod 2, $0 \leq i \leq 119$ | $x^7 + x^6 + x^5 + x^2 + 1$ | [1, 2, 5, 7] |
| 8 | $d_M(i + 7) = [d_M(i + 5) + d_M(i + 2) + d_M(i + 1) + d_M(i)]$ mod 2, $0 \leq i \leq 119$ | $x^7 + x^5 + x^2 + x + 1$ | [2, 5, 6, 7] |
| 9 | $d_M(i + 7) = [d_M(i + 5) + d_M(i + 4) + d_M(i + 3) + d_M(i)]$ mod 2, $0 \leq i \leq 119$ | $x^7 + x^5 + x^4 + x^3 + 1$ | [2, 3, 4, 7] |
| 10 | $d_M(i + 7) = [d_M(i + 4) + d_M(i + 3) + d_M(i + 2) + d_M(i)]$ mod 2, $0 \leq i \leq 119$ | $x^7 + x^4 + x^3 + x^2 + 1$ | [3, 4, 5, 7] |
| 11 | $d_M(i + 7) = [d_M(i + 6) + d_M(i + 4) + d_M(i + 2) + d_M(i)]$ mod 2, $0 \leq i \leq 119$ | $x^7 + x^6 + x^4 + x^2 + 1$ | [1, 3, 5, 7] |
| 12 | $d_M(i + 7) = [d_M(i + 5) + d_M(i + 3) + d_M(i + 1) + d_M(i)]$ mod 2, $0 \leq i \leq 119$ | $x^7 + x^5 + x^3 + x + 1$ | [2, 4, 6, 7] |
| 13 | $d_M(i + 7) = [d_M(i + 6) + d_M(i + 4) + d_M(i + 1) + d_M(i)]$ mod 2, $0 \leq i \leq 119$ | $x^7 + x^6 + x^4 + x + 1$ | [1, 3, 6, 7] |
| 14 | $d_M(i + 7) = [d_M(i + 6) + d_M(i + 3) + d_M(i + 1) + d_M(i)]$ mod 2, $0 \leq i \leq 119$ | $x^7 + x^6 + x^3 + x + 1$ | [1, 4, 6, 7] |
| 15 | $d_M(i + 7) = [d_M(i + 5) + d_M(i + 4) + d_M(i + 3) + d_M(i + 2) + d_M(i + 1) d_M(i)]$ mod 2, $0 \leq i \leq 119$ | $x^7 + x^5 + x^4 + x^3 + x^2 + x + 1$ | [2, 3, 4, 5, 6, 7] |
| 16 | $d_M(i + 7) = [d_M(i + 6) + d_M(i + 5) + d_M(i + 4) + d_M(i + 3) + d_M(i + 2) d_M(i)]$ mod 2, $0 \leq i \leq 119$ | $x^7 + x^6 + x^5 + x^4 + x^3 + x^2 + 1$ | [1, 2, 3, 4, 5, 7] |
| 17 | $d_M(i + 7) = [d_M(i + 6) + d_M(i + 5) + d_M(i + 3) + d_M(i + 2) + d_M(i + 1) d_M(i)]$ mod 2, $0 \leq i \leq 119$ | $x^7 + x^6 + x^5 + x^3 + x^2 + x + 1$ | [1, 2, 4, 5, 6, 7] |
| 18 | $d_M(i + 7) = [d_M(i + 6) + d_M(i + 5) + d_M(i + 4) + d_M(i + 2) + d_M(i + 1) d_M(i)]$ mod 2, $0 \leq i \leq 119$ | $x^7 + x^6 + x^5 + x^4 + x^2 + x + 1$ | [1.2, 3, 5, 6, 7] |

Component II.C: ZC-sequence based WUS with Gold-sequence cover code.

In this component, the number of WUS sequences is limited by the product of the ZC-sequence length and the square of the Gold-sequence length. For example, if the length of ZC-sequence is 131 and the length of Gold-sequence is 127, at most $131*127^2$ WUS sequences are supported. For another example, if the length of ZC-sequence and Gold-sequence are both 127, at most $127^3$ WUS sequences are supported.

The WUS can be constructed from length-L_ZC ZC sequence covered by a BPSK modulated length-L_Gold Gold-sequence (i.e., XOR of two M-sequences), where different root of the ZC-sequence and cyclic shift (or initial condition) of the two M-sequences generating the Gold-sequence are utilized jointly to represent the information carried by WUS. The sequence can be mapped in the frequency domain to the REs for WUS with potential truncation or extension (e.g. N_RE^WUS=132 for 11 symbols within one subframe) in a frequency first and time second order.

L_ZC is determined by the sequence generation scheme and mapping scheme. For example, if WUS sequence is generated and mapped per subframe, L_ZC can be 131 or 133 or 127. For another example, if WUS sequence is generated and mapped across subframes, L_ZC can be 263 or 397.

L_Gold is also determined by the sequence generation scheme and mapping scheme. For example, if WUS sequence is generated and mapped per subframe, L_Gold can be 127. For another example, if WUS sequence is generated and mapped across subframes, L_Gold can be 255 or 511. In one example, the choice of L_ZC and L_Gold can be the same. For example, if WUS sequence is generated and mapped per subframe, both L and L_Gold can be 127.

In particular, the WUS is constructed as given by d_WUS(n)=exp(−jπun'(n'+1)/L_ZC)*(1−2*((d_M1((n"+c1) mod L_Gold)+d_M2((n"+c2) mod L_Gold)) mod 2) where n=0, 1, . . . , N_RE_WUS−1, and n'=n mod L_ZC, and n"=m mod L_Gold.

The mapping of root index u to the information carried by the ZC-sequence part (i.e., I_info^ZC) can be according to u=I_info^ZC+1; and the mapping of the cyclic shifts c_M1 and c_M2 (if using cyclic shift for carrying information, otherwise the cyclic shift c_M1 and c_M2 are both 0 and information is carried in initial condition) to the information carried by the Gold-sequence part (i.e., I_info^M1 and I_info^M2) can be according to c_M1=I_info^M1, and c_M2=I_info^M2.

In one example, the information carried by WUS is cell ID (i.e., N_ID^cell) or part of the cell ID. Then, the cell ID information can be separately carried by ZC-sequence and Gold-sequence. For one sub-example, I_info^ZC=(N_ID^cell mod L), and I_info^M1=⌊N_ID^cell/L⌋*⌊L_Gold/(504/L)⌋ and I_info^M1=0.

In another example, the information carried by WUS is cell ID (or part of cell ID) and timing information (0≤I_t≤N_t). E.g. I_t=n_subframe mod N_t, where N_t can be 2 or 4 or 6 or 8. For one sub-example, only ZC-sequence carries part of the cell ID information, and M-sequence carries the remaining part of cell ID information carried by WUS (if there is any remaining) together with timing information: I_info^ZC=(N_ID^cell mod L), and I_info^M1=c*I_t, and I_info^M2=0, where c is a constant and c=⌊L_Gold/N_t⌋ for example.

In yet another example, the information carried by WUS is cell ID (or part of cell ID) and UE group ID (or part of UE group ID). For one sub-example, only ZC-sequence carries part of the cell ID information, and M-sequence carries the remaining part of cell ID information carried by WUS (if there is any remaining) together with UE group ID: I_info^ZC=(N_ID^cell mod L), and I_info^M1=c*N_ID^UEgroup, and I_info^M2=0, where c is a constant and c=⌊L_Gold/N_UEgroup⌋ for example.

In yet another example, the information carried by WUS is cell ID (or part of cell ID) and UE group ID (or part of UE group ID) and timing info. For one sub-example, only ZC-sequence carries part of the cell ID information, and M-sequence carries the remaining part of cell ID information carried by WUS (if there is any remaining) together with timing information and UE group ID: I_info^ZC=(N_ID^cell mod L), and I_info^M1=c*N_ID^UEgroup, and I_info^M2=d*I_t, where c and d are constants and c=⌊L_Gold/N_UEgroup⌋ for example and d==⌊L_Gold/N_t⌋ for example.

If L_Gold=127, the generation scheme (or equivalently the generating polynomial) for the two M-sequences generating Gold-sequence d_M1(i) and d_M2(i) can be from two of the construction schemes in TABLE 1, with proper initial condition e.g. $d_M(0)=d_M(1)=d_M(2)=d_M(3)=d_M(4)=d_M(5)=0$, $d_M(6)=1$, for both of the M-sequences, or $d_M(1)=d_M(2)=d_M(3)=d_M(4)=d_M(5)=d_M(6)=0$, $d_M(0)=1$, for both of the M-sequences, if cyclic shift is utilized for indicating information (otherwise, the initial condition may carry the corresponding information).

In one example, the polynomial for generating the M-sequences can be $x^7+x+1$ for d_M1(i) and $x^7+x^4+1$ for d_M2(i). In another example, the polynomial for generating the M-sequences can be $x^7+x^3+1$ for d_M1(i) and $x^7+x^4+1$ for d_M2(i). In yet another example, the polynomial for generating the M-sequences can be $x^7+x+1$ for d_M1(i) and $x^7+x^6+1$ for d_M2(i).

Component II.D: ZC-sequence based WUS with cover code and/or phase shift.

The sequence for generating WUS is based on ZC-sequence with cover code and phase shift according to d_WUS(n)=c(m)*exp(−jπun'(n'+1)/L_ZC)*exp(−j2πθn) where n=0, 1, . . . , N_RE_WUS−1, and u is the root index of ZC-sequence, θ is the phase shift of ZC-sequence, and n'=n mod L_ZC, and m=n mod L_c, wherein L_ZC is the length of ZC sequence (e.g. 131) and L_c is the length of cover code (e.g. 128).

The mapping of root index u to the information carried by the ZC-sequence can be determined as follow.

In one embodiment, root index u only carries part of the cell ID. For example, u can be determined in the form of u=c_1*(N_ID^cell mod a)+c_2, where a is the total number of cell IDs carried by WUS and is predefined, and c_1 and c_2 are predefined integers: (1) L_ZC=131, a=21 (single-ring cell planning with 21 cells), and c_1=1, and c_2=0 (to minimize the range of cyclic shifts); (2) L_ZC=131, a=21 (single-ring cell planning with 21 cells), and c_1=6, and c_2=5 (to maximize the range of cyclic shifts); (3) L_ZC=131, a=57 (double-ring cell planning with 57 cells), and c_1=1, and c_2=0 (to minimize the range of cyclic shifts); (4) L_ZC=131, a=57(double-ring cell planning with 57 cells), and c_1=2, and c_2=9 (to maximize the range of cyclic shifts); (5) L_ZC=131, a=130 (to maximize the number of cell IDs carried by u), and c_1=1, and c_2=1; and (6) L_ZC=131, a=126 (similarly as NSSS), and c_1=1, and c_2=3.

In another embodiment, root index u carries part of the cell ID and UE group ID. For example, u can be determined in the form of u=c_1*(f(N_ID^cell, N_ID^UEgroup) mod a)+c_2, where a is the total number of IDs carried by WUS and is predefined, and c_1 and c_2 are predefined integers, and f(N_ID^cell, N_ID^UEgroup) is a function of N_ID^cell and N_ID^UEgroup, which can be either linear (e.g. f(N_ID^cell, N_ID^UEgroup)=N_UEgroup*(N_ID^cell+ 1)+N_ID^UEgroup) or non-linear (e.g. f(N_ID^cell, N_ID^UEgroup)=c_3*(N_ID^cell+1)(N_ID^UEgroup+1)); (1) L_ZC=131, a=21*2 (single-ring cell planning with 21 cells and two UE group IDs), and c_1=1, and c_2=0 (to minimize the range of cyclic shifts); (2) L_ZC=131, a=21*2 (single-ring cell planning with 21 cells and two UE group IDs), and c_1=3, and c_2=5 (to maximize the range of cyclic shifts); (3) L_ZC=131, a=21*4 (single-ring cell planning with 21 cells and 4 UE group IDs), and c_1=1; (4) L_ZC=131, a=57*2 (double-ring cell planning with 57 cells), and c_1=1, and c_2=0 (to minimize the range of cyclic shifts); and (5) L_ZC=131, a=130 (to maximize the number of IDs carried by u, like 65 cell IDs and 2 UE group IDs), and c_1=1, and c_2=1.

In yet another embodiment, root index u carries part of the cell ID and varies over time (e.g. varies for different subframe). For one example, u can be determined in the form of u=c_1*(N_ID^cell mod a)+I_t, where a is the total number of IDs carried by WUS and is predefined, and c_1 is a predefined integer, and I_t is the time info, e.g. subframe index within the transmission duration of WUS or absolute subframe index mod transmission duration of WUS: (1) L_ZC=131, a=21 (single-ring cell planning with 21 cells), and c_1=1 (to minimize the range of cyclic shifts); (2) L_ZC=131, a=21 (single-ring cell planning with 21 cells), and c_1=6 (to maximize the range of cyclic shifts); (3) L_ZC=131, a=57 (double-ring cell planning with 57 cells), and c_1=1 (to minimize the range of cyclic shifts); (4) L_ZC=131, a=57 (double-ring cell planning with 57 cells), and c_1=2 (to maximize the range of cyclic shifts); (5) L_ZC=131, a=130 (to maximize the number of cell IDs carried by u), and c_1=1.

In yet another embodiment, root index u carries part of the cell ID, UE group ID, and varies over time (e.g. varies for different subframe). For one example, u can be determined in the form of u=c_1*(f(N_ID^cell, N_ID^UEgroup) mod a)+I_t, where a is the total number of IDs carried by WUS and is predefined, and c_1 is a predefined integer, and I_t is the time info, e.g. subframe index within the transmission duration of WUS or absolute subframe index mod transmission duration of WUS. f(N_ID^cell, N_ID^UEgroup) is a function of N_ID^cell and N_ID^UEgroup, which can be either linear (e.g. f(N_ID^cell, N_ID^UEgroup)=N_UEgroup*(N_ID^cell+1)+N_ID^UEgroup) or non-linear (e.g. f(N_ID^cell, N_ID^UEgroup)=c_2*(N_ID^cell+1)(N_ID^UEgroup+1), where c_2 is a predefined constant, e.g. c_2=1): (1) L_ZC=131, a=21*2 (single-ring cell planning with 21 cells and two UE group IDs), and c_1=1 (to minimize the range of cyclic shifts); (2) L_ZC=131, a=21*2 (single-ring cell planning with 21 cells and two UE group IDs), and c_1=3 (to maximize the range of cyclic shifts); (3) L_ZC=131, a=21*4 (single-ring cell planning with 21 cells and 4 UE group IDs), and c_1=1 (to minimize the range of cyclic shifts); (4) L_ZC=131, a=57*2 (double-ring cell planning with 57 cells), and c_1=1 (to minimize the range of cyclic shifts); (5) L_ZC=131, a=130 (to maximize the number of IDs carried by u, like 65 cell IDs and 2 UE group IDs), and c_1=1.

c(m) is the cover code applied to the ZC-sequence, which can be constructed according to following embodiments.

In one embodiment, c(m) is all-one sequence, which is equivalent as no coder code.

In another embodiment, c(m) is a single length-128 cover code which is orthogonal to all cover codes of NSSS (i.e., b_q(m) in the construction of NSSS). For example, c(0:127) can be [1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −11−1−1 1 1−1−1 1−1 1 1 −1 −1 1 1 −1 1 −1 −1 1 1 −1 −1 1 1 −1 1 −1 −1 1 1 −1 −1 1 −1 1 1 −1 −1 1 1 −1 1 −1 −1 1 1 −1 1 −1 −1 1 −1 1 1 −1 1 −1 −1 1 1 −1 −1 1 −1 1 1 −1 −1 1 −1 1 −1 −1 1 1 −1 −1 1 1 −1 1 1 −1].

In yet another embodiment, c(m) is a length-128 cover code which carries part of cell ID information and/or UE group ID, and all the sequences are orthogonal or with low cross-correlation with over codes of NSSS (i.e., b_q(m) in the construction of NSSS).

In yet another embodiment, c(m) is a length-127 M-sequence carrying part of cell ID information and/or UE group ID, and the particular design of the M-sequence can refer to the M-sequence design in Component II.B.

In yet another embodiment, c(m) is a length-127 Gold-sequence carrying part of cell ID information and/or UE group ID, and the particular design of the Gold-sequence can refer to the M-sequence design in Component II.C.

In yet another embodiment, c(m) is selected from a set of length-128 Hadamard codes (e.g. there are 128 length-128 Hadamard codes and Q of them with index s_q, respectively, are chosen to construct c(m), where c(m) is denoted as c_q(m), and 0≤q≤Q−1). In one sub-embodiment, to avoid strong interference with NSSS, Q out of the remaining 124 Hadamard codes (exclude the ones with indices {0, 31, 63, 127} already used by NSSS as cover codes) can be selected for c_q(m). The mapping between the cover code index, q, and Hadamard index, s_q can be determined based on the following sub-embodiments.

In one sub-embodiment: q is determined by part of cell ID, as $$q = \mathrm{mod}\left(\left\lfloor \frac{N\_ID^\wedge cell}{a} \right\rfloor, Q\right),$$

where a is a constant integer. For example, a=126, Q=4, {s_q}={1, 33, 65, 97}. An example of the index of Hadamard Code s_q is illustrated in TABLE 2.

TABLE 2

| the index of Hadamard Code s_q | |
|---|---|
| q | s_q |
| 0 | 1 |
| 1 | 33 |
| 2 | 65 |
| 3 | 97 |

In another sub-embodiment: q is determined by the timing information, as q=mod(I_t,Q). E.g. I_t=n_subframe mod N_t, where 0≤I_t≤N_t, N_t is total number of timing indices and can be 1, 2 or 4 or 6 or 8. An example of the index of Hadamard Code s_q is illustrated in TABLE 2 when Q=4.

In yet another sub-embodiment: q is determined by ue group id, N_ID^UEgroup, as q=mod(N_ID^UEgroup, Q). E.g. Q=4. An example of the index of Hadamard Code s_q is illustrated in TABLE 2 when Q=4.

In yet another sub-embodiment: q is determined by both part of the cell Id and timing information according to $$q = \mathrm{mod}\left(\left(\left\lfloor\frac{N_{ID}^{cell}}{a}\right\rfloor+1\right)*(I_t+1),\ Q\right).$$

E.g. I_t=n_subframe mod N_t, where 0≤I_t≤N_t, N_t is total number of timing indices and can be 1, 2 or 4 or 6 or 8. a is a constant integer. For example a=126. An example of the index of Hadamard Code s_q is illustrated in TABLE 2 when Q=4.

In yet another sub-embodiment: q is determined by ue group id and cell ID, N_ID^UEgroup, as $$q = \mathrm{mod}\left(4*\left\lfloor\frac{N_{ID}^{cell}}{a}\right\rfloor + N\_ID\wedge UEgroup,\right.$$

Q), where a is a constant integer, e.g. a=126, and Q=16

In yet another embodiment, c(m) is constructed by LTE PN sequence, where the initial condition of c(m) carries cell ID information (either the remaining part cell ID left from root of ZC sequence and phase shift, or the whole cell ID), and/or UE group ID (if any), and/or timing information.

If timing information and ID (including cell ID and/or UE group ID) are both carried by the initial condition of PN sequence, a non-linear term of the timing information and ID may be included as part of the initial condition, e.g. a product term of the timing information and ID, to avoid constant cross-correlation over time for a given pair of cell IDs: the initial condition c_int=a(N_ID+1)(I_t+1)+b(N_ID+1)+c(I_t+1), where a, b, c are integers, I_t is the time info index, N_ID is the ID carried by the PN sequence, where N_ID can be N_ID^cell (if only cell ID is carried by the PN sequence), or ⌊N_ID^cell/126⌋ (if only part of the cell ID is carried by the PN sequence), or N_UEgroup*N_ID^cell+N_ID^UEgroup (if both cell ID and UE group ID is carried by the PN sequence), or N_UEgroup*⌊N_ID^cell/126⌋+N_ID^UEgroup (if both part of the cell ID and UE group ID is carried by the PN sequence).

θ is the phase shift applied to the ZC-sequence, which can be constructed as followings.

In one embodiment, θ is 0, which is equivalent as no phase shift. In this embodiment, the sequence can also refer to Component MB if the cover code is M-sequence, and refer to Component II.C if the cover code is Gold-sequence.

In another embodiment, θ is time-varying (e.g. carrying subframe index) such that the cell-common phase shift varies over time. For example, θ=I_t/N_t, where I_t is the time info index carried by θ, e.g. subframe index within the transmission duration of WUS or absolute subframe index mod transmission duration of WUS, and N_t is the total number of time info carried by θ, e.g. total number of subframes within the transmission duration of WUS, or maximum configured transmission duration of WUS, or maximum configured transmission duration of WUS using the same antenna port.

In another embodiment, θ is cell-specific and time-varying (e.g. carrying subframe index) such that the cell-specific phase shift varies over time. For example, θ=f(N_ID^cell, I_t), where I_t is the time info index carried by θ, e.g. subframe index within the transmission duration of WUS or absolute subframe index mod transmission duration of WUS.

In one sub-embodiment, f is a linear function of N_ID^cell and I_t. For example, θ=mod(c_1*N_ID^cell+c_2*I_t, N_t)/N_t, and c_1, c_2 are predefined constants, and N_t is the total number of time info carried by θ, e.g. total number of subframes within the transmission duration of WUS, or maximum configured transmission duration of WUS, or maximum configured transmission duration of WUS using the same antenna port. E.g. c_1=N_t and c_2=1.

In another sub-embodiment, f is a non-linear function of N_ID^cell and I_t. For example, θ=mod(c_1*(N_ID^cell+1)*(I_1 t+1)+c_2*(I_1 t+1)+c_3*(N_ID^cell+1), N_t)/N_t, and c_1, c_2, c_3 are predefined constants, and N_t is the total number of time info carried by θ, e.g. total number of subframes within the transmission duration of WUS, or maximum configured transmission duration of WUS, or maximum configured transmission duration of WUS using the same antenna port. For example, c_1=1, c_2=0, and c_3=0.

In yet another embodiment, θ is cell-specific, UE-group-specific, and time-varying (e.g. carrying subframe index) such that the cell-specific and UE-group-specific phase shift varies over time.

In one sub-embodiment, f is a linear function of N_ID^cell, N_ID^UEgroup and I_t. For example, θ=mod (c_1*N_ID^cell+c_2*N_ID^UEgroup+c_3*I_t, N_t)/N_t, and c_1, c_2, c_3 are predefined constants, and N_t is the total number of time info carried by θ, e.g. total number of subframes within the transmission duration of WUS, or maximum configured transmission duration of WUS, or maximum configured transmission duration of WUS using the same antenna port, for example, c_1=N_t*N_UEgroup and c_2=N_t and c_3=1.

In another sub-embodiment, f is a non-linear function of N_ID^cell, N_ID^UEgroup and I_t. For example, θ=mod (c_1*(c_4*N_ID^cell+c_5*N_ID^UEgroup+1)*(I_t+1)+c_2*(I_t+1)+c_3*(c_4*N_ID^cell+c_5*N_ID^UEgroup+1), N_t)/N_t, and c_1, c_2, c_3, c_4, c_5 are predefined constants, and N_t is the total number of time info carried by θ, e.g. total number of subframes within the transmission duration of WUS, or maximum configured transmission duration of WUS, or maximum configured transmission duration of WUS using the same antenna port, for example, c_1=1, c_2=0, c_3=0, c_4=N_UEgroup, and c_5=1.

Component II.E: ZC-sequence based WUS with cover code and/or cyclic shift.

The sequence for generating WUS is based on ZC-sequence with cover code and cyclic shift according to d_WUS(n)=c(m)*exp(−jπun'(n'+1)/L_ZC) where n=0, 1, . . . , N_RE_WUS−1, and u is the root index of ZC-sequence, n'=n+c_cs mod L_ZC, and c_cs is the cyclic shift of ZC-sequence, and m=n mod L_c, wherein L_ZC is the length of ZC sequence (e.g. 131) and L_c is the length of cover code (e.g. 128).

The mapping of root index u to the information carried by the ZC-sequence can be determined as follow.

In one embodiment, root index u only carries part of the cell ID. For example, u can be determined in the form of u=c_1*(N_ID^cell mod a)+c_2, where a is the total number of cell IDs carried by WUS and is predefined, and c_1 and c_2 are predefined integers: (1) L_ZC=131, a=21 (single-ring cell planning with 21 cells), and c_1=1, and c_2=0 (to minimize the range of cyclic shifts); (2) L_ZC=131, a=21 (single-ring cell planning with 21 cells), and c_1=6, and c_2=5 (to maximize the range of cyclic shifts); (3) L_ZC=131, a=57 (double-ring cell planning with 57 cells), and c_1=1, and c_2=0 (to minimize the range of cyclic shifts); (4) L_ZC=131, a=57 (double-ring cell planning with 57 cells), and c_1=2, and c_2=9 (to maximize the range of cyclic shifts); (5) L_ZC=131, a=130 (to maximize the number of cell IDs carried by u), and c_1=1, and c_2=1; and (6) L_ZC=131, a=126 (similarly as NSSS), and c_1=1, and c_2=3.

In another embodiment, root index u carries part of the cell ID and UE group ID. For example, u can be determined in the form of u=c_1*(f(N_ID^cell, N_ID^UEgroup) mod a)+c_2, where a is the total number of IDs carried by WUS and is predefined, and c_1 and c_2 are predefined integers, and f(N_ID^cell, N_ID^UEgroup) is a function of N_ID^cell and N_ID^UEgroup, which can be either linear (e.g. f(N_ID^cell, N_ID^UEgroup)=N_UEgroup*(N_ID^cell+1)+N_ID^UEgroup) or non-linear (e.g. f(N_ID^cell, N_ID^UEgroup)=c_3*(N_ID^cell+1)(N_ID^UEgroup+1)): (1) L_ZC=131, a=21*2 (single-ring cell planning with 21 cells and two UE group IDs), and c_1=1, and c_2=0 (to minimize the range of cyclic shifts); (2) L_ZC=131, a=21*2 (single-ring cell planning with 21 cells and two UE group IDs), and c_1=3, and c_2=5 (to maximize the range of cyclic shifts); (3) L_ZC=131, a=21*4 (single-ring cell planning with 21 cells and 4 UE group IDs), and c_1=1; (4) L_ZC=131, a=57*2 (double-ring cell planning with 57 cells), and c_1=1, and c_2=0 (to minimize the range of cyclic shifts); and (5) L_ZC=131, a=130 (to maximize the number of IDs carried by u, like 65 cell IDs and 2 UE group IDs), and c_1=1, and c_2=1.

In yet another embodiment, root index u carries part of the cell ID and varies over time (e.g. varies for different subframe). For one example, u can be determined in the form of u=c_1*(N_ID^cell mod a)+I_t, where a is the total number of IDs carried by WUS and is predefined, and c_1 is a predefined integer, and I_t is the time info, e.g. subframe index within the transmission duration of WUS or absolute subframe index mod transmission duration of WUS: (1) L_ZC=131, a=21 (single-ring cell planning with 21 cells), and c_1=1 (to minimize the range of cyclic shifts); (2) L_ZC=131, a=21 (single-ring cell planning with 21 cells), and c_1=6 (to maximize the range of cyclic shifts); (3) L_ZC=131, a=57 (double-ring cell planning with 57 cells), and c_1=1 (to minimize the range of cyclic shifts); (4) L_ZC=131, a=57 (double-ring cell planning with 57 cells), and c_1=2 (to maximize the range of cyclic shifts); and (5) L_ZC=131, a=130 (to maximize the number of cell IDs carried by u), and c_1=1.

In yet another embodiment, root index u carries part of the cell ID, UE group ID, and varies over time (e.g. varies for different subframe). For one example, u can be determined in the form of u=c_1*(f(N_ID^cell, N_ID^UEgroup mod a)+I_t, where a is the total number of IDs carried by WUS and is predefined, and c_1 is a predefined integer, and I_t is the time info, e.g. subframe index within the transmission duration of WUS or absolute subframe index mod transmission duration of WUS. f(N_ID^cell, N_ID^UEgroup) is a function of N_ID^cell and N_ID^UEgroup, which can be either linear (e.g. f(N_ID^cell, N_ID^UEgroup)=N_UEgroup*(N_ID^cell+1)+N_ID^UEgroup) or non-linear (e.g. f(N_ID^cell, N_ID^UEgroup)=c_3*(N_ID^cell+1)(N_ID^UEgroup+1)): (1) L_ZC=131, a=21*2 (single-ring cell planning with 21 cells and two UE group IDs), and c_1=1 (to minimize the range of cyclic shifts); (2) L_ZC=131, a=21*2 (single-ring cell planning with 21 cells and two UE group IDs), and c_1=3 (to maximize the range of cyclic shifts); (3) L_ZC=131, a=21*4 (single-ring cell planning with 21 cells and 4 UE group IDs), and c_1=1 (to minimize the range of cyclic shifts); (4) L_ZC=131, a=57*2 (double-ring cell planning with 57 cells), and c_1=1 (to minimize the range of cyclic shifts); and (5) L_ZC=131, a=130 (to maximize the number of IDs carried by u, like 65 cell IDs and 2 UE group IDs), and c_1=1.

c(m) is the cover code applied to the ZC-sequence, which can be constructed according to following embodiments.

In one embodiment, c(m) is all-one sequence, which is equivalent as no coder code.

In another embodiment, c(m) is a single length-128 cover code which is orthogonal to all cover codes of NSSS (i.e., b_q(m) in the construction of NSSS). For example, c(0:127) can be [1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 1 −1 −1 1 1 −1].

In yet another embodiment, c(m) is selected from a set of length-128 Hadamard codes (e.g. there are 128 length-128 Hadamard codes and Q of them with index s_q, respectively, are chosen to construct c(m), where c(m) is denoted as c_q(m), and 0≤q≤Q−1). In one sub-embodiment, to avoid strong interference with NSSS, Q out of the remaining 124 Hadamard codes (exclude the ones with indices {0, 31, 63, 127} already used by NSSS as cover codes) can be selected for c_q(m). The mapping between the cover code index, q, and Hadamard index, s_q can be selected determined based on the following sub-embodiments.

In one sub-embodiment: q is determined by part of cell ID, as $$q = \mod\left(\left\lfloor \frac{N\_ID^{\wedge}cell}{a} \right\rfloor, Q\right),$$

where a is a constant integer. For example, a=126, Q=4, {s_q}={1, 33, 65, 97}. An example of the index of Hadamard Code s_q is illustrated in TABLE 2.

In another sub-embodiment: q is determined by the timing information, as q=mod(I_t,Q). E.g. I_t=n_subframe mod N_t, where 0≤I_t≤N_t, N_t is total number of timing indices and can be 1, 2 or 4 or 6 or 8. An example of the index of Hadamard Code s_q is illustrated in TABLE 2 when Q=4.

In yet another sub-embodiment: q is determined by ue group id, N_ID^UEgroup, as q=mod(N_ID^UEgroup, Q). E.g. Q=4. An example of the index of Hadamard Code s_q is illustrated in TABLE 2 when Q=4.

In yet another sub-embodiment: q is determined by both part of the cell Id and timing information according to $$q = \mod\left(\left(\left\lfloor \frac{N_{ID}^{cell}}{a} \right\rfloor + 1\right) * (I_t + 1),\ Q\right).$$

E.g. I_t=n_subframe mod N_t, where 0≤I_t≤N_t, N_t is total number of timing indices and can be 1, 2 or 4 or 6 or 8. a is a constant integer. For example a=126. An example of the index of Hadamard Code s_q is illustrated in TABLE 2 when Q=4.

In yet another sub-embodiment: q is determined by ue group id and cell ID, N_ID^UEgroup, as $$q = \mod\left(4 * \left\lfloor \frac{N_{ID}^{cell}}{a} \right\rfloor + N\_ID^{\wedge}UEgroup,\right.$$

Q), where a is a constant integer, e.g. a=126, and Q=16.

In yet another embodiment, c(m) is a length-128 cover code which carries part of cell ID information and/or UE group ID, and all the sequences are orthogonal or with low cross-correlation with over codes of NSSS (i.e., b_q(m) in the construction of NSSS).

In yet another embodiment, c(m) is a length-127 M-sequence carrying part of cell ID information and/or UE group ID, and the particular design of the M-sequence can refer to the M-sequence design in Component II.B.

In yet another embodiment, c(m) is a length-127 Gold-sequence carrying part of cell ID information and/or UE group ID, and the particular design of the Gold-sequence can refer to the M-sequence design in Component II.C.

In yet another embodiment, c(m) is constructed by LTE PN sequence, where the initial condition of c(m) carries cell ID information (either the remaining part cell ID left from root of ZC sequence and cyclic shift, or the whole cell ID), and/or UE group ID (if any), and/or timing information.

If timing information and ID (including cell ID and/or UE group ID) are both carried by the initial condition of PN sequence, a non-linear term of the timing information and ID may be included as part of the initial condition, e.g. a product term of the timing information and ID, to avoid constant cross-correlation over time for a given pair of cell IDs: the initial condition $c\_int = a(N\_ID+1)(I\_t+1) + b(N\_ID+1) + c(I\_t+1)$, where a, b, c are integers, I_t is the time info index, N_ID is the ID carried by the PN sequence, where N_ID can be N_ID^cell (if only cell ID is carried by the PN sequence), or $\lfloor N\_ID^{cell}/126 \rfloor$ (if only part of the cell ID is carried by the PN sequence), or N_UEgroup*N_ID^cell+N_ID^UEgroup (if both cell ID and UE group ID is carried by the PN sequence), or N_UEgroup*$\lfloor N\_ID^{cell}/126 \rfloor$+N_ID^UEgroup (if both part of the cell ID and UE group ID is carried by the PN sequence).

c_cs is the cyclic shift applied to the ZC-sequence, which can be constructed according to following embodiments.

In one embodiment, c_cs is 0, which is equivalent as no cyclic shift. In this embodiment, the sequence can also refer to Component MB if the cover code is M-sequence, and refer to Component II.C if the cover code is Gold-sequence.

In another embodiment, c_cs is time-varying (e.g. carrying subframe index) such that the cell-common cyclic shift varies over time. For example, c_cs=I_t, where I_t is the time info index carried by c_cs, e.g. subframe index within the transmission duration of WUS or absolute subframe index mod transmission duration of WUS, and $I\_t \leq N\_t-1$ where N_t is the total number of time info carried by c_cs, e.g. total number of subframes within the transmission duration of WUS, or maximum configured transmission duration of WUS, or maximum configured transmission duration of WUS using the same antenna port.

In another embodiment, c_cs is cell-specific and time-varying (e.g. carrying subframe index) such that the cell-specific cyclic shift varies over time. For example, c_cs=f(N_ID^cell, I_t), where I_t is the time info index carried by c_cs, e.g. subframe index within the transmission duration of WUS or absolute subframe index mod transmission duration of WUS.

In one sub-embodiment, f is a linear function of N_ID^cell and I_t. For example, c_cs=mod(c_1*N_ID^cell+c_2*I_t, N_t), and c_1, c_2 are predefined constants, and N_t is the total number of time info carried by c_cs, e.g. total number of subframes within the transmission duration of WUS, or maximum configured transmission duration of WUS, or maximum configured transmission duration of WUS using the same antenna port, for example, c_1=N_t and c_2=1.

In another sub-embodiment, f is a non-linear function of N_ID^cell and I_t. For example, c_cs=mod(c_1*(N_ID^cell+1)*(I_1 t+1)+c_2*(I_1 t+1)+c_3*(N_ID^cell+1), N_t), and c_1, c_2, c_3 are predefined constants, and N_t is the total number of time info carried by c_cs, e.g. total number of subframes within the transmission duration of WUS, or maximum configured transmission duration of WUS, or maximum configured transmission duration of WUS using the same antenna port, for example, c_1=1, c_2=0, and c_3=0.

In yet another embodiment, c_cs is cell-specific, UE-group-specific, and time-varying (e.g. carrying subframe index) such that the cell-specific and UE-group-specific cyclic shift varies over time.

In one sub-embodiment, f is a linear function of N_ID^cell, N_ID^UEgroup and I_t. For example, c_cs=mod (c_1*N_ID^cell+c_2*N_ID^UEgroup+c_3*I_t, N_t), and c_1, c_2, c_3 are predefined constants, and N_t is the total number of time info carried by c_cs, e.g. total number of subframes within the transmission duration of WUS, or maximum configured transmission duration of WUS, or maximum configured transmission duration of WUS using the same antenna port. E.g. c_1=N_t*N_UEgroup and c_2=N_t and c_3=1.

In another sub-embodiment, f is a non-linear function of N_ID^cell, N_ID^UEgroup and I_t. For example, c_cs=mod (c_1*(c_4*N_ID^cell+c_5*N_ID^UEgroup+1)*(I_1 t+1)+c_2*(I_1 t+1)+c_3*(c_4*N_ID^cell +c_5*N_ID^UEgroup+ 1), N_t), and c1, c2, c3, c4, c5 are predefined constants, and N_t is the total number of time info carried by c_cs, e.g. total number of subframes within the transmission duration of WUS, or maximum configured transmission duration of WUS, or maximum configured transmission duration of WUS using the same antenna port, for example, c_1=1, c_2=0, c_3=0, c_4=N_UEgroup, and c_5=1.

Component III: M-Sequence based WUS.

In this component, the number of WUS sequences is limited by the M-sequence length. For example, if the length of M-sequence is 127, at most 127 WUS sequences are supported.

The WUS can be constructed from BPSK modulated length-L_M M-sequence, where cyclic shift or initial condition (note that cyclic shift or initial condition is equivalent in term of the generated sequences) of the M-sequence is utilized to represent the information carried by WUS. The sequence can be mapped in the frequency domain to the REs for WUS with potential truncation or extension (e.g. N_RE^WUS=132 for 11 symbols within one subframe) in a frequency first and time second order.

L_M is determined by the sequence generation scheme and mapping scheme. For example, if WUS sequence is generated and mapped per subframe, L_M can be 127. For another example, if WUS sequence is generated and mapped across subframes, L_M can be 255 or 511.

In particular, the WUS is constructed as given by d_WUS (n)=1-2*d_M((n'+c_M) mod L_M) where n=0, 1, . . . , N_RE_WUS-1, and n'=n mod L_M. The mapping of the cyclic shift c_M to the information carried by the WUS (e.g. I_info^WUS) can be according to c_M=I_info^WUS.

In one example, the information carried by WUS is cell ID (i.e., N_ID^cell) or part of the cell ID.

For one sub-example, I_info^WUS=b*(N_ID^cell mod a), where a and b are predefined constants: (1) L_M=127, a=21 (single-ring cell planning with 21 cells), and b=1 (to minimize the range of cyclic shifts); (2) L_M=127, a=21 (single-ring cell planning with 21 cells), and b=6 (to maximize the range of cyclic shifts); (3) L_M=127, a=57 (double-ring cell planning with 57 cells), and b=1 (to minimize the range of cyclic shifts); (4) L_M=127, a=57 (double-ring cell planning with 57 cells), and b=2 (to maximize the range of cyclic shifts); and (5) L_M=127, a=127 (using the maximum number of sequences), and b=1 (only choice to be compatible with a).

For another sub-example, I_info^WUS=b*(⌊N_ID^cell/a⌋), where a and b are predefined constants: (1) L_M=127, a=6 (single-ring cell planning with 21 cells), and b=1 (to minimize the range of cyclic shifts); (2) L_M=127, a=6 (single-ring cell planning with 21 cells), and b=6 (to maximize the range of cyclic shifts); (3) L_M=127, a=2 (double-ring cell planning with 57 cells), and b=1 (to minimize the range of cyclic shifts); (4) L_M=127, a=2 (double-ring cell planning with 57 cells), and b=2 (to maximize the range of cyclic shifts); and (5) L_M=127, a=4 (using the maximum number of sequences), and b=1 (only choice to be compatible with a).

In another example, the information carried by WUS is cell ID (or part of cell ID) and timing information ($0 \leq I\_t \leq N\_t$). E.g. I_t=n_subframe mod N_t, where N_t is total number of timing indices and can be 2 or 4 or 6 or 8. For one sub-example, I_info^WUS=N_t*(N_ID^cell mod ⌊(L_M−1)/N_t⌋)+I_t. For another sub-example, I_info^WUS=c*(N_ID^cell mod b)*(I_t+1)+I_t, where b and c are predefined constants. Note that there is a product term of timing info and cell ID to avoid coherent combining of interference from neighboring cells.

In yet another example, the information carried by WUS is cell ID (or part of cell ID) and UE group ID (or part of UE group ID). For one sub-example, I_info^WUS=N_UEgroup*(N_ID^cell mod ⌊(L_M−1)/N_UEgroup⌋)+N_ID^UEgroup. For another sub-example, I_info^WUS=N_ID^UEgroup*(⌊(L_M−1)/N_UEgroup⌋)+N_ID^cell mod ⌊(L_M−1)/N_UEgroup⌋.

In yet another example, the information carried by WUS is cell ID (or part of cell ID) and UE group ID (or part of UE group ID) and timing info. For one sub-example, I_info^WUS=N_t*(N_UEgroup*N_ID^cell+N_ID^UEgroup mod ⌊(L−1)/N_t_1⌋)+I_t. For another sub-example, I_info^WUS=c*(N_UEgroup*N_ID^cell+N_ID^UEgroup mod b)*(I_t+1)+I_t, where b and c are predefined constants. Note that there is a product term of timing info and cell ID to avoid coherent combining of interference from neighboring cells.

If L_M=127, the generation scheme (or equivalently the generating polynomial) for the M-sequence d_M(i) can be from one of the construction schemes in TABLE 1, with proper initial condition e.g. $d_M(0)=d_M(1)=d_M(2)=d_M(3)=d_M(4)=d_M(5)=0$, $d_M(6)=1$, or $d_M(1)=d_M(2)=d_M(3)=d_M(4)=d_M(5)=d_M(6)=0$, $d_M(0)=1$, if cyclic shift is utilized for indicating information (otherwise, the initial condition may carry the corresponding information).

For example, the polynomial for generating the M-sequence can be $x^7+x+1$ for simplicity. For another example, the polynomial for generating the M-sequence can be $x^7+x^3+1$ for simplicity. For yet another example, the polynomial for generating the M-sequence can be $x^7+x^6+1$ for simplicity. For yet another example, the polynomial for generating the M-sequence can be $x^7+x^4+1$ for simplicity.

Component IV: Gold-Sequence based WUS.

In this component, the number of WUS sequences is limited by the square of the Gold-sequence length. For example, if the length of Gold-sequence is 127, at most $127^2$ WUS sequences are supported. Comparing to M-sequence based WUS design, Gold-sequence based design has more information to carry, but with worse cross-correlation.

Note that the Gold-sequence based WUS can also be considered as M-sequence based WUS with another M-sequence as the cover code.

The WUS can be constructed from BPSK modulated length-L_Gold Gold-sequence (i.e., XOR of two M-sequences), where cyclic shifts or initial conditions (note that cyclic shift or initial condition is equivalent in term of the generated sequences) of the two M-sequences generating the Gold-sequence are utilized to represent the information carried by WUS. The sequence can be mapped in the frequency domain to the REs for WUS with potential truncation or extension (e.g. N_RE^WUS=132 for 11 symbols within one subframe) in a frequency first and time second order.

L_Gold is determined by the sequence generation scheme and mapping scheme. For example, if WUS sequence is generated and mapped per subframe, L_Gold can be 127. For another example, if WUS sequence is generated and mapped across subframes, L_Gold can be 255 or 511.

In particular, the WUS is constructed as given by d_WUS(n)=1−2*((d_M1((n'+c_M1) mod L_Gold)+d_M2((n'+c_M2) mod L_Gold)) mod 2) where n=0, 1, . . . , N_RE_WUS−1, and n'=n mod L_Gold. The mapping of the cyclic shifts c_M1 and c_M2 to the information carried by the two M-sequences generating the Gold-sequence (i.e., I_info^M1 and I_info^M2, correspondingly) can be according to c_M1=I_info^M1, and c_M2=I_info^M2.

In one example, the information carried by WUS is cell ID (i.e., N_ID^cell) or part of the cell ID. Then, the cell ID information can be separately carried by the two M-sequences. For one sub-example, I_info^M1=b*(N_ID^cell mod a), and I_info^M2=c*⌊N_ID^cell/a⌋, where a, b, c are predefined constants: (1) L_Gold=127, a=21 (single-ring cell planning with 21 cells), b=1 and c=1 (to minimize the range of cyclic shifts); (2) L_Gold=127, a=21 (single-ring cell planning with 21 cells), b=6 and c=5 (to maximize the range of cyclic shifts); (3) L_Gold=127, a=57 (double-ring cell planning with 57 cells), b=1 and c=1 (to minimize the range of cyclic shifts); (4) L_Gold=127, a=57 (double-ring cell planning with 57 cells), b=2 and c=8 (to maximize the range of cyclic shifts); (5) L_Gold=127, a=127 (using the maximum number of sequences for one M-sequence), b=1 (only choice to be compatible with a) and c=1 (to minimize the range of cyclic shifts); and (6) L_Gold=127, a=127 (using the maximum number of sequences for one M-sequence), b=1 (only choice to be compatible with a) and c=126 (to maximize the range of cyclic shifts).

In another example, the information carried by WUS is cell ID (or part of cell ID) and timing information ($0 \leq I\_t \leq N\_t$). E.g. I_t=n_subframe mod N_t, where N_t is total number of timing indices and can be 2 or 4 or 6 or 8. For one sub-example, the first M-sequence carries part of the cell ID information, and the second M-sequence carries the remaining part of cell ID information carried by WUS together with timing information: I_info^M1=(N_ID^cell mod L_Gold), and I_info^M2=a*⌊N_ID^cell/L_Gold⌋+b*I_t, where a and b are constants and a=⌊L_Gold/(504/L_Gold)⌋ and b=1 for example.

For another sub-example, the first M-sequence carries part of the cell ID information, and the second M-sequence carries the timing information: I_info^M1=(N_ID^cell mod L_Gold), and I_info^M2=a*I_t, where a is a constant and a=⌊L_Gold/N_t⌋ for example.

In yet another example, the information carried by WUS is cell ID (or part of cell ID) and UE group ID (or part of UE group ID). For one sub-example, the first M-sequence carries part of the cell ID information, and the second M-sequence carries the remaining part of cell ID information carried by WUS together with UE group ID: I_info^M1=(N_ID^cell mod L_Gold), and I_info^M2=a*⌊N_ID^cell/L_Gold⌋+b*N_ID^UEgroup, where a and b are constants and a=⌊L_Gold/(504/L_Gold)⌋ and b=1 for example.

For another sub-example, the first M-sequence carries part of the cell ID information, and the second M-sequence carries the UE group ID: I_info^M1=(N_ID^cell mod L_Gold), and I_info^M2=a*N_ID^UEgroup, where a is a constant and a=⌊L_Gold/N_UEgroup⌋ for example.

In yet another example, the information carried by WUS is cell ID (or part of cell ID) and UE group ID (or part of UE group ID) and timing info. For one sub-example, the first M-sequence carries part of the cell ID information, and the second M-sequence carries the remaining part of cell ID information carried by WUS together with timing information and UE group ID: I_info^M1=(N_ID^cell mod L_Gold), and I_info^M2=a*⌊N_ID^cell/L_Gold⌋+b*N_ID^UEgroup+c*I_t, where a and b and c are constants and a=⌊L_Gold/(504/L_Gold)⌋ and b=N_t and c=1 for example.

For another sub-example, the first M-sequence carries part of the cell ID information, and the second M-sequence carries the timing information and UE group ID" I_info^M1=(N_ID^cell mod L_Gold), and I_info^M2=a*N_ID^UEgroup+b*I_t, where a and b are constants and a=⌊L_Gold/N_UEgroup⌋ and b=1 for example.

If L_Gold=127, the generation scheme (or equivalently the generating polynomial) for the two M-sequences generating Gold-sequence d_M1(i) and d_M2(i) can be from two of the construction schemes in TABLE 1, with proper initial condition e.g. $d_M(0)=d_M(1)=d_M(2)=d_M(3)=d_M(4)=d_M(5)=0$, $d_M(6)=1$, for both of the M-sequences, or $d_M(1)=d_M(2)=d_M(3)=d_M(4)=d_M(5)=d_M(6)=0$, $d_M(0)=1$, for both of the M-sequences, if cyclic shift is utilized for indicating information (otherwise, the initial condition may carry the corresponding information).

For example, the polynomial for generating the M-sequences can be $x^7+x+1$ for d_M1(i) and $x^7+x^4+1$ for d_M2(i).

For another example, the polynomial for generating the M-sequences can be $x^7+x^3+1$ for d_M1(i) and $x^7+x^4+1$ for d_M2(i).

For yet another example, the polynomial for generating the M-sequences can be $x^7+x+1$ for d_M1(i) and $x^7+x^6+1$ for d_M2(i).

To assist cell search and synchronization, a cell transmits synchronization signals such as a primary synchronization signal (PSS) and a secondary synchronization signal (SSS).

In LTE, the functionality of PSS is to provide coarse time domain and frequency domain synchronization, as well as part of the physical cell ID detection. The PSS is constructed from a frequency-domain Zadoff-Chu (ZC) sequence of length 63, with the middle element truncated to avoid using the d.c. subcarrier. 3 roots are selected for PSS to represent the 3 physical layer identities within each group of cells. The PSS is transmitted in the central 6 Resource Blocks (RBs), invariant to the system bandwidth to enable the UE to synchronize without a priori information of the system bandwidth.

In LTE, the functionality of SSS sequence is to detect the other part of cell ID based on the coarse time-domain and frequency-domain synchronization detection from PSS. CP size and duplexing mode information are also detected by SSS sequence and the SSS sequence relative position to PSS. The construction of SSS sequences are based on the maximum length sequences (also known as M-sequences). Each SSS sequence is constructed by interleaving two length-31 BPSK modulated subsequences in frequency domain, where the two subsequences are constructed from the same M-sequence using different cyclic shifts. The cyclic shift indices for both parts are functions of the physical cell ID group.

Figure 9:
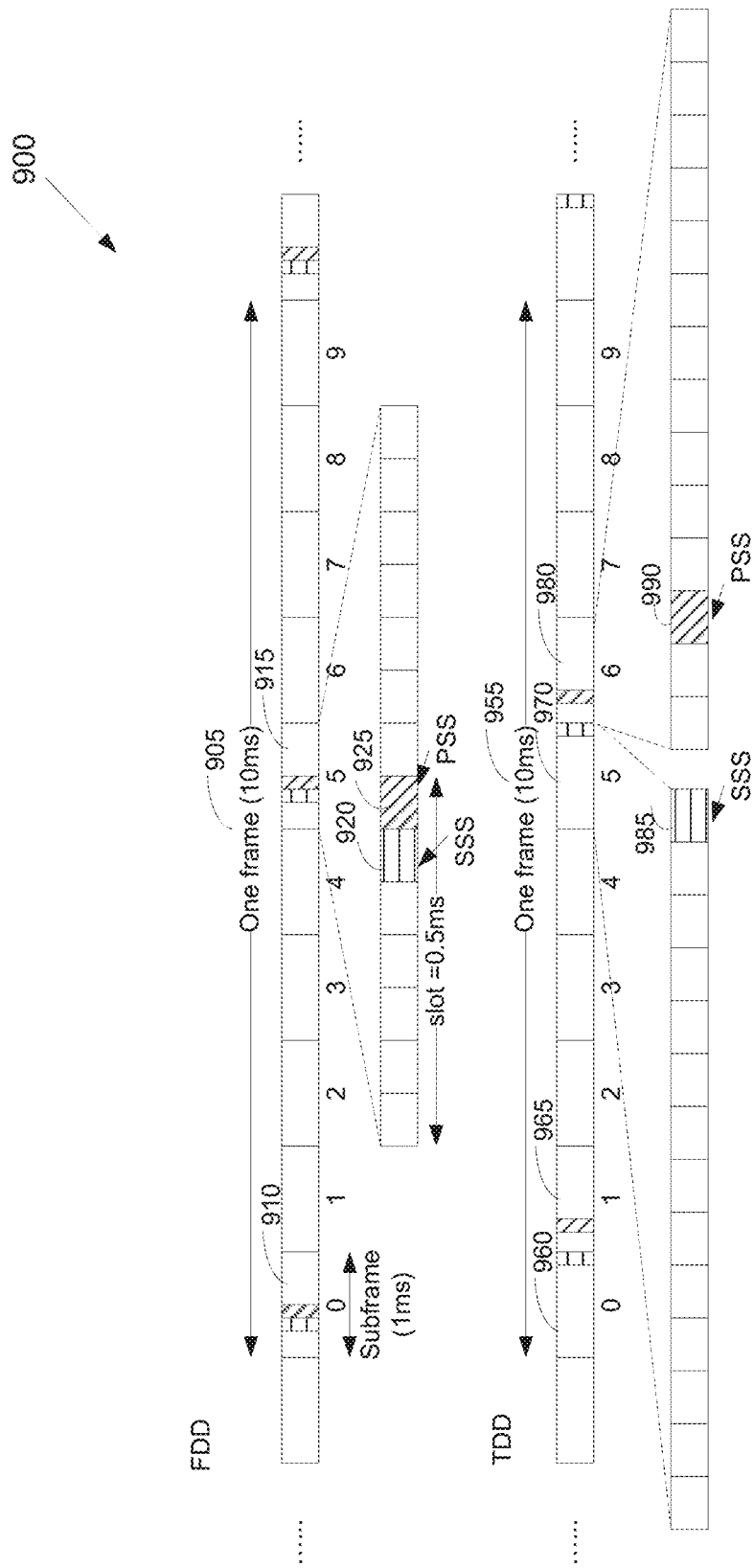
FIG. 9 illustrates an example time domain positions for the mapping of PSS/SSS for FDD and TDD according to embodiments of the present disclosure.

FIG. 9 illustrates an example time domain positions 900 for the mapping of PSS/SSS for FDD and TDD according to embodiments of the present disclosure. The embodiment of the time domain positions 900 illustrated in FIG. 9 is for illustration only. FIG. 9 does not limit the scope of this disclosure to any particular implementation.

Referring to FIG. 9, in case of FDD, in every frame (905), a PSS (925) is transmitted within a last symbol of a first slot of subframes 0 and 5 (910 and 915), wherein a subframe includes two slots. An SSS (920) is transmitted within a second last symbol of a same slot. In case of TDD, in every frame (955), a PSS (990) is transmitted within a third symbol of subframes 1 and 6 (965 and 980), while an (SSS) 985 is transmitted in a last symbol of subframes 0 and 5 (960 and 970). The difference allows for the detection of the duplex scheme on a cell. The resource elements for PSS and SSS are not available for transmission of any other type of DL signals.

Machine-type communications (MTC) through cellular networks is emerging as a significant opportunity for new applications in a networked world where devices communicate with humans and with each other. Compared to typical human communication, MTC typically has relaxed latency and quality of service (QoS) requirements and often does not require mobility support. MTC can be used for a wide variety of applications in different sectors including healthcare such as monitors, industrial, such as safety and security, energy, such as meters and turbines, transport, such as fleet management and tolls, and consumer and home, such as appliances and power systems.

An important requirement for commercial success of MTC is for respective UEs to have low power consumption and a significantly lower cost than conventional UEs serving human communications. Cost reduction for low cost UEs (LC-UEs) relative to conventional UEs can be achieved, among other simplifications, by constraining a transmission BW and a reception BW to a small value, such as 6 RBs, of an UL system BW or a DL system BW, respectively, by reducing a size of a data TB a LC-UE transmit or receive, or by implementing one receiver antenna instead of the two receiver antennas that are implemented for conventional UEs.

LC-UEs can be installed in basements of residential buildings or, generally, in locations where a LC-UE experiences a large path-loss loss and poor coverage due to a low signal to noise and interference ratio (SINR). LC-UE design selections of one receiver antenna and reduced maximum power amplifier gain can also result to coverage loss even when a LC-UE does not experience a large path-loss. Due to such reasons, a LC-UE can require operation with enhanced coverage.

In extreme poor coverage scenarios, LC-UEs may have characteristics such as very low data rate, greater delay tolerance, and limited mobility, thereby potentially being capable to operate without some messages/channels. Not all LC-UEs require coverage enhancement (CE) or require a same amount of CE. In addition, in different deployment scenarios, a required CE level can be different for different eNBs, for example depending on an eNB transmission power or an associated cell size or number of receiver antennas, as well as for different LC-UEs, for example depending on a location of a LC-UE.

A conventional way to support CE is to repeat transmissions of channels either in a time domain or in a frequency domain. A LC-UE operating with CE can be configured by a serving ENB with one or more CE levels corresponding to a number of SFs for transmission or reception of a respective channel. For example, a LC-UE can be configured by an eNB a first number of SFs to receive repetitions of a PDSCH, a second number of SFs to transmit repetitions of a PUSCH, and so on. A DL control channel for a LC-UE is assumed to be based on the EPDCCH structure and will be referred to as M-PDCCH. In order to minimize a number of SFs that a LC-UE needs to receive a PDSCH or an M-PDCCH, respective transmissions can be over all RBs the LC-UE can receive in a SF, such as in a sub-band of 6 contiguous RBs, as the eNB is assumed to not be power limited. Conversely, as a LC-UE configured to transmit an UL channel with repetitions is assumed to already transmit with a maximum power then, in order to maximize the power spectral density, the LC-UE can transmit in 1 RB in a SF.

Further, in order to improve frequency diversity for a transmission, frequency hopping can apply where, for example, a first number of repetitions for the transmission are in a first sub-band and a second number of repetitions for the transmission is in a second sub-band. As the sub-bands can correspond to different sets of 6 contiguous RBs, transmission with frequency hopping requires a LC-UE to re-tune the LC-UE's radio-frequency (RF) to each respective sub-band and this re-tuning introduces a delay that can range from a fraction of a SF symbol to one SF, depending on the implementation. During a RF re-tuning period, a LC-UE is not expected to be capable of transmitting or receiving.

An MIB for LC-UEs is referred to as LC-MIB as the MIB can utilize spare bits of an existing MIB to provide scheduling information for an LC-SIB-1 transmission. As a LC-UE is no aware of the UL/DL configuration in case of a TDD system or, in general, of ABS or MBSFN SF's when the LC-UE needs to detect the LC-MIB, a LC-MIB transmission needs to occur only in SFs that are guaranteed to be DL SFs regardless of the UL/DL configuration or of the presence of ABS or MBSFN SFs. For LC-MIB transmission, a LC-UE can assume that a conventional DL control region always spans 3 SF symbols. This represents a maximum number of SF symbols for the conventional DL control region for all DL system BWs except for small DL system BWs (see also REF 1). However, for small DL system BWs, as only limited DL scheduling (if any) can exist n SFs with LC-MIB transmission, 3 SF symbols are adequate for the conventional DL control region imposing adverse scheduling restrictions.

Figure 10A:
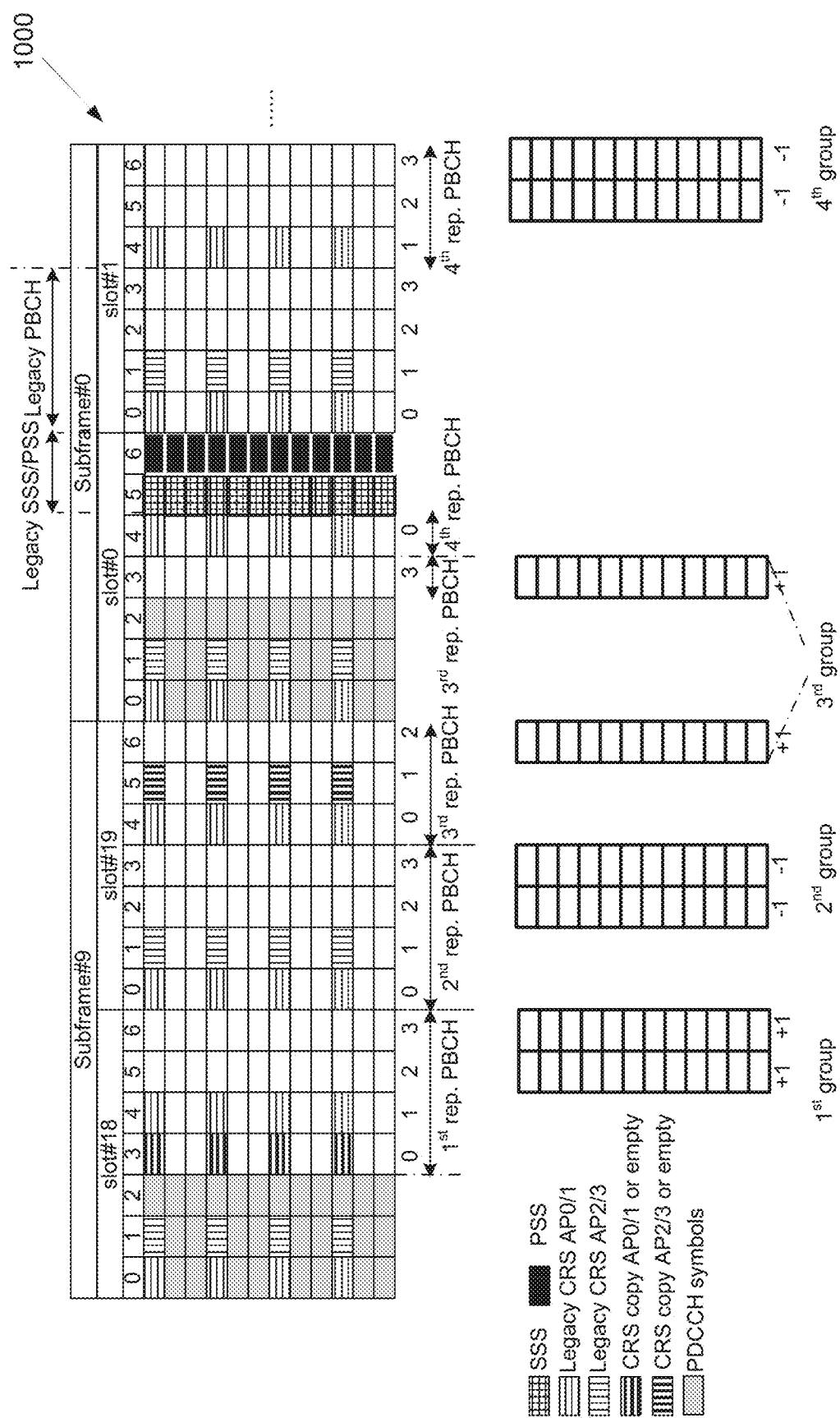
FIG. 10A illustrates an example transmission of an LC-MIB with repetitions continuously in SF#0 and intermittently in SF#5 in a FDD system with a frame structure using normal CP according to embodiments of the present disclosure.

FIG. 10A illustrates an example transmission 1000 of an LC-MIB with repetitions continuously in SF#0 and intermittently in SF#5 in a FDD system with a frame structure using normal CP according to embodiments of the present disclosure. The embodiment of the transmission 1000 illustrated in FIG. 10A is for illustration only. FIG. 10A does not limit the scope of this disclosure to any particular implementation.

Figure 10B:
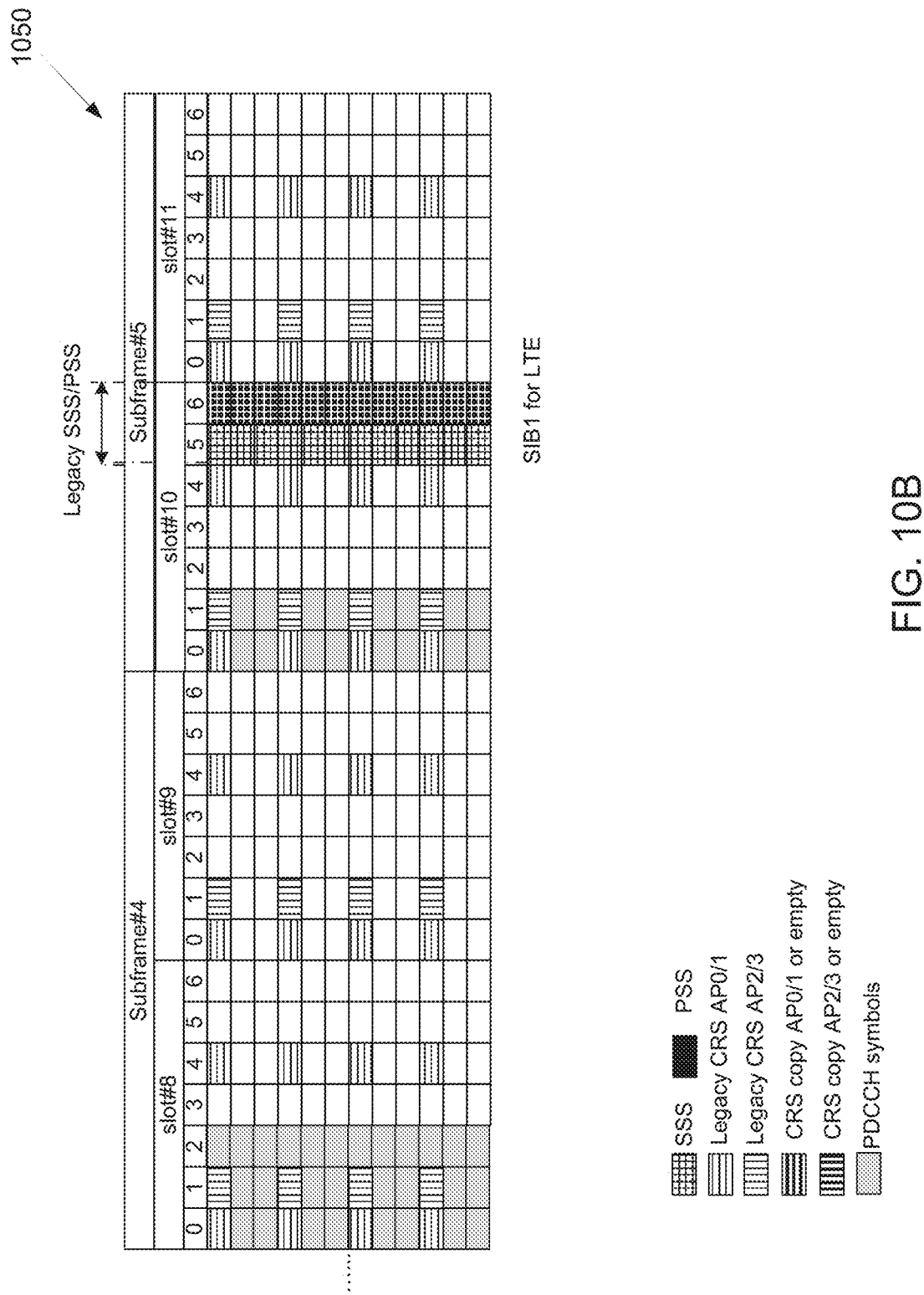
FIG. 10B illustrates another example transmission of an LC-MIB with repetitions continuously in SF#0 and intermittently in SF#5 in a FDD system with a frame structure using normal CP according to embodiments of the present disclosure.

FIG. 10B illustrates another example transmission 1050 of an LC-MIB with repetitions continuously in SF#0 and intermittently in SF#5 in a FDD system with a frame structure using normal CP according to embodiments of the present disclosure. The embodiment of the transmission 1050 illustrated in FIG. 10B is for illustration only. FIG. 10B does not limit the scope of this disclosure to any particular implementation.

FIG. 10A and FIG. 10B illustrate a transmission of an LC-MIB with repetitions continuously in SF#0 and intermittently in SF#5 in a FDD system with a frame structure using normal CP. The MIB repetitions for LC-MIB with $1^{st}$, $2^{nd}$, $3^{rd}$ and $4^{th}$ PBCH repeated symbols are also shown in FIG. 10A and FIG. 10B. The SF#9 (subframe#9) includes the $1^{st}$ and $2^{nd}$ PBCH repetition and part of $3^{rd}$ PBH repetition and the SF#0 includes the remaining of $3^{rd}$ PBCH and the PBCH repetition. Among the 4 symbols in each PBCH repetition, the $0^{th}$ PBCH symbol and $1^{st}$ PBCH symbol in each PBCH repetition include the CRS REs, which will be used for legacy MTC UEs as well as other non-MTC UEs for cell-specific channel estimation and RRM measurement, which cannot be overlapped with additional signals.

Figure 11A:
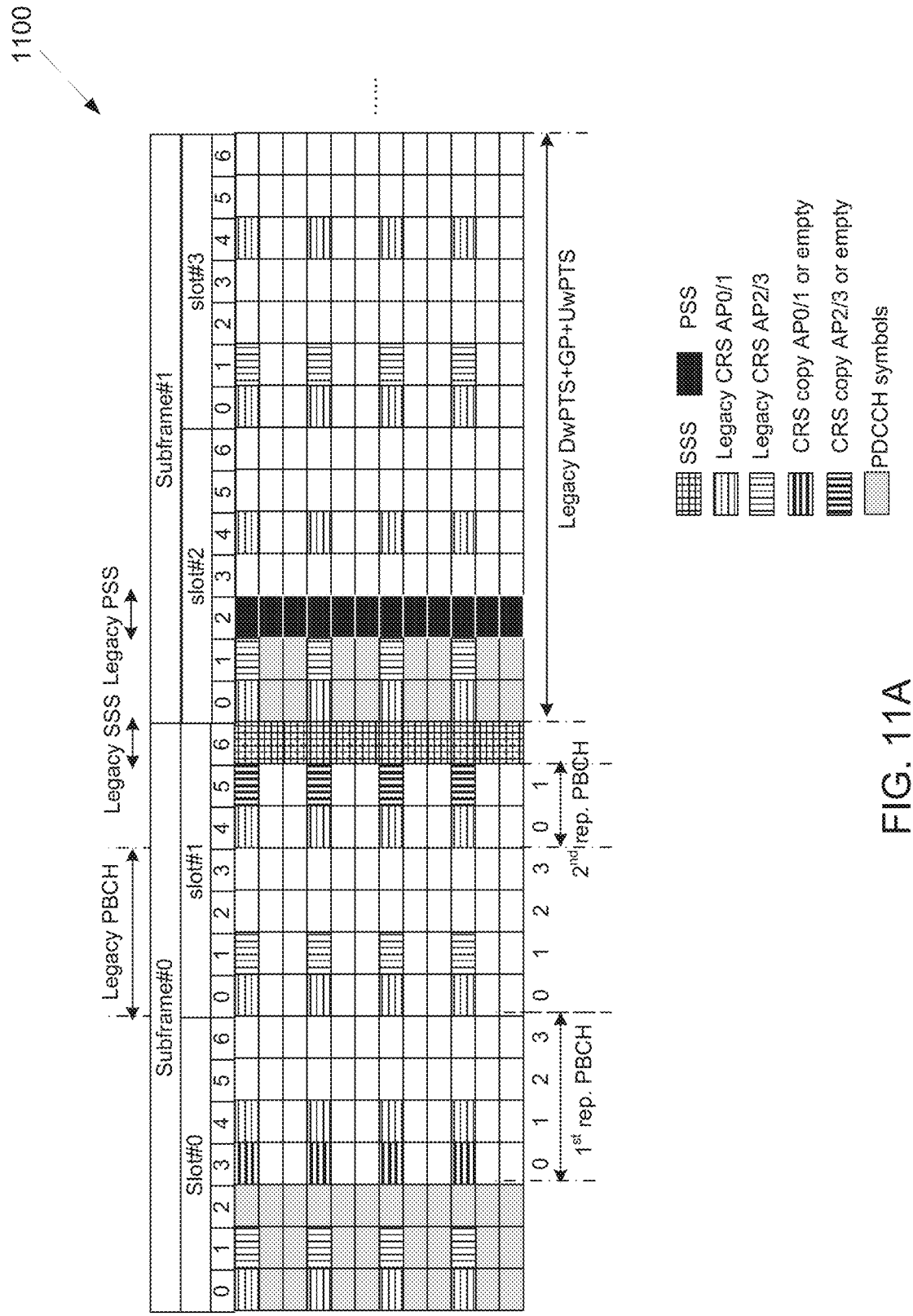
FIG. 11A illustrates an example transmission of an LC-MIB with repetitions continuously in SF#0 and intermittently in SF#5 in a TDD system with a frame structure using normal CP according to embodiments of the present disclosure.

FIG. 11A illustrates an example transmission 1100 of an LC-MIB with repetitions continuously in SF#0 and intermittently in SF#5 in a TDD system with a frame structure using normal CP according to embodiments of the present disclosure. The embodiment of the transmission 1100 illustrated in FIG. 11A is for illustration only. FIG. 11A does not limit the scope of this disclosure to any particular implementation.

Figure 11B:
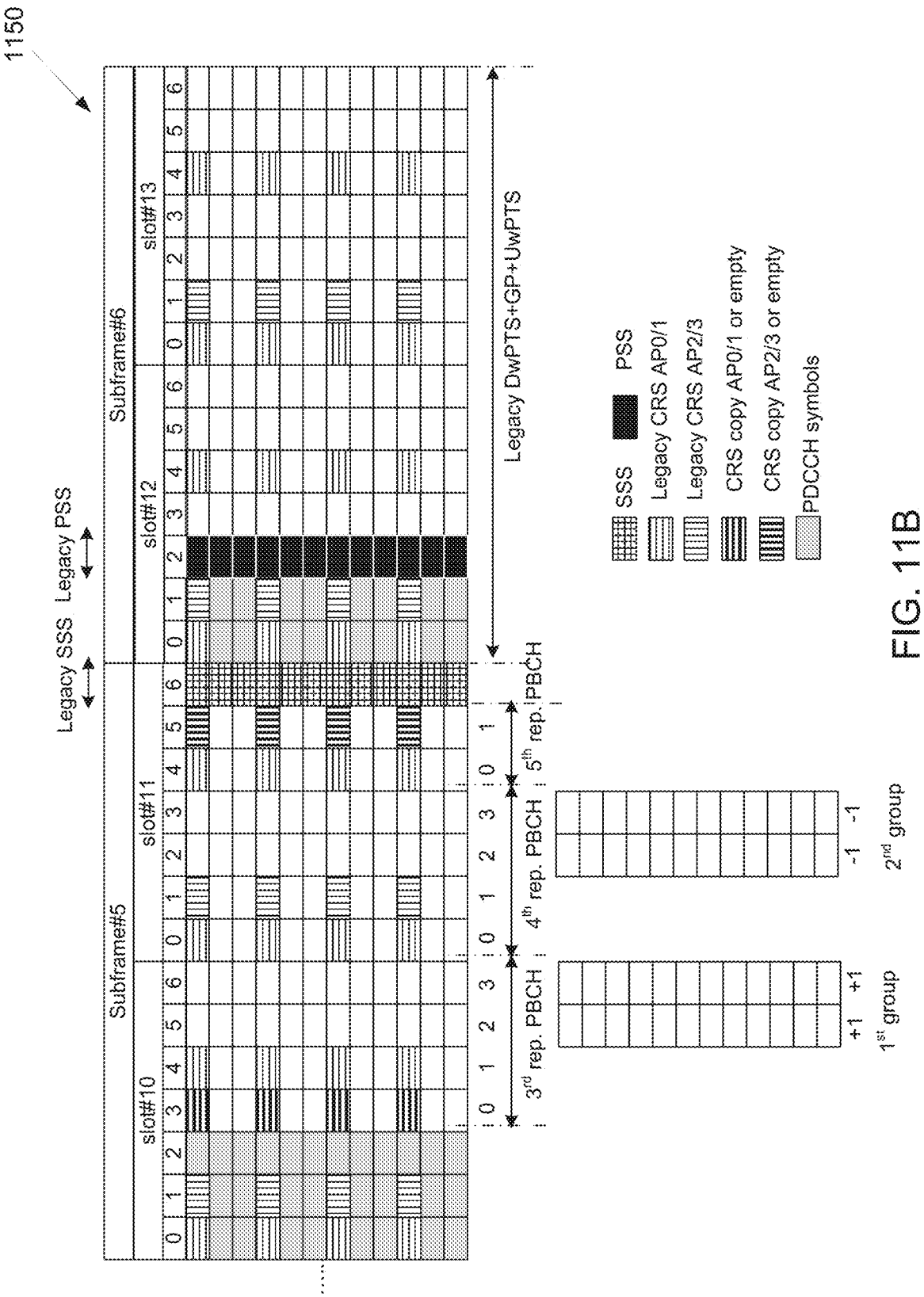
FIG. 11B illustrates another example transmission of an LC-MIB with repetitions continuously in SF#0 and intermittently in SF#5 in a TDD system with a frame structure using normal CP according to embodiments of the present disclosure.

FIG. 11B illustrates another example transmission 1150 of an LC-MIB with repetitions continuously in SF#0 and intermittently in SF#5 in a TDD system with a frame structure using normal CP according to embodiments of the present disclosure. The embodiment of the transmission 1150 illustrated in FIG. 11B is for illustration only. FIG. 11B does not limit the scope of this disclosure to any particular implementation.

FIG. 11A and FIG. 11B illustrate a transmission of a LC-MIB with repetitions continuously in SF#0 and intermittently in SF#5 in a TDD system with a frame structure using normal CP. The MIB repetitions for LC-MIB with $1^{st}$, $3^{rd}$, $4^{th}$ and $5^{th}$ PBCH repeated symbols are also shown in FIG. 3 But only the $3^{rd}$ and $4^{th}$ PBCH repetitions include the $2^{nd}$ and $3^{rd}$ PBCH symbols. The SF#0 (subframe#0) includes the $1^{st}$ PBCH repetition and the SF#5 includes the $3^{rd}$ PBCH repetition the $4^{th}$ PBCH repetition. Among the 4 symbols in each PBCH repetition, the $0^{th}$ PBCH symbol and $1^{st}$ PBCH symbol in each PBCH repetition include the CRS REs, which will be used for legacy MTC I.JEs as well as other non-MTC UEs for cell-specific channel estimation and RRM measurement, which cannot be overlapped with additional signals.

LC-UEs target 20 dB improved coverage using very low rate traffic with related latency requirement. The coverage for legacy LTE PSS/SSS needs to be improved 11.4 dB for FDD and 17.4 dB for TDD in order to achieve an overall coverage enhancement target of 20 dB. For normal LTE, the SCH operating point for an FDD system is at −7.8 dB. Additional 11.4 dB is needed for coverage enhancement, resulting in the required operating point of −19.2 dB. Therefore, there is a need to enable additional transmission of re-synchronization signal (RSS) to improve the synchronization latency for LC-UEs.

The present disclosure p the sequence design for generating Re-synchronization signal (RSS) for even further enhanced MTC system. The following designs are included in the present disclosure: configuration; construct unit of one symbol (e.g., one-level cover code and d cover codes); construct unit of one subframe (e.g., without cover code, with cover code per subframe, with cover code per RB, and with Cover codes per RB and subframe).

Component V: Configuration.

In one embodiment, the information carried in RSS. RSS carries at least cell ID, N^cell_ID. The entire cell ID might be divided into several parts, and carried by different components of RSS (e.g. RSS sequence and/or mapping pattern of RSS sequence). The partial cell ID, I^Part_ID, can be in any of the following formats.

In one embodiment, I^Part_ID=floor(N^cell_ID/a_ID), where a_ID is a positive constant integer, e.g. a_ID=3 (note that when a_ID=3, I^Part_ID is the same as N_ID^(1)), or a_ID=168.

In another embodiment, I^Part_ID=mod(N^cell_ID, a_ID), where a_ID is a positive constant integer, e.g. a_ID=3 (note that when a_ID=3, I^Part_ID is the same as N_ID^(2)), or a_ID=168.

In yet another embodiment, I^Part_ID is full cell ID, i.e., I^Part_ID=N^cell_ID.

In another embodiment, the bandwidth of RSS in the unit of RB, N^RB, is determined as following. In one example, N^RB=2. In another example, N^RB=6.

The start RB of RSS in associated narrowband of 6 RBs, 0<=I_startRB <6 can be determined as follow.

In one embodiment, I_startRB carries part of the cell ID information, I^Part_ID. In one example, I_startRB=b_RB*floor(I^Part_ID/a_RBd_RSS)+c_RB, where a_RB, b_RB, and c_RB are constant integers. E.g. a_RB=168, b_RB=2, c_RB=0. In another example, I_startRB =b_RB*mod(I^Part_ID, a_RB)+c_RB, where a_RB, b_RB, and c_RB are constant integers. E.g. a_RB=3, b_RB=2, c_RB=0. In yet another example, I_startRB=a_RB*I^Part_ID+b_RB, where a_RB, and b_RB are constant integers. E.g. a_RB=2, b_RB=0.

In another embodiment, I_startRB is a fixed and pre-defined in specification. In one example, I_startRB=0, and RSS starts at the beginning of associated narrowband. In another example, I_startRB=4, RSS starts at the end of associated narrowband. In another example, I_startRB=2, RSS is located in the middle of associated narrowband.

In yet another embodiment, I_startRB is configurable from a list of values. In one example, the list can be {0, 2, 4} in term of PRBs within the associated narrowband.

One or multiple transmit diversity schemes in below can be adopted to improve RSS detection performance.

In one embodiment, power boosting can be adopted to enhance detection performance. When the RSS sequence is not mapped to all the REs of the narrowband (e.g. 6 PRBs), power boosting can be considered to improve the detection performance. For example, when RSS sequence is only mapped to the N_RE^RSS_REs within the 72 REs, a power boosting factor of (72/N_RE^RSS_REs)^0.5 can be performed to the REs containing RSS sequence.

In another embodiment, the antenna port for RSS is switched every N^antSwitch_SF subframes, E.g. N^antSwitch_SF =2.

In yet another embodiment, frequency hopping can be adopted on RSS, when the bandwidth of RSS is less than 6 RBs (e.g. N^RB<6), and RSS is configured over multiple subframes (e.g. N_SFs>1). The start RB within the associated narrowband at subframe index, n_sf, can be determined as: I_startRB=mod(n_sf, N_SFs)*a_step+a_0, where a_step and a_0 are constant integers. E.g. a_0=0, a_step=2.

Component VI: Construct Unit of One Symbol.

In this component, the RSS in the frequency domain can be constructed from base sequence of one symbol, and extended into N^SF_symbs, symbols per subframe and N_SFs subframes. The construct unit of one symbol occupies N^RB contiguous RBs in the associated narrowband with start RB, I_startRB (0<=I_startRB<6). E.g N^RB=2.

The RSS at symbol index n_symb and subframe index n_sf, d_RSS(n), is constructed in the frequency domain according to: d_RSS(n)=b(n)*c(n_symb, n_sf), n=0, . . . , N^RE-1; and n_symb=0, . . . , N^SF_symbs-1, n_sf= 0, . . . , N_SFs-1 where b(n) is the base sequence, c(n_symb, n_sf) is the cover code that creates variance over time in both symbol level and/or subframe level.

N^RE is number of available REs per symbol mapped for RSS. In one embodiment, N^RE=12*N^RB−N^RE_CRS, which excludes REs reserved for CRS. In another embodiment, N^RE=12*N^RB, which does not exclude REs reserved for CRS.

The base sequence b(n) can be determined as follow. In one embodiment, the base sequence, b(n), can be generated from ZC-sequence in the length of N^ZC. E.g. Z^ZC=23 (e.g. for N^RB=2). More specifically, b(n)=exp(−jπun'(n'+1)/N^ZC), where n'=mod(n, N^ZC), and u is the root of ZC-sequence (0<u<N^ZC), which can be used to carry part of the Cell ID information, e.g. I^Part_ID (see Component V). In one example, u=b_RSS*mod(I^Part_ID, a_RSS)+ c_RSS, where a_RSS, b_RSS, and c_RSS are constant integers. E.g. a_RSS=22, b_RSS=1, c_RSS=1. In another example, u=b_RSS*floor(I^Part_ID/a_RSS)+c_RSS, where a_RSS, b_RSS, and c_RSS are constant integers. E.g. a_RSS=8, b_RSS=1, c_RSS=1.

In another embodiment, the base sequence, b(n), can be generated from M-sequence in length of N^M. E.g. N^M=15. More specifically, $$\begin{cases} b(n) = 1 - 2*s'(n'), \\ n' = \mod(n, N^\wedge M), \\ s'(n') = s(\mod(n' + m0, N^\wedge M)), \end{cases}$$

where, the M-sequence, s(i), can be generated from one of the construction schemes in TABLE 1 (for N^M=15), with proper initial condition e.g. $s_M(0)=s_M(1)=s_M(2)=0$, $s_M(3)=1$. The cyclic shift, m (0<=m0<N^M), can be used to carry part of the Cell ID, I^Part_ID (see Component V).

In another example, m0=b_RSS*mod(I^Part_ID, a_RSS)+c_RSS, where a_RSS, b_RSS, and c_RSS are constant integers. E.g. a_RSS=15, b_RSS=1, c_RSS=0.

In one example, m0=b_RSS*floor(I^Part_ID/a_RSS)+ c_RSS, where a_RSS, b_RSS, and c_RSS are constant integers. E.g. a_RSS=12, b_RSS=1, c_RSS=0.

TBALE 1

| | Construction scheme | |
|---|---|---|
| No. | Recursive construction scheme | Corresponding polynomial |
| 1 | $s_M(i + 4) = [s_M(i + 1) + s_M(i)] \mod 2$, 0 < = i < = 10 | $x^4 + x^1 + 1$ |
| 2 | $s_M(i + 4) = [s_M(i + 3) + s_M(i)] \mod 2$, 0 < = i < = 10 | $x^4 + x^3 + 1$ |

Component VI.A: Two Level Cover Codes.

In this sub-component, the cover code, c(n_symb, n_sf), is constructed in two levels. In this case, cover code in symbol level and subframe level are mapped independently/ separately by c1(n_symb) and c2(n_sf), respectively. More specifically, c(n_symb, n_sf)=c1(n_symb)*c2(n_sf), n_symb=0, ..., N^SF_symbs-1, k=0, ... N_SFs-1.

The first cover code, c1 (n_symb), which is mapped in symbol level or across N_symbs symbols within subframe, can be generated from one of the following options.

In one embodiment, c1(n_symb) is constructed as complex value, and carry part of cell ID, I^Part_ID (see Component V), according to $$c1(\text{n\_symb}) = \exp(-j*2*pi*\theta),$$
$$\theta = \frac{1}{K0}*\text{mod}\left(\left(\left\lfloor\frac{I_{ID}^{Part}}{K1}\right\rfloor*K2+1\right)*(\text{n\_symb}*K3+1), K0\right)$$

where, K0, K1, K2, and K3 are constant integers. E.g. K0=11, K1=3, K2=1, K3=1.

In another embodiment, c1(n_symb) is constructed as complex value and carry part of cell ID, I^Part_ID (see Component V), according to $$c1(1) = \exp(-j*2*pi*\theta),$$
$$\theta = \frac{1}{K0}*\text{mod}\left(\left(\left\lfloor\frac{I_{ID}^{Part}}{K1}\right\rfloor*K2+\text{n\_symb}*K3\right), K0\right)$$

where, K0, K1, K2, and K3 are constant integers. E.g. K0=11, K1=3, K2=1, K3=1.

In another embodiment, c1(n_symb) is constructed as complex value according to $$c1(\text{n\_symb}) = \exp(-j*2*pi*\theta), \theta = \frac{1}{K0}*\text{mod}(\text{n\_symb}*K1+K2, K0)$$

where, K0, K1, and K2 are constant integers. E.g. K0=11, K1=1, K2=0.

In one embodiment, c1(n_symb) is constructed from BPSK modulated M-sequence in length of 15, according to c1(n_symb)=1-2*s'(i), i=mod(n_symb*K0+K1, 15), s'(i)=s (mod(i+m1,15)) where, s(i) can be generated from one of the construction schemes in Table 1, with proper initial condition e.g. $s_M(0)=s_M(1)=s_M(2)=s_M(3)=0, s_M(4)=1$. K0 and K2 are constant integer, e.g. K0=1, K1=0.

In one example, the cyclic shift m1 can be utilized to carry part of the cell ID, I^Part_ID (see Component V). E.g. m1=mod(I^Part_ID, 15). In another example, the cyclic shift m1 is a constant integer. E.g. m1=0. In another embodiment, c1(n_symb)=[1 1 1 1 −1 −1 1 1 1 −1 1], similarly as NPSSS.

The second cover code, c2(n_sf), which is mapped in subframe level or across N_SFs subframes, can be generated from one of the following options. In one embodiment, c2(n_sf), alternates every K_sf subframes. E.g. K_sf=2. In one example, c2(n_sf)=exp(−j*2*pi*θ), θ=k'/K_sf, k'=mod (n_sf, K_sf). In one example, c2(n_sf)=exp(−j*(2*pi*θ+pi/2)), θ=k'/K_sf, k'=mod(n_sf, K_sf). In one example, c2(n_sf)=exp(j*2*pi*θ), θ=k'/K_sf, k'=mod(n_sf, K_sf). In one example, c2(n_sf)=exp(j*(2*pi*θ+pi/2)), θ=k'/K_sf, k'=mod(n_sf, K_sf).

Component VI.B: One Level Cover Code.

In this sub-component, the cover code, c(n_symb, n_sf), is constructed from a single sequence, c0(i), with length of N_c0. The cover code is mapped over symbols across all subframes within transmission duration. More specifically, c(n_symb, n_sf)=c0(mod(i, N_c0)), i=K2*mod(n_sf, K1)+n_symb where K1 and K2 are constant integers. E.g K1=2, K2=11. E.g K1=2, K2=14.

In one embodiment, for the length of cover code, N_c0, N_c0=2^n−1, where n is largest positive constant integer satisfying 2^n−1<=K1*N^SF_symbs. In another embodiment, for the length of cover code, N_c0=K1*N^SF_symbs.

The base sequence of cover code, c0(i), can be generated from schemes as follows. In one embodiment, c0(i) is BPSK modulated M-sequence with cyclic shift m1. More specifically, c(i)=1−2*c'(mod(i+m1, N_c0)), i=0, ..., N_c0-1. In such embodiment, for the length of cover code, N_c0: in one example, N_c0=15. E.g. c'(i) can be constructed with generator polynomial $x^4+x+1$; in another example, N_c0=31. E.g. c'(i) can be constructed with generator polynomial $x^5+x^2+1$; and in yet another example, N_c0=63. E.g. c'(i) can be constructed with generator polynomial $x^6+x+1$. In such embodiment, for the cyclic shift m1: in one example, cover code does not carry cell ID information, m1=0; and in another example, m1 carries part of cell ID, I^Part_ID (see Component V). E.g. m1=mod(I^Part_ID, N_c0).

In another embodiment, c0(i) is BPSK modulated gold-sequence. More specifically, c(i)=(1−2*c'_1(mod(i+m1, N_c0)))(1−2*c'_2(mod(i+m2,N_c0))), i=0, ..., N_c0-1. In such embodiment, for the length of cover code, N_c0: in one example, N_c0=31. E.g. c'_1(i) and c'_2(i) can be constructed with generator polynomial $x^5+x^2+1$ and $x^5+x^4+x^3+x^2+1$, respectively; and in another example, N_c0=63. E.g. c'_1(i) and c'_2(i) can be constructed with generator polynomial $x^6+x+1$ and $x^6+x^5+x^2+x+1$, respectively.

In such embodiment, for the cyclic shifts, m1 and m2: in one example, cover code does not carry cell ID information, m1=0, m2=0; and in another example, cover code carries part of cell ID, I^Part_ID (see Component V). E.g. m1=mod (I^Part_ID, N_c0), m2=a*floor(I^Part_ID/N_c0), where a is constant integer.

In yet another embodiment, c0(i) is constructed as complex value according to c1(i)=exp(−j*2*pi*θ), i=0, ..., N_c0-1. In such embodiment: in one example, θ can be used to carry part of cell ID, I^Part_ID (see Component V); in one sub-example, $$\theta = \frac{1}{a}*\text{mod}\left(\left(\left\lfloor\frac{I_{ID}^{Part}}{K1}\right\rfloor*b+1\right)*(i+1), a\right),$$

where, a and b are constant integers. E.g. a=11, b=1; in another sub-example, $$\theta = \frac{1}{a}*\text{mod}\left(\left(\left\lfloor\frac{I_{ID}^{Part}}{N_{c0}}\right\rfloor*b+1\right), a\right),$$

where a and b are constant integers. E.g a=11, b=1; and in another example, θ is independent from cell ID. In one sub-example, $$\theta = \frac{1}{a}*\text{mod}(i, a),$$

where a is constant integer. E.g. a=22.

Component VII: Construct Unit of One Subframe.

In this component, RSS can be constructed from base sequence with duration of 1 subframe (e.g. 11 symbols by reserving 3 symbols for PDCCH within a subframe), b(n) with length of N^RE, where N^RE is number of available REs per subframe with configured bandwidth N^RB. In one embodiment, for the length of base sequence, N^RE, N^RE=(12*11−N^RE_CRS)*N^SF_RB, where 1<=N^SF_RB<=N^RB, and N^RE_CRS is the REs reserved for CRS per PRB. In another embodiment, for the length of base sequence, N^RE, N^RE=12*11*N^SF_RB, where 1<=N^SF_RB <=N^RB.

In one embodiment, for the mapping pattern, when N^SF_RB=N^RB, d_RSS(n) is first mapped into frequency domain over entire bandwidth of N^RB RBs, and then mapped into time domain across symbols over the entire configured duration of N_SFs subframes.

In another embodiment, for the mapping pattern, when N^SF_RB<N^RB, d_RSS(n) is first mapped into frequency domain within one RB, and then mapped into time domain across symbols over the entire configured duration of N_SFs subframes, and lastly repeated over entire bandwidth N^RB.

The base sequence b(n) can be determined as follow. In one embodiment, the base sequence, b(n), can be generated from ZC-sequence in the length of N^ZC . . . . More specifically, b(n)=exp(−jπun'(n'+1)/N^ZC), where n'=mod (n, N^ZC), and u is the root (0<u<N^ZC). In such embodiment, for the length of ZC sequence, N^ZC: in one example, N^ZC can be 263; and in another example, N^ZC can be 131.

The root u can be used to carry part of the Cell ID, I^Part_ID (see Component V). In one example, u=b_RSS*mod(I^Part_ID, a_RSS)+c_RSS, where a_RSS, b_RSS, and c_RSS are constant integers. E.g. a_RSS=168, b_RSS=1, c_RSS=1. In another example, u=b_RSS*floor (I^Part_ID/a_RSS)+c_RSS, where a_RSS, b_RSS, and c_RSS are constant integers. E.g. a_RSS=3, b_RSS=1, c_RSS=1.

In another embodiment, the base sequence, b(n), can be generated from M-sequence in the length of N^M. More specifically, b(n)=1−2*s(mod(n+m0, N^M)). Denote the generator of the M-sequences constructing the can be determined based on the sequence length N^M, and with a predefined initial condition. In such embodiment, for the generator and length of M-sequence, N^M: in one example, N^M=255,The M-sequence, s(i), can be from one of the construction schemes in TABLE 2. E.g. scheme 1, with generator polynomial $x^8+x^4+x^3+x^2+1$ and initial condition [0 0 0 0 0 0 0 1]; and In another example, N^M=127. E.g. the M-sequence, s(i), can be generated with generator polynomial $x^7+x^1+1$, and initial condition [0 0 0 0 0 0 1].

The cyclic shift, m0 can be used to carry part of the Cell ID, I^Part_ID (see Component V). In one example, m0=b_RSS*mod(I^Part_ID, a_RSS)+c_RSS, where a_RSS, b_RSS, and c_RSS are constant integers. E.g. a_RSS=168, b_RSS=1, c_RSS=1. In another example, m0=b_RSS*floor (I^Part_ID/a_RSS)+c_RSS, where a_RSS, b_RSS, and c_RSS are constant integers. E.g. a_RSS=3, b_RSS=1, c_RSS=1.

TABLE 2

| | Construction scheme | |
|---|---|---|
| No. | Corresponding polynomial | Initial Condition |
| 1 | $x^8 + x^4 + x^3 + x^2 + 1$ | [0 0 0 0 0 0 0 1] |
| 2 | $x^8 + x^6 + x^5 + x^3 + 1$ | [0 0 0 0 0 0 0 1] |
| 3 | $x^8 + x^7 + x^6 + x^5 + x^2 + x + 1$ | [0 0 0 0 0 0 0 1] |
| 4 | $x^8 + x^5 + x^3 + x + 1$ | [0 0 0 0 0 0 0 1] |
| 5 | $x^8 + x^6 + x^5 + x^2 + 1$ | [0 0 0 0 0 0 0 1] |
| 6 | $x^8 + x^6 + x^5 + x + 1$ | [0 0 0 0 0 0 0 1] |
| 7 | $x^8 + x^7 + x^3 + x^2 + 1$ | [0 0 0 0 0 0 0 1] |
| 8 | $x^8 + x^5 + x^3 + x^2 + 1$ | [0 0 0 0 0 0 0 1] |
| 9 | $x^8 + x^6 + x^4 + x^3 + x^2 + x + 1$ | [0 0 0 0 0 0 0 1] |
| 10 | $x^8 + x^7 + x^6 + x + 1$ | [0 0 0 0 0 0 0 1] |
| 11 | $x^8 + x^7 + x^5 + x^3 + 1$ | [0 0 0 0 0 0 0 1] |
| 12 | $x^8 + x^7 + x^2 + x^1 + 1$ | [0 0 0 0 0 0 0 1] |
| 13 | $x^8 + x^6 + x^3 + x^2 + 1$ | [0 0 0 0 0 0 0 1] |
| 14 | $x^8 + x^7 + x^6 + x^3 + x^2 + x + 1$ | [0 0 0 0 0 0 0 1] |
| 15 | $x^8 + x^7 + x^6 + x^5 + x^4 + x^2 + 1$ | [0 0 0 0 0 0 0 1] |
| 16 | $x^8 + x^6 + x^5 + x^4 + 1$ | [0 0 0 0 0 0 0 1] |

In yet another embodiment, the base sequence can be constructed from a QPSK or BPSK modulated Gold-sequence, e.g. the base sequence s(n) can be generated according to b(n)=(1-2*((s_M1((2n+m_M1) mod L_G)+s_M2 ((2n+m_M2) mod L_G)) mod 2))/√2+j*(1-2*((s_M1((2n+1+m_M1)mod L_G)+s_M2((2n+1+m_M2) mod L_G)) mod 2))/√2, if QPSK modulated, or b(n)=1-2*((s_M1((n+m_M1) mod L_G)+s_M2((n+m_M2) mod L_G)) mod 2), if BPSK modulated, where MAG is the length of Gold-sequence, and m_M1 and m_M2 are the cyclic shifts applied to the each of the two M-sequences constructing the Gold-sequence, respectively. Denote the generator of the two M-sequences constructing the Gold-sequence as g_M1(x) and g_M2(x), respectively, which can be determined based on the sequence length MAG, and with a predefined initial condition for each of the M-sequence.

For the generator and length of gold-sequence, N^G, in one example, N^G=255. E.g. two generators are g_M1(x)=$x^8+x^7+x^6+x+1$ and g_M2(x)=$x^8+x^7+x^2+x+1$, with initial condition of [0 0 0 0 0 0 0 1]. E.g. any two generators from TABLE 2. In another example, N^G=127. E.g. two generators are g_M1(x)=$x^7+x^3+1$ and g_M2(x)=$x^7+x^3+x^2+x+1$, with initial condition of [0 0 0 0 0 0 1].

The two cyclic shifts, m_M1, m_M2 can be used to carry part of the Cell ID, I^Part_ID (see Component V). In one example, m_M1=b_RSS*mod(I^Part_ID, a_RSS)+c_RSS, where a_RSS, b_RSS, and c_RSS are constant integers. E.g. a_RSS=168, b_RSS=1, c_RSS=1, while m_M2=e_RSS*floor(I^Part_ID/d_RSS)+f_RSS, where d_RSS, e_RSS, and f_RSS are constant integers. E.g. d_RSS=3, e_RSS=1, f_RSS=1. In another example, m_M2=b_RSS*mod(I^Part_ID, a_RSS)+c_RSS, where a_RSS, b_RSS, and c_RSS are constant integers. E.g. a_RSS=168, b_RSS=1, c_RSS=1, while m_M1=e_RSS*floor(I^Part_ID/d_RSS)+f_RSS, where d_RSS, e_RSS, and f_RSS are constant integers. E.g. d_RSS=3, e_RSS=1, f_RSS=1.

In yet another embodiment, the base sequence can be constructed from a PN-sequence, wherein the PN-sequence is generated from a QPSK modulated sequence constructed by XOR of two M-sequences with length 2^31-1, e.g. the PN-sequence s(n) can be generated according to s(n)=(1-2* ((s_A(2n+Nc)+s_B(2n+Nc)) mod 2))/√2+j*(1-2*((s_A(2n+ Nc+1)+s_B(2n+Nc+1)) mod 2))/√2, where the generator of s_A can be g_A(x)=$x^{31}+x^3+1$, the generator of s_B can be g_B(x)=$x^{31}+x^3+x^2+x+1$, the initial condition of s_A is fixed as c_A=1, the initial condition of s_B, c_B, can be used to carry the Cell ID, I^Part_ID (see Component V), and Nc is an output shift offset (e.g. Nc=1600).

In one example, the initial condition c_B can be determined according to c_B=b_PN*(I^Part_ID +1)+a_PN, where a_PN and b_PN are predefined constant integers. In another example, the initial condition c_B can be determined according to c_B=b_PN*(I^Part_ID+1)*(n_sf+1)+c_PN*(I^Part_ID +1)+d_PN*(n_sf+1)+a_PN, where a_PN, b_PN, c_PN, and d_PN are predefined constant integers Component VII.A: Without Cover code.

In this sub-component, the base sequence b(n) can be repeated into N_SFs subframes within the configured duration and narrowband of RSS. The RSS in the frequency domain within one subframe and 11 symbols is d_RSS(n)=b(n), n=0, . . . , N^RE-1 where, N^RE is the length of base sequence b(n).

Component VII.B: With Cover Code Per Subframe.

In this sub-component, the base sequence b(n) can be extended into N_SFs subframes within the configured duration and narrowband of RSS with cover code on time domain. The RSS in the frequency domain within one subframe and 11 symbols is d_RSS(n)=b(n)*c(n_sf), n=0, . . . , N^RE-1 where, N^RE is the length of base sequence.

The cover code c(n_sf), in subframe level can be generated from one of the following options. In one embodiment, c(n_sf), alternates every K_sf subframes. E.g. K_sf=2. In one example, c(n_sf)=exp(−j*2*pi*θ), θ=k'/K_sf, k'=mod(n_sf, K_sf). In another example, c(n_sf)=exp(−j*(2*pi*θ+pi/2)), θ=k'/K_sf, k'=mod(n_sf, K_sf). In yet another example, c(n_sf)=exp(j*2*pi*θ), θ=k'/K_sf, k'=mod(n_sf, K_sf). In yet another example, c(n_sf)=exp(j*(2*pi*θ+pi/2)), θ=k'/K_sf, k'=mod(n_sf, K_sf).

Component VII.C: With Cover Code per RB.

In this sub-component, the base sequence b(n) can be extended into N_SFs subframes within the configured duration and narrowband of RSS with cover code in frequency domain. The RSS in the frequency domain within one subframe and 11 symbols is d_RSS(n,i_RB)=b(n)*c(i_RB), n=0, . . . , N^RE-1, i_RB=0, . . . , N^RB-1 where, N^RE is the length of base sequence, and N^RB is configured bandwidth in unit of RSS.

The cover code c(i_RB), in PRB level can be generated from one of the following options. In one embodiment, c(i_RB), alternates every K_RB subframes. E.g. K_RB=2. In one example, c(i_RB)=exp(−j*2*pi*θ), θ=k'/K_RB, k'=mod(n_sf, K_RB). In another example, c(i_RB)=exp(−j*(2*pi*θ+pi/2)), θ=k'/K_RB, k'=mod(n_sf, K_RB). In yet another example, c(i_RB)=exp(j*2*pi*θ), θ=k'/K_RB, k'=mod(n_sf, K_RB). In yet another example, c(i_RB)=exp(j*(2*pi*θ+pi/2)), θ=k'/K_RB, k'=mod(n_sf, K_RB).

Component VII.D: With Cover Codes per RB and Subframe.

In this sub-component, the base sequence b(n) can be extended into N_SFs subframes within the configured duration and narrowband of RSS with cover codes in both frequency domain per RB and time domain per subframe. The RSS in the frequency domain within one PRB at subframe at index, n_sf, and RB index i_RB is d_RSS(n, i_RB, n_sf)=b(n)*c1(i_RB)*c2(n_sf), n=0, . . . , N^RE-1, i_RB=0, . . . , N^RB-1, n_sf=0, . . . , N_SFs where, N^RE is the length of base sequence, while N^RB, and N_SFs are configured bandwidth in unit of RBs and time duration in unit of subframes of RSS, respectively.

The cover code c1(i_RB), in PRB level can be generated from one of the following options. In one embodiment, c(i_RB), alternates every K_RB subframes. E.g. K_RB=2. In one example, c(i_RB)=exp(−j*2*pi*θ), θ=k'/K_RB, k'=mod(n_sf, K_RB). In another example, c(i_RB)=exp(−j*(2*pi*θ+pi/2)), θ=k'/K_RB, k'=mod(n_sf, K_RB). In yet another example, c(i_RB)=exp(j*2*pi*θ), θ=k'/K_RB, k'=mod(n_sf, K_RB). In yet another example, c(i_RB)=exp(j*(2*pi*θ+pi/2)), θ=k'/K_RB, k'=mod(n_sf, K_RB).

The cover code c2(n_sf), in subframe level can be generated from one of the following options. In one embodiment, c2(n_sf), alternates every K_sf subframes. E.g. K_sf=2. In one example, c(n_sf)=exp(−j*2*pi*θ), θ=k'/K_sf, k'=mod(n_sf, K_sf). In another example, c(n_sf)=exp(−j*(2*pi*θ+pi/2)), θ=k'/K_sf, k'=mod(n_sf, K_sf). In yet another example, c(n_sf)=exp(j*2*pi*θ), θ=k'/K_sf, k'=mod(n_sf, K_sf). In yet another example, c(n_sf)=exp(j*(2*pi*θ+pi/2)), θ=k'/K_sf, k'=mod(n_sf, K_sf).

Power consumption and battery life is very important for terminals in an internet of thing (IoT). In enhanced machine type communication (eMTC) or narrowband IoT (NB-IoT) system, the power of terminal devices can be saved by means of configuring a power saving mode (PSM) or an extended discontinuous reception (eDRX) mode. However, a UE is unable to listen paging messages during sleep in the PSM mode or the eDRX mode. In some IoT application scenarios, a UE is required to establish a connection with a network within a certain period of time after receiving a network command. Then the UE that has the requirement cannot be configured with the PSM mode or the eDRX mode that has a relatively long period.

In a LTE specification, an enhanced version of eMTC and NB-IoT system, to enable a UE to be paged, and meanwhile to save power, a wake-up or sleep signal/channel is introduced after study and research. The wake-up signal/channel is configured to wake up a UE, i.e., a case where the UE needs to continue to monitor a subsequent MTC physical downlink control channel (MPDCCH) that is used to indicate a paging message. The sleep signal/channel is configured to instruct that a UE may enter into a sleep state, i.e., a case where the UE does not need to monitor a subsequent MPDCCH that is used to indicate a paging message.

In a multi-carrier system, a carrier that transmits a synchronization signal is called an anchor carrier, and in an LTE system, a paging signal is transmitted on an anchor carrier. In an LTE NB-IoT system, a scheme for transmitting paging messages on non-anchor carriers is introduced. In the eMTC system, multiple narrowbands are defined, in which a narrowband has 6 physical resource blocks (PRBs), and the concept of paging narrowband (PNB) is introduced. In addition, in the eMTC system, a downlink control channel for MTC, MPDCCH, is configured to indicate a paging message, and different UEs may monitor MPDCCHs on different narrowbands. Similarly, in an ongoing 5G new radio (NR) system, there is a situation where the bandwidth of a UE is smaller than a system bandwidth, and in this case, multiple bandwidth parts may be defined for a paging channel. For the case of multi-carrier or narrowbands or partial bandwidths, it is an issue yet to be solved that how to transmit and receive a wake-up or sleep signal.

For the enhanced eMTC system in an LTE system, a UE has the flexibility to set the DRX cycle according to the UE's application requirement. Meanwhile, long idle period is supported, e.g. 44 mins in idle eDRX mode, 10.24 s in connected eDRX mode. In the present disclosure, it is provided that several types of wake up signal (WUS) are designed to facilitate the decoding process of LTE Cat-M1 UE in eDRX mode.

The present disclosure provides the sequence design for generating wake signal (WUS) for enhanced MTC system. The following designs are included in the present disclosure: interleaved M-sequences based WUS without cover and with c code; sparse-mapped M-sequence based WUS using same set of base sequences across symbols and using different set of base sequence across symbols; M-sequence based WUS without cover code and with cover code of phase shift; Gold-sequence based WUS without cover code, with cover code of M-sequence and with cover code of phase shift; ZC-sequence based WUS with short base sequence(s) and cover code of M-sequence, with short base sequence(s) and cover code of phase shift, with short base sequence(s) and covercode of Gold sequence, with short base sequence(s) and cove code of PN sequence, and with long base sequence mapped across symbols; PN-sequence based WUS; relation to re-synchronization/enhanced synchronization sequence; and performance enhancement.

This present provides several components which can be used in conjunction or in combination with one another, or can operate as standalone schemes This present disclosure focuses on the design of sequences and mappings of wake up signal (WUS) for enhanced MTC system.

In the present disclosure, denote the UE group ID as $N_{ID}^{UEgroup}$, and range is $0 \leq N_{ID}^{UEgroup} \leq N^{UEgroup}-1$, where $N^{UEgroup}$ can be 1 or 2 or 4. Meanwhile, denote the cell ID as $N_{ID}^{cell}$, and range is $0 \leq N_{ID}^{cell} \leq 503$.

Component VIII: Design Aspects for WUS Sequences.

The following design aspects are considered in the present disclosure, where the embodiments from design aspects can be combined to generate the WUS sequence.

Aspect 1: Base sequence type generating WUS sequences and number of WUS sequences. The base sequence generating the WUS may have nice cross-correlation property so that the WUS can be detected by UE even in harsh channel condition or over large maximum coupling loss (MCL). Note that there can also be at least another one or multiple sequence(s) on top of the base sequence to generate the WUS, wherein the sequence(s) on top of the base sequence can be using the same or different type of sequence as the base sequence. In one example, the sequence(s) on top of the base sequence can use at least one of the following types of sequences as well.

In one embodiment, M-sequences can be adopted as the base sequence. In another embodiment, Gold-sequence can be adopted as the base sequence, wherein the Gold-sequence is the XOR of two M-sequences. In yet another embodiment, ZC-sequence can be adopted as the base sequence. In yet another embodiment, a PN sequence can be adopted as the base sequence The number of WUS sequences is determined by the amount of information carried by the WUS sequence (see Aspect 2 for details). For each piece of the information, a unique WUS sequence is generated correspondingly. By controlling the cyclic shift step and/or the number of base sequences adopted and/or initial conditions of the sequences (if applicable) and/or additional sequences applied to the base sequences, a sufficient number of WUS sequences with guaranteed correlation property can be generated.

Aspect 2: Information to convey. The information carried by WUS in general considered in the present disclosure, can include at least one of Cell ID or part of cell ID; and/or UE group identifier for different type of paging or part of the UE group identifier; and/or timing info (e.g. Subframe index/SFN/HyperSFN/slot index/symbol index); and/or system information update indicator; and/or system information.

In one embodiment, the information carried by WUS can be cell ID (i.e., $N_{ID}^{cell}$) or part of the cell ID information (e.g. $\lfloor N_{ID}^{cell}/a \rfloor$, and/or $N_{ID}^{cell}$ mod b, where a and b are predefined constants).

In another embodiment, the information carried by WUS can be UE group ID (i.e., $N_{ID}^{UEgroup}$ with size of $N^{UEgroup}$, e.g $N^{UEgroup}=4$, 8, 16) or part of the UE group ID (e.g. $\lfloor N_{ID}^{UEgroup}/c \rfloor$, and/or $N_{ID}^{UEgroup}$ mod d, where c and d are predefined constants). In one example, $N_{ID}^{group}$ is determined by the first associated PO index, n_o. In one sub-example, $N_{ID}^{UEgroup}=n_{PO}$ mod K0, where K0 is constant integer, E.g. K0 equals to the number of POs per subframe. Or K0 equals to number of POs per WUS periodicity. In another example, $N_{ID}^{UEgroup}$ is determined by subset of UEs within one PO.

In yet another embodiment, the information carried by WUS can be time-related information. In one example, I_t includes both subframe index and symbol index. E.g I_t=K0*I_sf+I_symb, where K0 is constant integer, e.g. K0=11. In another example, I_t is subframe index/SFN/HyperSFN/slot index/symbol index X, or X mod e, where e is predefined constant. In yet another embodiment, the information carried by WUS can be system information update indicator, and/or system information (e.g. system information update carried by paging).

In yet another embodiment, the information carried by WUS can be a combination of two or all from the above embodiments. For example, the whole/partial cell ID and timing-related information, or the whole/partial cell ID and UE group ID, or the whole/partial cell ID together with timing-related information and UE group ID.

Aspect 3: Sequence mapping scheme within and across symbols. With particular sequence mapping mechanism in both the frequency and time domains, WUS can be constructed with nice property to meet the requirements for different scenarios/applications.

In one embodiment, at least two sequences constructed from the base sequence(s) (e.g. cyclic shifted version of the base sequence(s) with length-31) are interleaved in the frequency domain within a symbol. In this embodiment, the one base sequence is able to convey large amount of information (e.g. $N_c = C_{31}^2 = 465$). In one sub-embodiment, the constructed WUS sequence within a symbol can be repeated across symbols. In another sub-embodiment, the symbol index can be carried by the cyclic shift of at least one of base sequence(s), which results in the symbol-level varying WUS. In yet another sub-embodiment, the base sequence can be scrambled by a cover code, which contains the time info (e.g. at least symbol index), separately, so that the WUS across symbols can be different.

In another embodiment, the sequence constructed from the base sequences (e.g. cyclic shifted version of the base sequences with length-31) is mapped either only to the even subcarriers or odd subcarriers within a symbol. In this embodiment, the WUS in time domain is composed of either two identical halves or two halves with opposite magnitude. Therefore, one-time of auto-correlation or the cross-correlation within the received sequence can be performed to detect the sequence, which is insensitive to CFO over narrowband. In one sub-embodiment, the constructed WUS sequence within a symbol can be repeated across symbols. In another sub-embodiment, the symbol index can be carried by the cyclic shift of at least one of base sequence(s), which results in the symbol-level varying WUS. In yet another sub-embodiment, the constructed WUS sequence using different base sequences can be mapped into symbols where the symbol indices depends on the choice of base sequences.

In yet another embodiment, the sequence constructed from the base sequence (e.g. cyclic shifted version of the base sequence with length-63) can be directly mapped into contiguous subcarriers in the frequency domain within a symbol (potentially with some truncation). In this embodiment, the constructed WUS has better cross-correlation than interleaved mapping schemes and is capable to carry medium amount of information. In one sub-embodiment, the constructed WUS sequence within a symbol can be repeated across symbols. In another sub-embodiment, the constructed WUS sequence within a symbol can carry time info (e.g. at least symbol index), such that the WUS across symbols can be different. In yet another sub-embodiment, the base sequence is scrambled by a cover code, which contains the time info (e.g. at least symbol index), separately, so that the sequences across symbols are different.

In yet another embodiment, the sequence constructed from the base sequence (e.g. cyclic shifted version of the base sequence with length larger than 100) can be directly mapped in the frequency domain across more than one symbol, e.g. in a frequency first and time second mapping order.

Aspect 4: mapping to the RE resources. In one embodiment, WUS can be truncated at the locations of CRS within the configured RE resources to avoid the effects to legacy LTE UEs. In another embodiment, WUS can be mapped to the configured RE resources directly.

Component IX: Interleaved M-Sequence Based WUS.

In this component, the WUS sequence is constructed from at least two base sequences, wherein the base sequences are BPSK modulated M-sequences with length of 31. Let $\tilde{s}(n)$ be one of the base sequences, then $\tilde{s}(n)=1-2\ x_M(n)$, $0 \leq n \leq 30$, wherein the M-sequence $x_M$ can be either one from the construction schemes in TABLE 3 (e.g. No. 1 to No. 6), with some proper initial condition e.g. $x_M(0)=x_M(1)=x_M(2)=x_M(3)=x_M(4)=0$, $x_M(5)=1$, or $x_M(1)=x_M(2)=x_M(3)=x_M(4)=0$, $x_M(0)=1$.

TABLE 3

Recursive construction scheme

| No. | Recursive construction scheme | Corresponding polynomial |
|---|---|---|
| 1 | $x_M(i + 5) = [x_M(i + 2) + x_M(i)]$ mod 2, $0 \leq i \leq 25$ | $x^5 + x^2 + 1$ |
| 2 | $x_M(i + 5) = [x_M(i + 3) + x_M(i)]$ mod 2, $0 \leq i \leq 25$ | $x^5 + x^3 + 1$ |
| 3 | $x_M(i + 5) = [x_M(i + 3) + x_M(i + 2) + x_M(i + 1) + x_M(i)]$ mod 2, $0 \leq i \leq 25$ | $x^5 + x^3 + x^2 + x + 1$ |
| 4 | $x_M(i + 5) = [x_M(i + 4) + x_M(i + 3) + x_M(i + 2) + x_M(i)]$ mod 2, $0 \leq i \leq 25$ | $x^5 + x^4 + x^3 + x^2 + 1$ |
| 5 | $x_M(i + 5) = [x_M(i + 4) + x_M(i + 2) + x_M(i + 1) + x_M(i)]$ mod 2, $0 \leq i \leq 25$ | $x^5 + x^4 + x^2 + x + 1$ |
| 6 | $x_M(i + 5) = [x_M(i + 3) + x_M(i + 3) + x_M(i + 1) + x_M(i)]$ mod 2, $0 \leq i \leq 25$ | $x^5 + x^4 + x^3 + x + 1$ |

Component IX.A: Without Cover Code.

In this sub-component, WUS sequence is constructed from two base sequences $\tilde{s}_1(n)$ and $\tilde{s}_2(n)$, wherein each of the two base sequences is a BPSK modulated M-sequence and the construction scheme of the M-sequence is from TABLE 3. Each of the base sequence, $\tilde{s}_i(n)$, can be further extended into two sequences, $s_i^{(m_{2i})}(n)$ and $s_i^{(m_{2i+1})}(n)$, wherein $s_i^{(m_{2i})}(n)$ and $s_i^{(m_{2i+1})}(n)$ are the base sequence $\tilde{s}_i(n)$ with cyclic shift of $m_{2i}$ and $m_{2i+1}$, respectively, according to $s_i^{(m_{2i})}(n)=\tilde{s}_i((n+m_{2i}) \bmod 31)$, $s_i^{(m_{2i+1})}(n)=\tilde{s}_i((n+m_{2i+1}) \bmod 31)$ where, $n=0, \ldots, 30$; $i \in \{0, 1\}$.

In one example, $s_0(n)$ is generated from the primitive polynomial $x^5+x^3+x^2+x+1$, while $\tilde{s}_1(n)$ is generated from the primitive polynomial $x^5+x^4+x^3+x+1$.

In another example, $\tilde{s}_0(n)$ is generated from the primitive polynomial $x^5+x^3+x^2+x+1$, while $\tilde{s}_1(n)$ is generated from the primitive polynomial $x^5+x^4+x^3+x+1$.

The WUS d (n) within a symbol can be constructed by interleaving the four extended sequences generated from the two base sequences and mapped into even and odd subcarriers alternatively in the center 62 REs within the 6 PRB of assigned bandwidth. For example, the mapping pattern can be according to Pattern 1:

$$\begin{cases} d(2n) = s_0^{(m_0)}(n)s_1^{(m_2)}(n) \\ d(2n + 1) = s_0^{(m_1)}(n)s_1^{(m_3)}(n) \end{cases}, n = 0, \ldots, 30,$$

or Pattern 2:

$$\begin{cases} d(2n) = s_0^{(m_1)}(n)s_1^{(m_3)}(n) \\ d(2n + 1) = s_0^{(m_0)}(n)s_1^{(m_2)}(n) \end{cases}, n = 0, \ldots, 30.$$

The constructed WUS d(n) within a symbol can be mapped to multiple symbols in time domain. In one example, WUS sequence is repeated over at least two contiguous symbols. E.g. the number of contiguous symbols mapped the same WUS sequence can be same as the number of symbols for WUS.

In another example, the mapping Pattern 1 and Pattern 2 are adopted based on the time info. In such example, pattern 1 if $I_t^{sym} \bmod 2=0$ and Pattern 2 if $I_t^{sym} \bmod 2=1$, wherein $I_t^{sym}$ is the symbol index with a subframe (e.g. 0 to 13). In such example, pattern 1 if $I_t^{subframe} \bmod 2=0$, and Pattern 2 if $I_t^{subframe} \bmod 2=1$, wherein $I_t^{subframe}$ is the subframe index with a frame (e.g. 0 to 9), and the mapping pattern within a subframe maintains the same.

In yet another example, the polynomial for base sequences changes across symbols and is based on the time info including at least symbol index and/or subframe index.

In yet another example, the cyclic shifts (e.g. at least one of $m_0$, $m_1$, $m_2$, $m_3$) for base sequences changes across symbols and is based on the time info including at least symbol index and/or subframe index.

In yet another example, the combination of above example.

In one consideration, as the length of the base sequence (i.e., $\tilde{s}_i$) is 31, the maximum number of combination for each cyclic shift pair $(m_{2i}, m_{2i+1})$ (or equivalently the number of generated sequences from one base sequence), $N_c$, can be 465, $$\left( C_{31}^2 = \frac{31!}{2!29!} = 465 \right),$$

if choosing the pair of cyclic shifts differently, and $N_c$ can be 961, (31*31=961) otherwise. With two base sequences, there can be up to $N_c \cdot N_c$ different WUS sequences for the design in this sub-embodiment. One example of the mapping between the information (e.g. identifier) carried by each base sequence, $N_i^{WUS\_ID}$, and the indices of cyclic shift pair $(m_{2i}, m_{2i+1})$ is shown in TABLE 4, if choosing the pair of cyclic shifts differently.

In one example, the information carried by WUS is cell ID (i.e., $N_{ID}^{cell}$) or part of the cell ID. Then, the cell ID information can be separately carried by the two WUS identifiers, $N_i^{WUS\_ID}$, $i \in \{0, 1\}$.

For one sub-example, $$N_0^{WUS\_ID} = b \times (N_{ID}^{cell} \bmod a), N_1^{WUS\_ID} = c \times \left\lfloor \frac{N_{ID}^{cell}}{a} \right\rfloor,$$

where a, b, c are predefined constants. In such sub-example, $$a = 465, b = 1, c = \left\lfloor \frac{465}{\lceil 504/465 \rceil} \right\rfloor = 232$$

(to maximize the range of cyclic shifts). In such sub-example, a=168, b=1, c=1 (similarly as LTE SSS).

For another sub-example, only $N_0^{WUS\_ID}$ or $N_1^{WUS\_ID}$ or will be used to cover part of the cell ID.

$$N_i^{WUS\_ID} = b \times \left( \left\lfloor \frac{N_{ID}^{cell}}{c} \right\rfloor \bmod a \right) i \in \{0, 1\}.$$

In such sub-example, a, b, c are constants, and a=168, b=1, c=1 for example.

For yet another sub-example, $$m_0 = \left\lfloor \frac{N_{ID}^{cell}}{a} \right\rfloor,$$

$m_1 = m_0 + b$, $m_2 = m' \bmod 31$, and $$m_3 = \left( m_3 + \left\lfloor \frac{m'}{31} \right\rfloor + 1 \right) \bmod 31$$

where, $$m' = N_{ID}^{(1)} + \frac{q(q+1)}{2}, q = \left\lfloor \frac{N_{ID}^{(1)} + \frac{q'(q'+1)}{2}}{30} \right\rfloor, q' = \left\lfloor \frac{N_{ID}^{(1)}}{30} \right\rfloor,$$

$N_{ID}^{(1)} = \bmod(N_{ID}^{cell}, 168)$. a, b are constant integers, e.g. a=3, b=16.

In another example, the information carried by WUS is cell ID (or part of cell ID) and timing information ($0 \leq I_t < N_t$). E.g. $I_t = \lfloor I_t^{sym}/N_p \rfloor \bmod N_t$, where $N_t$ is total number of timing indices and can be 2 or 4 or 6 or 8, if the $N_p$ mapping patterns are utilized alternatively for neighboring symbols, e.g. $N_p = 2$.

For one sub-example, the first WUS identifier, $N_0^{WUS\_ID}$, carries part of the cell ID information, and the second WUS identifier, $N_1^{WUS\_ID}$, carries the remaining part of cell ID information together with timing information. In such sub-example, $N_0^{WUS\_ID} = (N_{ID}^{cell} \bmod N_c)$, and $$N_1^{WUS\_ID} = \left( a \times \left\lfloor \frac{N_{ID}^{cell}}{N_c} \right\rfloor + b \times I_t \right) \bmod N_c,$$

where a, b are constants, and a=$N_t$, b=1 (without conflict) for example.

For another sub-example, the first WUS identifier, $N_0^{WUS\_ID}$, carries part of the cell ID information, and second WUS identifier, $N_1^{WUS\_ID}$, carries the timing information. In such sub example, $N_0^{WUS\_ID} = (N_{ID}^{cell} \bmod N_c)$, and $N_1^{WUS\_ID} = a \times I_t$, where a is a constant and a=$\lfloor N_c/N_t \rfloor$ (to maximize the cyclic shift) for example.

In yet another example, the information carried by WUS is cell ID (or part of cell ID) and system information update indicator, $I_s$. $0 \leq I_s < N_s$, where $N_s$ is total number of system indicators and can be a predefined constant. E.g. ($N_s = 2$).

For one sub-example the first WUS identifier, $N_0^{WUS\_ID}$, carries part of the cell ID information, and the second WUS identifier, $N_1^{WUS\_ID}$, carries the remaining part of cell ID information together with system information update indicator, $I_s$. In such sub-example, $N_0^{WUS\_ID} = (N_{ID}^{cell} \bmod N_c)$, and $$N_1^{WUS\_ID} = \left( a \times \left\lfloor \frac{N_{ID}^{cell}}{N_c} \right\rfloor + b \times I_s \right) \bmod N_c,$$

where a, b are constants, and a=$N_s$, b=1 (without conflict) for example.

For another sub-example the first WUS identifier, $N_0^{WUS\_ID}$, carries part of the cell ID information, and the second WUS identifier, $N_1^{WUS\_ID}$, carries the system information update indicator, $I_s$. In such sub example, $N_0^{WUS\_ID} = (N_{ID}^{cell} \bmod N_c)$, and $N_1^{WUS\_ID} = a \times I_s$, where a is a constant and a=$\lfloor N_c/N_s \rfloor$ (to maximize the cyclic shift) for example.

In yet another example, the information carried by WUS is cell ID (or part of cell ID) and UE group ID (or part of UE group ID).

For one sub-example the first WUS identifier, $N_0^{WUS\_ID}$, carries part of the cell ID information, and the second WUS identifier, $N_1^{WUS\_ID}$, carries the remaining part of cell ID information together with UE group ID. In such sub-example, $N_0^{WUS\_ID} = (N_{ID}^{cell} \bmod N_c)$, and $$N_1^{WUS\_ID} = \left( a \times \left\lfloor \frac{N_{ID}^{cell}}{N_c} \right\rfloor + b \times N_{ID}^{UEgroup} \right) \bmod N_c,$$

where a, b are constants, and a=$N^{UEgroup}$, b=1 (without conflict) for example.

For one sub-example the first WUS identifier, $N_0^{WUS\_ID}$, carries part of the cell ID information, and the second WUS identifier, $N_1^{WUS\_ID}$, carries UE group ID. In such sub-example, $N_0^{WUS\_ID} = (N_{ID}^{cell} \bmod N_c)$, and $N_1^{WUS\_ID} = a \times N_{ID}^{UEgroup}$, where a is a constant, a=$\lfloor N_c/N^{UEgroup} \rfloor$ (to maximize the cyclic shift) for example.

In yet another example, the information carried by WUS is cell ID (or part of cell ID) and UE group ID (or part of UE group ID) and timing info.

For one sub-example, the first WUS identifier, $N_0^{WUS\_ID}$, carries part of the cell ID information, and the second WUS identifier, $N_1^{WUS\_ID}$, carries the remaining part of cell ID information together with timing information and UE group ID. In such sub-example, $N_0^{WUS\_ID} = (N_{ID}^{cell} \bmod N_c)$, and $$N_1^{WUS\_ID} = \left( a \times \left\lfloor \frac{N_{ID}^{cell}}{N_c} \right\rfloor + b \times N_{ID}^{UEgroup} + c \times I_t \right) \bmod N_c,$$

where a and b and c are constants, and a=$(N^{UEgroup} \times N_t)$, b=$N_t$, c=1 (without conflict) for example.

For another sub-example, the first WUS identifier, $N_0^{WUS\_ID}$, carries part of the cell ID information, and the second WUS identifier, $N_1^{WUS\_ID}$, carries the timing information and UE group ID. In such sub-example, $N_0^{WUS\_ID}=(N_{ID}^{cell} \bmod N_c)$ and $N_1^{WUS\_ID}=(a \times N_{ID}^{UEgroup}+b \times I_t) \bmod N_t$, where a and b are constants, and a=$N_t$, b=1 (without conflict) for example.

In yet another example, the information carried by WUS is cell ID (or part of cell ID) and timing info and system information update indicator.

No ID For one sub-example, the first WUS identifier, $N_0^{WUS\_ID}$, carries part of the cell ID information, and the second WUS identifier, $N_1^{WUS\_ID}$, carries the remaining part of cell ID information together with timing information and system information update indicator. In such sub-example, $N_0^{WUS\_ID}=(N_{ID}^{cell} \bmod N_c)$, and $$N_1^{WUS\_ID} = \left(a \times \left\lfloor \frac{N_{ID}^{cell}}{N_c} \right\rfloor + b \times I_s + c \times I_t \right) \bmod N_c,$$

where a and b and c are constants, and a=$(N_s \times N_t)$, b=$N_t$, c=1 (avoid conflict) for example.

For another sub-example, the first WUS identifier, $N_0^{WUS\_ID}$, carries part of the cell ID information, and the second WUS identifier, $N_1^{WUS\_ID}$, carries the timing and system information update indicator. In such sub-example, $N_0^{WUS\_ID}=(N_{ID}^{cell} \bmod N_c)$, and $N_1^{WUS\_ID}=(a \times I_s + b \times I_t) \bmod N_c$, where a and b are constants, and a=$N_t$, b=1 (avoid conflict) for example.

Component IX.B: With Cover Code(s).

In this sub-component, except for two base sequences $\tilde{s}_0$ and $\tilde{s}_1$ generating the four extended sequences, another length-31 M-sequence, $\tilde{s}_2$, (also from TABLE 3 and different from $\tilde{s}_0$ and $\tilde{s}_1$), is adopted to generate a cover code(s). For example, the cover code $s_2^{(m_4)}$, $s_2^{(m_5)}$ can be generated according to $s_2^{(m_4)}(n)=\tilde{s}_2((n+m_4) \bmod 31)$, n=0, ..., 30, and $s_2^{(m_5)}(n)=\tilde{s}_2((n+m_5) \bmod 31)$, n=0, ..., 30 where $m_4$, $m_5$ are the cyclic shifts to $\tilde{s}_2$.

In one example, the cyclic shift $m_4$ can be determined by time info $I_t$, where $I_t$ at least contains one of the symbol index $I_t^{sym}$ and/or subframe index $I_t^{sub\ frame}$ and/or their combination according to $m_4=\lfloor I_t/N_p \rfloor \bmod N_t$, $m_5$=a where $N_t$ is the number of time info carried by the cover code and $N_p$ is the mapping patterns utilized alternatively for neighboring symbols, e.g. $N_p$=2; a is a constant integer, e.g. a=0.

In another example, the cyclic shift $m_4$ can be determined by the combination of time information, $I_t$, and also the cell ID related information. More specifically, $m_4=(m2+\lfloor I_t/a \rfloor) \bmod 31$, and $m_5=(m3+\lfloor I_t/b \rfloor) \bmod 31$ where, $I_t$ is time related information, e.x. $I_t$ is the symbol index; a, b are constant integers, e.g. a=2, b=2.

The cover code can be applied on top of the sequence generated from Component XI.A, with the restriction that the cover code is applied to either the odd subcarriers only, or the even subcarrier only, or all the subcarriers. An example of applying the cover code to odd subcarriers only is as follow: Pattern 1:

$$\begin{cases} d(2n) = s_0^{(m_0)}(n)s_1^{(m_2)}(n) \\ d(2n+1) = s_0^{(m_1)}(n)s_1^{(m_3)}(n)s_2^{(m_4)}(n) \end{cases}, n = 0, \ldots, 30,$$

and Pattern 2:

$$\begin{cases} d(2n) = s_0^{(m_1)}(n)s_1^{(3)}(n) \\ d(2n+1) = s_0^{(m_0)}(n)s_1^{(m_2)}(n)s_2^{(m_5)}(n) \end{cases}, n = 0, \ldots, 30,$$

In one example, $\tilde{s}_2(n)$ can be generated from primitive polynomial $x^5+x^4+x^3+x^2+1$. In another example. $\tilde{s}_2(n)$ can be generated from primitive polynomial $x^5+x^4+x^3+x^1+1$.

Similarly as Component IX.A, the mapping between the information (e.g. identifier) carried by each base sequence, $N_i^{WUS\_ID}$, and the indices of cyclic shift pair $(m_{2i}, m_{2i+1})$ can be utilized to carry information other than time-related information.

TABLE 4

Mapping information by sequences

| $N_i^{WUS\_ID}$ | $m_{2i}$ | $m_{2i+1}$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |

TABLE 4-continued

Mapping information by sequences

| $N_i^{WUS\_ID}$ | $m_{2i}$ | $m_{2i+1}$ |
|---|---|---|
| 55 | 25 | 27 |
| 56 | 26 | 28 |
| ... | ... | ... |
| 463 | 1 | 30 |
| 464 | 0 | 30 |

Component X: Sparse-mapped M-Sequence based WUS.

In this component, the WUS sequence is constructed from at least one (e.g. K) base sequences, wherein each of the base sequences is a BPSK modulated M-sequence with length of 31. Let $\tilde{s}_0(n), \ldots, \tilde{s}_{K-1}(n)$, $1 \le K \le 6$, be the base sequences, where $\tilde{s}_i(n) = 1 - 2 x_{Mi}(n)$, $0 \le n \le 30$. The M-sequence $x_{Mi}(n)$ is generated from the construction schemes in TABLE 3, with some proper initial condition e.g. $x_{Mi}(0) = x_{Mi}(1) = x_{Mi}(2) = x_{Mi}(3) = x_{Mi}(4) = 0$, $x_{Mi}(5) = 1$, or $x_{Mi}(1) = x_{Mi}(2) = x_{Mi}(3) = x_{Mi}(4) = 0$, $x_{Mi}(0) = 1$, where $0 \le i \le K-1$.

Each of the base sequence, $\tilde{s}_i(n)$, can be further extended into a sequence $s_{i,m_i}(n)$, where $s_{i,m_i}(n)$ is generated by the base sequence $\tilde{s}_i(n)$ with cyclic shift of $m_i$ according to $s_{i,m_i}(n) = \tilde{s}_i((n+m_i) \mod 31)$ where, $n = 0, \ldots, 30$; $i \in \{0, 1, \ldots, K-1\}$.

Component X.A: Using Same set of Base Sequences across Symbols.

In one embodiment, all the K base sequences are utilized to generate the WUS within an OFDM symbol, and the same set of base sequences are used across symbols. Within a given symbol, the WUS d(n) is constructed by occupying only even or odd subcarriers and emptying the remaining subcarriers. For example, the mapping pattern can be according to pattern 1:

$$\begin{cases} d(2n) = s_{0,m_0}(n) \ldots s_{K-1,m_{K-1}}(n) \\ d(2n+1) = 0 \end{cases}, n = 0, \ldots, 30,$$

or pattern 2:

$$\begin{cases} d(2n) = 0 \\ d(2n+1) = s_{0,m_0}(n) \ldots s_{K-1,m_{K-1}}(n) \end{cases}, n = 0, \ldots, 30.$$

The constructed WUS d(n) within a symbol can be mapped to multiple symbols in time domain. In one example, WUS sequence is repeated over at least two contiguous symbols. E.g. the number of contiguous symbols mapped the same WUS sequence can be same as the number of symbols for WUS.

In another example, the mapping Pattern 1 and Pattern 2 are adopted based on the time info. In such example, pattern 1 if $I_t^{sym} \mod 2 = 0$ and Pattern 2 if $I_t^{sym} \mod 2 = 1$, wherein $I_t^{sym}$ is the symbol index with a subframe (e.g. 0 to 13). In such example, pattern 1 if $I_t^{subframe} \mod 2 = 0$ and Pattern 2 if $I_t^{subframe} \mod 2 = 1$, wherein $I_t^{subframe}$ is the subframe index with a frame (e.g. 0 to 9), and the mapping pattern within a subframe maintains the same.

In yet another example, the cyclic shifts (e.g. at least one of $m_0, \ldots, m_{K-1}$) for base sequences changes across symbols and is based on the time info including at least symbol index and/or subframe index In yet another example, the combination of above example.

In one consideration, as the length of base sequence, $\tilde{s}_i$, is 31, the maximum number of WUS, $N_c$, can be to $31^K$ when given K base sequences. The information that facilitates decoding the paging messaging in eDRX mode can be carried by the combination of the cyclic shift series, $\{m_0, \ldots, m_{K-1}\}$.

In one example, the information carried by WUS is part of cell ID. For one sub-example, K=1, $$m_0 = N_{ID}^{cell} \mod 31 \text{ or } m_0 = a \times \left\lfloor \frac{N_{ID}^{cell}}{b} \right\rfloor,$$

where a and b are predefined constants, a=1, b=128 for example. One base sequence is enough in this sub-example.

In another example, the information carried by WUS is cell ID. For one sub-example, K=2, $m_0 = N_{ID}^{cell} \mod 31$, $$m_1 = a \times \left\lfloor \frac{N_{ID}^{cell}}{31} \right\rfloor,$$

where a is predefined constant, $a = \lfloor 31/(\lceil N^{cell\_ID}/31 \rceil) \rfloor$ (to maximize cyclic shift), for example.

In another example, the information carried by WUS is cell ID (or part of cell ID) and UE group ID (or part of UE group ID). For one sub-example, if only carry partial cell ID. Let K=2. $m_0 = N_{ID}^{cell} \mod 31$, $m_1 = a \times N_{ID}^{UEgroup}$, where a is predefined constant, $a = \lfloor 31/N^{UEgroup} \rfloor$ (to maximize cyclic shift), for example.

For another sub-example, K=3.

$$m_0 = N_{ID}^{cell} \mod 31, m_1 = a \times \left\lfloor \frac{N_{ID}^{cell}}{31} \right\rfloor,$$

$m_2 = b \times N_{ID}^{UEgroup}$, where a, b are predefined constants, and $a = \lfloor 31/\lceil N^{cell\_ID}/31 \rceil \rfloor$, $b = \lfloor 31/N^{UE\_group} \rfloor$ (to maximize cyclic shift), for example.

In another example, the information carried by WUS is cell ID (or part of cell ID) and timing information ($0 \le I_t < N_t$). E.g. $I_t = n\_subframe \mod N_t$, where $N_t$ is total number of timing indices and can be 2 or 4 or 6 or 8. For one sub-example, if carry part of cell ID, let K=2. $m_0 = N_{ID}^{cell} \mod 31$, $m_1 = a \times I_t$, where a is predefined constant, and $a = \lfloor 31/N_t \rfloor$ (to maximize cyclic shift), for example. For another sub-example, Let K=3. $m_0 = N_{ID}^{cell} \mod 31$, $$m_1 = a \times \left\lfloor \frac{N_{ID}^{cell}}{31} \right\rfloor,$$

$m_2 = b \times I_t$, where a, b are predefined constants, and $a = \lfloor 31/\lceil N^{cell\_ID}/31 \rceil \rfloor$, $b = \lfloor 31/N_t \rfloor$ (to maximize cyclic shift), for example.

In yet another example, the information carried by WUS is cell ID (or part of cell ID) and system information update indicator, $I_s$. $0 \le I_s \le N_s - 1$, where $N_s$ is total number of system indicators and can be a predefined constant. E.g. ($N_s = 2$). For one sub-example, if carry part of cell ID, let K=2. $m_0 = N_{ID}^{cell} \mod 31$, $m_1 = a \times I_s$, where a is predefined constant, and $a=\lfloor 31/N_s \rfloor$ (to maximize cyclic shift), for example. For another sub-example, Let K=3. $m_0=N_{ID}^{cell}$ mod 31, $$m_1 = a \times \left\lfloor \frac{N_{ID}^{cell}}{31} \right\rfloor,$$

$m_2=b \times I_s$, where a, b are predefined constants, and $a=\lfloor 31/[N^{cell\_ID}/31]\rfloor$, $b=\lfloor 31/N_s \rfloor$ (to maximize cyclic shift), for example.

In yet another example, the information carried by WUS is cell ID (or part of cell ID) and UE group ID (or part of UE group ID) and timing info. For one sub-example, if carry part of cell ID, Let K=2, $m_0=N_{ID}^{cell}$ mod 31, $m_1=(a \times N_{ID}^{UEgroup}+b \times I_t)$ mod 31, where a, b are predefined constants, and $a=N_t$, $b=1$ (to avoid conflict), for example. For one sub-example, if carry part of cell ID, Let K=3, $m_0=N_{ID}^{cell}$ mod 31, $m_1=a \times N_{ID}^{UEgroup}$, $m_2=b \times I_t$, where a, b are predefined constants, and $a=\lfloor 31/N^{UE\_group}\rfloor$, $b=\lfloor 31/N_t \rfloor$ (to maximize cyclic shift), for example. For another sub-example, let K=3, $m_0=N_{ID}^{cell}$ mod 31, $$m_1 = a \times \left\lfloor \frac{N_{ID}^{cell}}{31} \right\rfloor,$$

$m_2=(b \times N_{ID}^{UEgroup}+c \times I_t)$ mod 31, where a, b, c are predefined constants, and $a=\lfloor 31/N^{UE\_group}\rfloor$, $b=N_t$, $c=1$ (to avoid conflict), for example.

In yet another example, the information carried by WUS is cell ID (or part of cell ID) and timing info and system information update indicator. For one sub-example, if carry part of cell ID, Let K=2, $m_0=N_{ID}^{cell}$ mod 31, $m_1=(a \times I_s+b \times I_t)$ mod 31, where a, b are predefined constants, and $a=N_t$, $b=1$ (to avoid conflict), for example. For one sub-example, if carry part of cell ID, Let K=3, $m_0=N_{ID}^{cell}$ mod 31, $m_1=a \times I_t$, $m_2=b \times I_t$, where a, b are predefined constants, and $a=\lfloor 31/N_s \rfloor$, $b=\lfloor 31/N_t \rfloor$ (to maximize cyclic shift), for example. For another sub-example, let K=3, $m_0=N_{ID}^{cell}$ mod 31, $$m_1 = a \times \left\lfloor \frac{N_{ID}^{cell}}{31} \right\rfloor,$$

$m_2=(b \times I_s+c \times I_t)$ mod 31, where a, b, c are predefined constants, and $a=\lfloor 31/N_s \rfloor$, $b=N_t$, $c=1$ (to avoid conflict), for example.

Component X.B: Using Different set of Base Sequence across Symbols.

In this sub-component, the polynomial for base sequence changes across symbols and is based on the time info including at least symbol index, $i_t^{sym}$, and/or subframe index, $I_t^{subframe}$. In the other word, the K base sequences, $\{s_{i,m_i}, i=0, \ldots, K-1\}$, are mapped into different symbols in the time domain. Meanwhile, the WUS is still constructed by occupying only even or odd subcarriers and emptying the remaining subcarriers. For example, the mapping pattern for WUS in $i^{th}$ symbol, $d_i$, can be according to pattern 1:

$$\begin{cases} d_i(2n) = s_{i,m_i}(n) \\ d_i(2n+1) = 0 \end{cases}, n = 0, \ldots, 30,$$

or pattern 2:

$$\begin{cases} d_i(2n) = 0 \\ d_i(2n+1) = s_{i,m_i}(n) \end{cases}, n = 0, \ldots, 30.$$

The constructed WUS $d_i(n)$ within the ith symbol can be mapped in time domain. In one example, the mapping Pattern 1 and Pattern 2 are adopted based on the time information. In such example, $i=(\lfloor I_t^{sym}/2 \rfloor \bmod K)$. Pattern 1 if $I_t^{sym}$ mod 2=0 and Pattern 2 if $I_t^{sym}$ mod 2=1, wherein $I_t^{sym}$ is the symbol index with a subframe (e.g. 0 to 13). In such example, $i=(\lfloor I_t^{subframe}/2 \rfloor \bmod K)$. Pattern 1 if $I_t^{subframe}$ mod 2=0 and Pattern 2 if $I_t^{subframe}$ mod 2=1, wherein $I_t^{subframe}$ is the subframe index with a frame (e.g. 0 to 9), and the mapping pattern within a subframe maintains the same.

Similarly as in Component X.A, the cyclic shift series from the K base sequences, $\{m_0, \ldots, m_{K-1}\}$, can be utilized to convey information other than time-related in eDRX mode.

Component XI: M-sequence based WUS.

In this component, the WUS sequence is constructed from one base sequence, wherein the base sequence is M-sequence with length of N, e.g. N=63. The base sequence, s(n), can be constructed from BPSK modulated length-N M-sequence, wherein $s(n)=(1-2 x_{M0}(n))$, $0 \leq n \leq N-1$. The M-sequence $x_M$ with length 63 can be from the construction schemes in TABLE 5, with some proper initial condition e.g. $x_M(0)=x_M(1)=x_M(2)=x_M(3)=x_M(4)=0, x(5)=0, x(6)=1$, or $x_M(1)=x_M(2)=x_M(3)=x_M(4)=x_M(5)=0, x_M(0)=1$.

TABLE 5

Recursive construction scheme

| No. | Recursive construction scheme | Corresponding polynomial |
|---|---|---|
| 1 | $x_M(i+6) = [x_M(i+5) + x_M(i)]$ mod 2, $0 \leq i \leq 56$ | $x^6 + x^5 + 1$ |
| 2 | $x_M(i+6) = [x_M(i+1) + x_M(i)]$ mod 2, $0 \leq i \leq 56$ | $x^6 + x + 1$ |
| 3 | $x_M(i+6) = [x_M(i+5) + x_M(i+4) + x_M(i+1) + x_M(i)]$ mod 2, $0 \leq i \leq 56$ | $x^6 + x^5 + x^4 + x + 1$ |
| 4 | $x_M(i+6) = [x_M(i+5) + x_M(i+2) + x_M(i+1) + x_M(i)]$ mod 2, $0 \leq i \leq 56$ | $x^6 + x^5 + x^2 + x + 1$ |
| 5 | $x_M(i+6) = [x_M(i+5) + x_M(i+3) + x_M(i+2) + x_M(i)]$ mod 2, $0 \leq i \leq 56$ | $x^6 + x^5 + x^3 + x^2 + 1$ |
| 6 | $x_M(i+6) = [x_M(i+4) + x_M(i+3) + x_M(i+1) + x_M(i)]$ mod 2, $0 \leq i \leq 56$ | $x^6 + x^4 + x^3 + x + 1$ |

The length of the M-sequence N can be determined from one of the following options: N is determined by the total available REs in one OFDM symbol for WUS, e.g. N=63; N is determined by the total available REs in one subframe per PRB, e.g. N=127; and N is determined by the total available REs in one subframe per 6 PRBs, e.g. N=1023 or 511.

Component XI.A: Without cover code.

In this sub-component, the WUS d(n) is constructed directly from the M sequence with cyclic shift $m_0$ according to $d(n)=1-2 x_{M0}((n+m_0) \bmod N)$, $n=0, \ldots, N-1$. When N=63, WUS d(n) is truncated by the center element d(31) and mapped into the center 62 REs within the 6 PRB of assigned narrowband.

In one example, $x_{M0}$ is generated from the primitive polynomial $x^6+x+1$, when N=63. The information carried by WUS can be determined by the cyclic shift $m_0$. In one example, the information carried by WUS is part of the cell ID. For one sub-example, $$m_0 = c \times \left( \left\lfloor \frac{N_{ID}^{cell}}{b} \right\rfloor \bmod a \right),$$

where a, b, c are predefined constants, foe example, a=63, b=1, c=1.

In another example, the information carried by WUS is part of cell ID and UE group ID (or part of UE group ID). In such example, $$m_0 = \left( a \times \left\lfloor \frac{N_{ID}^{cell}}{b} \right\rfloor + c \times N_{ID}^{UEgroup} \right) \bmod N,$$

where a, b, c are constants, and $a=N^{UEgroup}$, b=168, c=1 for example.

In yet another example, the information carried by WUS is cell ID (or part of cell ID) and timing information ($0 \leq I_t < N_t$), where $N_t$ is total number of timing indices and can be 2 or 4 or 6 or 8. In such example, $$m_0 = \left( a \times \left\lfloor \frac{N_{ID}^{cell}}{b} \right\rfloor + c \times I_t \right) \bmod N,$$

where a, b, c are constants, and $a=N_t$, b=168, c=1 for example. In such example, $$m_0 = \left( \left( a \times \left\lfloor \frac{N_{ID}^{cell}}{b} \right\rfloor + 1 \right) (c \times I_t + 1) \right) \bmod N,$$

where a, b, c are constants.

In yet another example, the information carried by WUS is cell ID (or part of cell ID) and system update indicator, $I_s$. In such example, $$m_0 = \left( a \times \left\lfloor \frac{N_{ID}^{cell}}{b} \right\rfloor + c \times I_s \right) \bmod N,$$

where a, b, c are constants, and $a=N_t$, b=168, c=1 for example.

In yet another example, the information carried by WUS is cell ID (or part of cell ID) and UE group ID (or part of UE group ID) and timing information. In such example, $$m_0 = \left( a \times \left\lfloor \frac{N_{ID}^{cell}}{b} \right\rfloor + c \times N_{ID}^{UEgroup} + d \times I_t \right) \bmod N,$$

where a, b, c, d are constants, and $a=N^{UEgroup} \times N_t$, b=168, $c=N_t$, d=1 (to avoid conflict) for example. In such example, $$m_0 = \left( \left( a \times \left\lfloor \frac{N_{ID}^{cell}}{b} \right\rfloor + c \times N_{ID}^{UEgroup} + 1 \right) (d \times I_t + 1) \right) \bmod N,$$

where a, b, c, d are constants

In yet another example, the information carried by WUS cell ID (or part of cell ID) and the timing and system information update indicator, $I_s$. In such example, $$m_0 = \left( a \times \left\lfloor \frac{N_{ID}^{cell}}{b} \right\rfloor + c \times I_t + d \times I_s \right) \bmod N,$$

where a, b, c, d are constants, and $a=N_s \times N_t$, b=168, $c=N_t$, d=1 (to avoid conflict) for example. In such example, $$m_0 = \left( a \times \left\lfloor \frac{N_{ID}^{cell}}{b} \right\rfloor + d \times I_s \right) (c \times I_t + 1) \bmod N,$$

where a, b, c, d are constants.

Component XI.B: With Cover Code of Phase Shift.

In this sub-component, the mechanism of phase shift in frequency domain is adopted to generate time-varying WUS across symbols. In particular, the cover code $c^\theta f$ (n) is generated as $c^\theta f(n) = e^{-j2\pi\theta n}$, n=0, ..., N−1, wherein the phase rotation:

$$\theta_f = \frac{I_t}{N_t},$$

is determined by time index, $I_t$, ($0 \leq I_t < N_t$), where $N_t$ is total number of timing indices and can be 2 or 4 or 6 or 8. E.g. $I_t = I_t^{sym} \bmod N_t$, where $I_t^{sym}$ is symbol index; and/or $\theta_f$ is determined by both time information and cell ID. For one sub-example, $$\theta_f = \frac{I_t}{N_t} * a + b \times \left\lfloor \frac{N_{ID}^{cell}}{c} \right\rfloor + d * \bmod(N_{ID}^{cell}, e),$$

where a, b, c, d, e are constant integers, e.g. a=1, b=1, d=1, c=3, e=168. For another sub-example, $$\theta_f = \frac{1}{K} * \left( b \times \left\lfloor \frac{N_{ID}^{cell}}{c} \right\rfloor + a * I_t + d \right) \bmod K,$$

where a, b, c, d, K are constant integers. E.g. K=11 or 14. For another sub-example, $$\theta_f = \frac{1}{K} * \left( \left( b \times \left\lfloor \frac{N_{ID}^{cell}}{c} \right\rfloor + 1 \right) (a * I_t + 1) \right) \bmod K,$$

where a, b, c, K are constant integers. E.g. K=11 or 14.

The WUS d(n) is constructed directly from the M-sequence scrambled with the cover code. When WUS d(n) is truncated at the center, the WUS is computed according to $$d(n) = \begin{cases} (1 - 2x_{M0}((n + m_0) \bmod N))e^{-j2\pi\theta_f n}, n = 0, \ldots, \text{floor}\left(\frac{N}{2}\right), \\ (1 - 2x_{M0}((n + m_0 + 1) \bmod N))e^{-j2\pi\theta_f (n+1)}, n = \text{floor}\left(\frac{N}{2}\right) + 1, N - 2, \end{cases}$$

when no truncation is needed, WUS is computed as $d(n) = (1-2 x_{M0}((n+m_0) \bmod N)) e^{-j2\pi\theta_f n}$, $n=0, \ldots, N-1$.

Similarly as Component XI.A, the mapping between cyclic shift $m_0$ in WUS can be utilized to carry information as needed.

Component XII: Gold-Sequence based WUS.

In this component, the WUS sequence is constructed from one base sequence, wherein the base sequence is Gold-sequence with length of N, e.g. N=63. The base sequence, s(n), can be constructed from BPSK modulated length-N Gold-sequence (i.e., XOR of two M-sequences), wherein $s(n)=(1-2 x_{M0}(n))(1-2 x_{M1}(n))$, $0 \le n \le N-1$. Each M-sequence $x_M$ (i.e., $M=M_0$ or $M=M_1$) with length N. When N=63, Each M-sequence $x_M$ can be from the construction schemes in TABLE 5, with some proper initial condition e.g. $x_M(0)=x_M(1)=x_M(2)=x_M(3)=x_M(4)=0, x(5)=0, x(6)=1$, or $x_M(1)=x_M(2)=x_M(3)=x_M(4)=x_M(5)=0, x_M(0)=1$.

The length of the Gold-sequence N can be determined from one of the following options: N is determined by the total available REs in one OFDM symbol for WUS, e.g. N=63; N is determined by the total available REs in one subframe per PRB, e.g. N=127; N is determined by the total available REs in one subframe per 6 PRBs, e.g. N=1023 or 511; and N is determined as 2^31-1, i.e., the length of LTE PN sequence.

Component XII.A: Without Cover Code.

In this sub-component, the WUS d(n) is constructed directly from the gold sequence with cyclic shift $m_0$ and $m_1$ applied to the two M-sequences generating the Gold-sequence, respectively, according to $d(n)=(1-2(x_{M0} (n+m_0) \bmod N))(1-2 (x_{M1} (n+m_1) \bmod N))$, $n=0, \ldots, N-1$.

When N=63, WUS d(n) is truncated by the center element d (31) and mapped into the center 62 REs within the 6 PRB of assigned narrowband. In one example, $x_{M0}$ is generated from the primitive polynomial $x^6+x+1$, while $x_{M1}$ is generated from the primitive polynomial $x^6+x^5+1$. In one example, $x_{M0}$ is generated from the primitive polynomial $x^6+x+1$, while $x_{M1}$ is generated from the primitive polynomial $x^6+x^5+x^2+x+1$.

As the M-sequence is in the length of N, the maximum number of WUS sequences generated from Gold-sequence is the square of N. The information carried by WUS can be determined by the combination of cyclic shift pair $(m_0, m_1)$, where $m_0$ and $m_1$ are two cyclic shifts applied to the two M-sequences generating the Gold-sequence, respectively. The two cyclic shifts can be used to carry information as described in the aforementioned components.

In one example, the information carried by WUS is cell ID (i.e., $N_{ID}^{cell}$) or part of the cell ID. Then, the cell ID information can be jointly carried by $m_0$ and $m_1$. For one sub-example, $$m_0 = (N_{ID}^{cell} \bmod N), m_1 = a \times \left\lfloor \frac{N_{ID}^{cell}}{N} \right\rfloor + b,$$

where a, and b are predefined constant integers. E.g a=8, b=0.

In another example, the information carried by WUS is cell ID (or part of cell ID) and timing information. For one sub-example, $m_0$ carries part of the cell ID information, and $m_1$ carries the remaining part of cell ID information together with timing information. In such sub-example, $m_0=(N_{ID}^{cell} \bmod N)$, and $$m_1 = \left(a \times \left\lfloor \frac{N_{ID}^{cell}}{N} \right\rfloor + b \times I_t + c\right) \bmod N,$$

where a, b, c are constants $a=N_t$, b=1, c=0 for example. In such sub-example, $m_0=(N_{ID}^{cell} \bmod N)$, and $$m_1 = \left(a \times \left\lfloor \frac{N_{ID}^{cell}}{N} \right\rfloor + 1\right)(b \times I_t + 1) \bmod N,$$

where a, b are constants, and a=4, b=1. In such sub-example, $m_0=(a^*N_{ID}^{cell}+1)(b^*I_t+1) \bmod N$ and $$m_1 = c \times \left\lfloor \frac{N_{ID}^{cell}}{N} \right\rfloor,$$

where a, b, c are constants, and a=4, b=1, c =1. In such sub-example, $m_0=(a^*N_{ID}^{cell}+b^*I_t+c) \bmod N$ and $$m_1 = d \times \left\lfloor \frac{N_{ID}^{cell}}{N} \right\rfloor,$$

where a, b, c, d are constants, and a=4, b=1, c=0, D=1. For another sub-example, $m_0$ carries part of the cell ID information, and $m_1$ carries the timing information. In such sub-example, $m_0=(N_{ID}^{cell} \bmod N)$, and $m_1=a \times I_t$, where a is a constant, and $a=\lfloor N/N_t \rfloor$ (to maximize the cyclic shift) for example.

In yet another example, the information carried by WUS is cell ID (or part of cell ID) and UE group ID (or part of UE group ID). For one sub-example $m_0$ carries part of the cell ID information, and $m_1$ carries the remaining part of cell ID together with UE group ID. In such sub-example, $m_0=(N_{ID}^{cell} \bmod N)$, and $$m_1 = \left(a \times \left\lfloor \frac{N_{ID}^{cell}}{N} \right\rfloor + b \times N_{ID}^{UEgroup} + c\right) \bmod N,$$

where a, b, c are constants; and $a=N^{UEgroup}$, b=1, c=0 (to avoid conflict) for example. For one sub-example, $m_0$ carries part of the cell ID information, and $m_1$ carries UE group ID. In such sub-example, $m_0=(N_{ID}^{cell} \bmod N)$, and $m_1=a \times N_{ID}^{UEgroup}$, where a is a constant; $a=\lfloor N//N^{UEgroup} \rfloor$ (to maximize cyclic shift) for example.

In another example, the information carried by WUS is cell ID (or part of cell ID) and system update indicator, $I_s$ ($0 \le I_s < N_s$). For one sub-example, $m_0$ carries part of the cell ID information, and $m_1$ carries the remaining part of cell ID information together system update indicator. E.g. $m_0=(N_{ID}^{cell} \mod N)$, and $$m_1 = \left(a \times \left\lfloor \frac{N_{ID}^{cell}}{N} \right\rfloor + b \times I_s\right) \mod N,$$

where a, b are constants, and a=N, b=1, (to avoid conflict) for example. For another sub-example, $m_0$ carries part of the cell ID information, and $m_1$ carries the system update indicator. In such sub-example, $m_0=(N_{ID}^{cell} \mod N)$, and $m_1=a \times I_s$, where a is a constant, and $a=\lfloor N/N_s \rfloor$ (to maximize the cyclic shift) for example.

In yet another example, the information carried by WUS is cell ID (or part of cell ID) and UE group ID (or part of UE group ID) and timing info. For one sub-example, $m_0$ carries part of the cell ID information, and $m_1$ carries the remaining part of cell ID information together with timing information and UE group ID. In such example, $m_0=(N_{ID}^{cell} \mod N)$, and $$m_1 = \left(a \times \left\lfloor \frac{N_{ID}^{cell}}{N} \right\rfloor + b \times N_{ID}^{UEgroup} + c \times I_t\right) \mod N,$$

where a and b and c are constants, and $a=N^{UEgroup} \times N_t$, b=N_t, c=1 for example. In such sub-example, $m_0=(N_{ID}^{cell} \mod N)$, and $$m_1 = \left(a \times \left\lfloor \frac{N_{ID}^{cell}}{N} \right\rfloor + b \times N_{ID}^{UEgroup} + 1\right)(c \times I_t + 1) \mod N,$$

where a and b and c are constants; and $a=N^{UEgroup}$, b=1, c=1 for example.

For another sub-example, $m_0$ carries part of the cell ID information, and $m_1$ carries the timing information and UE group ID. In such sub-example, $m_0=(N_{ID}^{cell} \mod N)$, and $m_1=(a \times N_{ID}^{UEgroup}+b \times I_t) \mod N$, where a and b are constants, and $a=N_t$, b=1 for example.

For another sub-example, $m_0$ carries part of the cell ID information and timing information, and $m_i$ carries the remaining part of cell id and a UE group ID. In such sub-example, $m_0=(a*N_{ID}^{cell}+1)(b*I_t+1) \mod N$, and $$m_1 = \left(c \times \left\lfloor \frac{N_{ID}^{cell}}{N} \right\rfloor + d \times N_{ID}^{UEgroup}\right) \mod N,$$

where a, b, c, d are constants. In such sub-example, $m_0=(a*N_{ID}^{cell}+b*I_t+c) \mod N$, and $$m_1 = \left(d \times \left\lfloor \frac{N_{ID}^{cell}}{N} \right\rfloor + e \times N_{ID}^{UEgroup}\right) \mod N,$$

where a, b, c, d, e are constants.

In yet another example, the information carried by WUS is cell ID (or part of cell ID) and the timing and system information update indicator. For one sub-example, $m_0$ carries part of the cell ID information, and $m_1$ carries the remaining part of cell ID information together with timing information and system information update indicator. In such sub-example, $m_0=(N_{ID}^{cell} \mod N)$, and $$m_1 = \left(a \times \left\lfloor \frac{N_{ID}^{cell}}{63} \right\rfloor + b \times I_s + c \times I_t\right) \mod N,$$

where a and b and c are constants, and $a=N_s \times N_t$, b=N_t, c=1 for example. For another sub-example, $m_0$ carries part of the cell ID information, and $m_i$ carries the timing information and system update indicator. In such sub-example, $m_0=(N_{ID}^{cell} \mod N)$, and $m_1=(a \times I_s+b \times I_t) \mod N$, where a and b are constants, and $a=N_t$, b=1 for example.

Component XII.B: With cover code of M-sequence.

In this sub-component, a different M-sequence with length N, $x_{M2}(n)$. When N=63, the M-sequence can be from the construction schemes in TABLE 5, is adopted for generating the cover code. In particular, the cover code $c^{m_2}(n)$ is generated as $c^{m_2}(n)=x_{M2}((n+m_2) \mod N)$.

sym In one example, the cyclic shift, $m_2$, is determined by the symbol index, $I_t^{sym}$, according to $m_2=I_t^{sym}*a$.

In another example, the cyclic shift, $m_2$, is determined by both cell ID and time information, $I_t$. For one sub-example, $$m_2 = a*I_t + b \times \left\lfloor \frac{N_{ID}^{cell}}{c} \right\rfloor + d*\mod(N_{ID}^{cell}, e),$$

determined by both time information and cell ID, where a, b, c, d, e are constant integers, e.g. a=1, b=1, d=1, c=3, e=168. For another sub-example, $$m_2 = (a*I_t + 1)*\left(b \times \left\lfloor \frac{N_{ID}^{cell}}{c} \right\rfloor + d*\mod(N_{ID}^{cell}, e)\right),$$

determined by both time information and cell ID, where a, b, c, d, e are constant integers, e.g. a=1, b=1, d=1, c=3, e=168.

The WUS d(n) is constructed directly from the gold sequence scrambled with the cover code, according to $d(n)=(1-2 x_{M0}((n+m_0) \mod N))(1-2 x_{M1}((n+m_1) \mod N))(1-2c^{m_2}(n))$, n=0, ..., N−1.

When N=63, WUS d(n) is truncated by the center element d (31) and mapped into the center 62 REs within the 6 PRB of assigned narrowband (avoiding using the dc subcarrier in central bandwidth) In one example, $x_{M0}$ is generated from the primitive polynomial $x^6+x+1$, $x_{M1}$ is generated from the primitive polynomial $x^6+x^5+1$, and $x_{M2}$ is generated from the primitive polynomial $x^6+x^5+x^4+x+1$.

Similarly as Component XII.A, the mapping between cyclic shift pair $(m_0, m_1)$ in WUS can be utilized to carry information as needed.

Component XII.C: With Cover Code of Phase Shift.

In this sub-component, the mechanism of phase shift in frequency domain is adopted to generate time-varying WUS across symbols. In particular, the cover code $c^\theta f(n)$ is generated as $c^\theta f(n)=e^{-j2\pi\theta_f n}$, n=0, ..., N−1. In one example, $$\theta_f = \frac{I_t}{N_t}$$

is determined by time index, $I_t$, $(0 \le I_t < N_t)$, where $N_t$ is total number of timing indices. E.g $N_t$ can be 2 or 4 or 6 or 8, 11, 14. E.g. $I_t = I_t^{sym} \mod N_t$, where $I_t^{sym}$ is symbol index. In another example, $\theta_f$ is determined by both time information and cell ID. For one sub-example, $$\theta_f = \frac{1}{K} * \left( a*I_t + b \times \left\lfloor \frac{N_{ID}^{cell}}{c} \right\rfloor + d * \mod(N_{ID}^{cell}, e) \right) \mod K,$$

where a, b, c, d, e, K are constant integers. e.g. a=1, b=0, d=1, c=3, e=3. For another sub-example, $$\theta_f = \frac{1}{K} * \left( b \times \left\lfloor \frac{N_{ID}^{cell}}{c} \right\rfloor + a*I_t + d \right) \mod K$$

where a, b, c, d, K are constant integers. For yet another sub-example $$\theta_f = \frac{1}{K} * \left( \left( b \times \left\lfloor \frac{N_{ID}^{cell}}{c} \right\rfloor + 1 \right)(a*I_t + 1) \right) \mod K$$

where a, b, c, K are constant integers.

The WUS d(n) is constructed directly from the gold sequence scrambled with the cover code. When N=63, WUS d(n) is truncated at the center, the WUS is computed according to $$d(n) = \begin{cases} (1 - 2x_{M0}((n + m_0) \mod 63)) \\ (1 - 2x_{M1}((n + m_1) \mod 63))e^{-j2\pi\theta_f n}, n = 0, \ldots, 30, \\ (1 - 2x_{M0}((n + m_0 + 1) \mod 63)) \\ (1 - 2x_{M1}((n + m_1 + 1) \mod 63))e^{-j2\pi\theta_f(n+1)}, n = 31, \ldots 61 \end{cases}.$$

When no truncation is needed, WUS is computed as $d(n) = (1-2 x_{M0}((n+m_0) \mod 63))(1-2 x_{M1}((n+m_1) \mod 63))e^{-j2\pi\theta_f n}$, $n=0, \ldots, N-1$.

Similarly as Component XII.A, the mapping between cyclic shift pair $(m_0, m_1)$ in WUS can be utilized to carry information as needed.

Component XIII: ZC-Sequence based WUS.

In this component, a Zadoff-Chu (ZC) with length L is adopted as the base sequence as follows:

$$\tilde{s}(n) = e^{-j\frac{\pi u n(n+1)}{L}}, n = 0, \ldots, L-1$$

where different root, u, of the ZC-sequence can be utilized to represent the information carried by WUS.

Component XIII: With Short Base Sequence(s) with Cover Code of M-Sequence.

In this sub-component, a short ZC sequence with length of 63 (i.e., L=63), is adopted as base sequence, according to $$s(n) = e^{-j\frac{\pi u n(n+1)}{63}}, n = 0, \ldots, 62.$$

In addition, an M-sequence with length 63, $x_M(n)$, is adopted for generating the cover code. The M-sequence $x_M$ can be from the construction schemes in TABLE 5, with proper initial condition e.g. $x_M(0) = x_M(1) = x_M(2) = x_M(3) = x_M(4) = 0, x(5) = 0$, $x(6) = 1$, or $x_M(1) = x_M(2) = x_M(3) = x_M(4) = x_M(5) = 0$, $x_M(0) = 1$.

In particular, the cover code $c^m(n)$ is generated as $c^m(n) = x_M((n+m) \mod 63)$, $n=0, \ldots, 62$.

The WUS d (n) is constructed directly from base sequence scrambled with the cover code, according to $d(n) = s(n)(1-2 c^m(n))$, $n=0, \ldots, 62$, and truncated by the center element d(31) and mapped into the center 62 REs within the 6 PRB of assigned narrowband (avoiding using the dc subcarrier in central bandwidth).

The choice of root and cyclic shift pair (u, m) can be utilized to carry information as described in the aforementioned components.

In one example, the information carried by WUS is cell ID (i.e., $N_{ID}^{cell}$) or part of the cell ID. Then, the cell ID information can be separately carried by u, m. For one sub-example, $$u = b \times (N_{ID}^{cell} \mod a) + d, m = c \times \left\lfloor \frac{N_{ID}^{cell}}{a} \right\rfloor,$$

where a, b, c, d are predefined constants. In such sub-example, a=62, b=1, $$c = \left\lfloor \frac{63}{\lceil 504/62 \rceil} \right\rfloor$$

(to maximize the range of cyclic shifts).

In another example, the information carried by WUS is cell ID (or part of cell ID) and timing information. For one sub-example, u carries part of the cell ID information, and m carries the remaining part of cell ID information together with timing information. In such sub-example, $u=(N_{ID}^{cell} \mod c)+d$, and $$m = \left( a \times \left\lfloor \frac{N_{ID}^{cell}}{63} \right\rfloor + b \times I_t \right) \mod 63,$$

where a, b, c, d are constant integers, c=L−1, d=1, for example. In such sub-example, $u=(N_{ID}^{cell} \mod c)+d$, and $$m = \left( \left( a \times \left\lfloor \frac{N_{ID}^{cell}}{63} \right\rfloor + 1 \right)(b \times I_t + 1) \right) \mod 63,$$

where a, b, c, d are constant integers, c=L−1, d=1, for example.

For another sub-example, u carries part of the cell ID information, and m carries the timing information. In such sub-example, $u=(N_{ID}^{cell} \mod b)+c$, and $m=a \times I_t$, where a, b, c are constant integers; and $a=\lfloor 63/N_t \rfloor$, where $N_t$ is total size of timing information (to maximize the cyclic shift) for example, and c=L−1, d=1, for example.

In yet another example, the information carried by WUS is cell ID (or part of cell ID) and UE group ID (or part of UE group ID). For one sub-example u carries part of the cell ID information, and m carries the remaining part of cell ID together with UE group ID. In such sub-example, $u=(N_{ID}^{cell} \mod c)+d$, and $$m = \left( a \times \left\lfloor \frac{N_{ID}^{cell}}{63} \right\rfloor + b \times N_{ID}^{UEgroup} \right) \mod 63,$$

where a, b, c, d are constant integers, and a=$N^{UEgroup}$, b=1 (to avoid conflict) for example, and c=L−1, d=1, for example.

For one sub-example, u carries part of the cell ID information, and m carries UE group ID. In such sub-example u=($N_{ID}^{cell}$ mod c)+d, and m=a×$N_{ID}^{UEgroup}$, where a, c, d are constant integers, a=$\lfloor 63/N^{UEgroup} \rfloor$ (to maximize cyclic shift) for example, and c=L−1, d=1, for example.

In yet another example, the information carried by WUS is cell ID (or part of cell ID) and UE group ID (or part of UE group ID) and timing information. For one sub-example, u carries part of the cell ID information, and m carries the remaining part of cell ID information together with timing information and UE group ID. In such sub-example, u=($N_{ID}^{cell}$ mod d)+f, and $$m = \left(a \times \left\lfloor \frac{N_{ID}^{cell}}{63} \right\rfloor + b \times N_{ID}^{UEgroup} + c \times I_t\right) \bmod 63,$$

where a, b, c, d, f are constant integers, and a=$N^{UEgroup} \times N_t$, b=$N\_t$, c=1 for example, and d=L−1, f=1, for example. In such sub-example, u=($N_{ID}^{cell}$ mod d)+f, and $$m = \left(\left(a \times \left\lfloor \frac{N_{ID}^{cell}}{63} \right\rfloor + b \times N_{ID}^{UEgroup} + 1\right)(c \times I_t + 1)\right) \bmod 63,$$

where a, b, c, d, f are constant integers, and a=$N^{UEgroup} \times N_t$, b=$N\_t$, c=1 for example, and d=L−1, f=1, for example.

For another sub-example, u carries part of the cell ID information, and m carries the timing information and UE group ID. In such sub-example, u=($N_{ID}^{cell}$ mod c)+d, and m=(a×$N_{ID}^{UEgroup}$+b×$I_t$)mod 63, where a, b are constants, and a=$N_t$, b=1 for example. In such sub-example, u=($N_{ID}^{cell}$ mod c)+d, and m=((a×$N_{ID}^{UEgroup}$+1)(b×$I_t$+1))mod 63, where a, b are constants, and a=$N_t$, b=1 for example, and c=L−1, d=1, for example.

Component XIII B With Short Base Sequence(s) and Cover Code of Phase Shift.

In this sub-component, a short ZC sequence with length of 63 is adopted as base sequence, according to $$s(n) = e^{-j\frac{\pi un(n+1)}{63}}, n = 0, \ldots, 62.$$

In addition, a phase rotation in frequency domain is adopted to generate time-varying WUS across symbols. In particular, the cover code $c^\theta f(n)$ is generated as $c^\theta f(n) = e^{-j2\pi\theta_f n}$, n=0, . . . , 62, wherein, the phase rotation, $$\theta_f = \frac{I_t}{N_t},$$

is determined by time index, $I_t$, (0≤$I_t$<$N_t$), where $N_t$ is total number of timing indices and can be 2 or 4 or 6 or 8. E.g. $I_t = I_t^{sym} \bmod N_t$, where $I_t^{sym}$ is symbol index.

The WUS d(n) is constructed directly from the ZC sequence scrambled with the cover code, according to $$d(n) = \begin{cases} e^{-j\frac{\pi un(n+1)}{63}} e^{-j2\pi\theta_f n}, & n = 0, \ldots, 30, \\ e^{-j\frac{\pi u(n+1)(n+2)}{63}} e^{-j2\pi\theta_f (n+1)}, & n = 31, \ldots, 61. \end{cases}$$

The choice of root can be utilized to carry information other than time. In one example, the information carried by WUS is part of the cell ID. For one sub-example, $$u = c \times \left(\left\lfloor \frac{N_{ID}^{cell}}{b} \right\rfloor \bmod a\right),$$

where a, b, c are predefined constants. In such sub-example, a=63, b=168, c=1.

In another example, the information carried by WUS is part of cell ID and UE group ID (or part of UE group ID). In such example, $$u = \left(a \times \left\lfloor \frac{N_{ID}^{cell}}{b} \right\rfloor + c \times N_{ID}^{UEgroup}\right) \bmod 63,$$

where a, b, c are constants, and a=$N^{UEgroup}$, b=168, c=1 (to avoid conflict) for example.

Component XIII.C: With short base sequence(s) and cover code of Gold sequence. In this sub-component, a short ZC sequence with length of 63 is adopted as base sequence, according to $$s(n) = e^{-j\frac{\pi un(n+1)}{63}}, n = 0, \ldots, 62.$$

In one example, the information carried by root is part of cell ID. In such example, $$u = b \times \left(\left\lfloor \frac{N_{ID}^{cell}}{c} \right\rfloor \bmod a\right) + d,$$

where a, b, c are constants, and a=62, c=168, b=1, d=1 for example.

In addition, a cover code c(n), can be constructed from BPSK modulated length-63 Gold-sequence (i.e., XOR of two M-sequences), wherein c(n)=(1−2 $x_{M0}$(n))(1−2 $x_{M1}$(n)), 0≤n≤62. Each M-sequence $x_M$(i.e., M=$M_0$ or M=$M_1$) with length 63 can be from the construction schemes in TABLE 5, with some proper initial condition e.g. $x_M$(0)=$x_M$(1)=$x_M$(2)=$x_M$(3)=$x_M$(4)=0,x(5)=0,x(6)=1, or $x_M$(1)=$x_M$(2)=$x_M$(3)=$x_M$(4)=$x_M$(5)=0, $x_M$(0)=1. In one example, $x_{M0}$ is generated from the primitive polynomial $x^6+x+1$, while $x_{M1}$ is generated from the primitive polynomial $x^6+x^5+1$.

The WUS d(n) is constructed directly from the ZC sequence scrambled with the cover code, according to $$d(n) = \begin{cases} e^{-j\frac{\pi un(n+1)}{63}}(1-2x_{M0}((n+m_0)\bmod 63)) & n = 0, \ldots, 30, \\ (1-2x_{M1}((n+m_1)\bmod 63)), & \\ e^{-j\frac{\pi u(n+1)(n+2)}{63}}(1-2x_{M0}((n+1+m_0)\bmod 63)) & n = 31, \ldots, 61. \\ (1-2x_{M1}((n+1+m_1)\bmod 63)), & \end{cases}$$

Similarly Component XII.A, the information carried by WUS can be determined by the combination of cyclic shift pair ($m_0$, $m_1$), where $m_0$ and $m_1$ are two cyclic shifts applied to the two M-sequences generating the Gold-sequence, respectively.

Component XIII D With short base sequence(s) and cover code of PN sequence

In this sub-component, a short ZC sequence with length of L (e.g. L=63) is adopted as base sequence, according to $$s(n) = e^{-j\frac{\pi un(n+1)}{L}}, n = 0, \ldots, L-1.$$

In one example, the information carried by root is part of cell ID. In such example, $$u = b \times \left(\left\lfloor \frac{N_{ID}^{cell}}{b} \right\rfloor \bmod a\right) + d,$$

where a, b, c, c are constants, and a=62, c=168, b=1, d=1 for example.

In addition, a LTE PN sequence with length $2^{31}-1$ is adopted as cover code. The PN sequence is constructed by XOR of two M-sequences, wherein one M-sequence $s_A$ is given by generator polynomial as $g_A(x)=x^{31}+x^3+1$ with initial condition $c_A$ fixed (e.g. $c_A=1$), and the other M-sequence $s_A(n)$ is given by generator polynomial as $g_B(x)=x^{31}+x^3+x^2+x+1$ with initial condition $c_B$, wherein $c_B$ carries the information in WUS.

In one sub-embodiment, cover code is constructed by BPSK modulated PN sequence, according to $c(n)=1-2*((s_A(n+Nc)+s_B(n+Nc)) \bmod 2)$, where Nc is a fixed shift offset (e.g. Nc=1600), and $0 \le n \le N$, and N is the number of REs for WUS (e.g. could be long to be mapped across symbols/subframes and avoiding using the REs for CRS).

In another sub-embodiment, cover code is constructed by QPSK modulated PN sequence, according to $c(n)=(1-2*((s_A(2n+Nc)+s_B(2n+Nc)) \bmod 2))/\sqrt{2}+j*(1-2*((s_A(2n+Nc+1)+s_B(2n+Nc+1)) \bmod 2))/\sqrt{2}$ where Nc is a fixed shift offset (e.g. Nc=1600), and $0 \le n \le N$, and N is the number of REs for WUS (e.g. could be long to be mapped across symbols/subframes and avoiding using the REs for CRS).

If both ID (cell ID and/or UE group ID) and time info (e.g. symbol index and/or subframe index) are carried by $c_B$, $c_B$ may be in a form containing a product term of ID and time info. For example, $c_B=c1*(I\_ID+1)*(I\_1t+1)+c2*(I\_ID+1)+c3*(I\_1t+1)$, where c1, c2, c3 are predefined constants, and I_ID denotes the ID, and I_t denotes the time info.

The WUS d(n) is constructed directly from the ZC sequence scrambled with the cover code, according to d(n)=s(n)c(n), n=0, . . . , L-1.

Component XIII E With long base sequence mapped across symbols.

In this sub-component, a long ZC sequence in length of L (L is approximately 62*K+1, K>=1) is adopted to construct WUS with K symbols. The WUS is constructed by directly mapping the long ZC in a frequency first and time second according to $$d_i(n) = \begin{cases} e^{-j\frac{\pi un'(n'+1)}{L-1}}, & n = 0, 1, \ldots, 30 \\ e^{-j\frac{\pi u(n'+1)(n'+2)}{L-1}}, & n = 31, \ldots, 61 \end{cases},$$

$$n' = 62 \times i + n, i = 0, \ldots, K-1.$$

The root u can be utilized to carry information in addition to symbol index. In one example, the information carried by WUS is cell ID (i.e., $N_{ID}^{cell}$) or part of the cell ID. For one sub-example, $u = a \times N_{ID}^{cell} \bmod (L-1)+b$, where a, b are predefined constants.

In another example, the information carried by WUS is cell ID (or part of cell ID) and timing information ($0 \le I_t < N_t$). E.g. $I_t$=subframe index mod $N_t$, where $N_t$ is total number of timing indices. E.g $I_t$ can be 2 or 4 or 6 or 8 or 10. For one sub-example, u carries cell ID information, and timing information. In such sub-example, $u=(floor(N_{ID}^{cell}/a)+b \times I_t) \bmod (L-1)+c$, where a, b, c, d are constant integers. In such sub-example, $u=(N_{ID}^{cell} \bmod a+b \times I_t) \bmod (L-1)+c$, where a, b, c are constant integers. In such sub-example, $u=((N_{ID}^{cell} \bmod a)*d+1)(b \times I_t+1) \bmod (L-1)+c$, where a, b, c, d are constant integers. In such sub-example, $$u = \left(\frac{floor\ (N_{ID}^{cell})}{a}\right)*d + 1)(b \times I_t + 1)\bmod(L - 1) + c,$$

where a, b, c, d are constant integers.

In yet another example, the information carried by WUS is cell ID (or part of cell ID) and UE group ID (or part of UE group ID). For one sub-example u carries part of the cell ID information and the remaining part of cell ID together with UE group ID. In such sub-example, $u=(N_{ID}^{cell}+a \times N_{ID}^{UEgroup}) \bmod (L-1)+b$, where a, b are constant integers. For one sub-example, u carries part of the cell ID information, and UE group ID. In such sub-example $u=(N_{ID}^{cell} \bmod a+b \times N_{ID}^{UEgroup}) \bmod (L-1)+c$ where a, b, c are constants, and a=127, b=1, c=1 for example.

In yet another example, the information carried by WUS is cell ID (or part of cell ID) and UE group ID (or part of UE group ID) and timing information. For one sub-example, u carries part of the cell ID information, and the remaining part of cell ID information together with timing information and UE group ID. In such sub-example u= $(N_{ID}^{cell}+a \times N_{ID}^{UEgroup}+b \times I_t) \bmod (L-1)+c$, where a, b, c are constants, and a=N_t, b=1, c=1, for example. In such sub-example, $u=(N_{ID}^{cell}+a \times N_{ID}^{UEgroup}+1)(b \times I_t+1) \bmod (L-1)+c$, where a, b, c are constants, and a=N_t, b=1, c=1, for example.

For another sub-example, u carries part of the cell ID information, and the timing information and UE group ID. In such sub-example, $u=(e*N_{ID}^{cell} \bmod a+b \times N_{ID}^{UEgroup}+c \times I_t) \bmod (L-1)+d$, where a, b, c, d, e are constants, and a=127, b=1, c=1, d=1, e=1 for example. In such sub-example, $u=(e*N_{ID}^{cell} \mod a+b\times N_{ID}^{UEgroup}+1)(c\times I_t+1) \mod (L-1)+d$, where a, b, c, d, e are constants, and a=127, b=1, c=1, d=1, e=1 for example. In such sub-example, $$u = \left(e * \text{floor}\left(\frac{N_{ID}^{cell}}{a}\right) + b \times N_{ID}^{UEgroup} + 1\right)(c \times I_t + 1) \mod (L-1) + d,$$

where a, b, c, d, e are constants, and a=127, b=1, c=1, d=1, e=1 for example.

Component XIV: PN-Sequence based WUS.

In this component, a LTE PN sequence with length $2^{31}-1$ is adopted as the base sequence. The PN sequence is constructed by XOR of two M-sequences, wherein one M-sequence $s_A$ is given by generator polynomial as $g_A(x)=x^{31}+x^3+1$ with initial condition $c_A$ fixed (e.g. $c_A=1$), and the other M-sequence $s_B(n)$ is given by generator polynomial as $g_B(x)=x^{31}+x^3+x^2+x+1$ with initial condition $c_B$, wherein $c_B$ carries the information in WUS.

In one sub-embodiment, WUS signal is constructed by BPSK modulated PN sequence, according to $d(n)=1-2*((s_A(n+Nc)+s_B(n+Nc)) \mod 2)$, where Nc is a fixed shift offset (e.g. Nc=1600), and 0≤n≤N, and N is the number of REs for WUS (e.g. could be long to be mapped across symbols/subframes and avoiding using the REs for CRS).

In another sub-embodiment, WUS signal is constructed by QPSK modulated PN sequence, according to $d(n)=(1-2*((s_A(2n+Nc)+s_B(2n+Nc)) \mod 2))/\sqrt{2}+j*(1-2*((s_A(2n+Nc+1)+s_B(2n+Nc+1)) \mod 2))/\sqrt{2}$ where Nc is a fixed shift offset (e.g. Nc=1600), and 0≤n≤N, and N is the number of REs for WUS (e.g. could be long to be mapped across symbols/subframes and avoiding using the REs for CRS).

If both ID (cell ID and/or UE group ID) and time info (e.g. symbol index and/or subframe index) are carried by $c_B$, $c_B$ may be in a form containing a product term of ID and time info. For example, $c_B=c1*(I\_ID+1)*(I\_t+1)+c2*(I\_ID+1)+c3*(I\_t+1)$, where I_ID denotes the ID, and I_t denotes the time info.

Component XV: Relation to Re-Synchronization/Enhanced Synchronization Sequence.

The reliable synchronization performance is also essential for UE working in eDRX or PSM. In idle mode paging, the UE wakes up from a duration of sleep according to the DRX cycle. Because of clock drift and long DRX cycle, the synchronization error could become very large when UE wakes up at the pre-configured PO. This would dramatically degrade UE's decoding performance of the subsequent MPDCCH/PDSCH. A periodic synchronization signal would help in this scenario.

Therefore, a re-synchronization signals or enhanced synchronization sequence used for initial access could also be modified with the following feature: At least one configuration for the periodicity of re-synchronization signals is based on the DRX cycle, serving for idle mode paging. At least one configuration for the periodicity of re-synchronization signals is based on the DRX cycle, serving for idle mode paging.

Component XVI: Performance Enhancement.

One and multiple schemes as defined in below can be adopted to improve the WUS detection performance. In one embodiment, power boosting can be adopted to enhance detection performance. When the WUS sequence is not mapped to all the REs of the narrowband (e.g. 6 PRBs), power boosting can be considered to improve the detection performance. For example, when WUS sequence is only mapped to the N_RE^WUS REs within the 72 REs, a power boosting factor of $(72/N\_RE^{\wedge}WUS)^{\wedge}0.5$ can be performed to the REs containing WUS sequence.

In another embodiment, repetition can be adopted to enhance the detection performance. WUS can support sequence repetition/extension. In yet another embodiment, TX diversity is transparent to UE.

Figure 12:
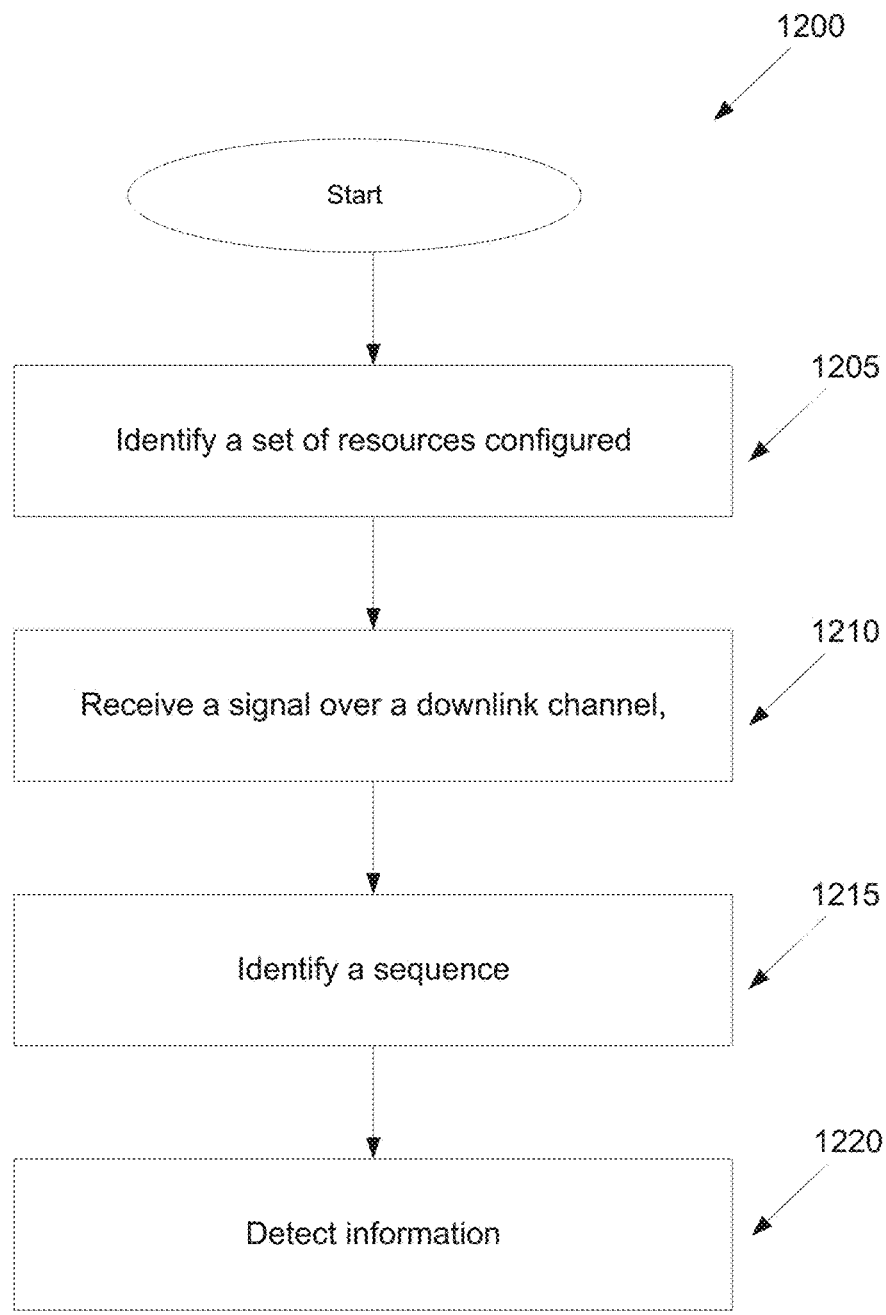
FIG. 12 illustrates a flow chart of a method for beam management according to embodiments of the present disclosure.

FIG. 12 illustrates a flow chart of a method 1200 for beam management according to embodiments of the present disclosure, as performed by a user equipment (e.g., 111-116 as illustrated in FIG. 1). The embodiment of the method 1200 illustrated in FIG. 12 is for illustration only. FIG. 12 does not limit the scope of this disclosure to any particular implementation.

As illustrated in FIG. 12, the method 1200 begins at step 1205. In step 1205, 1, a UE identifies a set of resources configured for the UE based on a physical cell identifier (PCID). In this step 1205, the identified set of resources is one of a first set of resources configured for a first type of UE or a second set of resources configured for a second type of UE, and the UE is one of the first type of UE or the second type of UE.

In one embodiment, in step 1205, a first configuration of the first set of resources comprises a first periodicity of the first signal associated with a configuration of a discontinuous reception (DRX) cycle of a paging operation for the first type of UE. In another embodiment, in step 1205, a second configuration of the second set of resources comprises a second periodicity of the second signal associated with a configuration of a DRX cycle of a paging operation for the second type of UE.

In such embodiments, the first sequence is generated for at least one first subframe within the first periodicity and the second sequence is generated for at least one second subframe within the second periodicity. In such embodiments, resource elements (REs) within each of the at least one first subframe and the second subframe are mapped to the first signal and the second signal, respectively, excluding mapping for a physical downlink control channel (PDCCH) or cell-specific reference signal (CRS).

In such embodiments, the first sequence and the second sequence are determined based on a length-131 ZC-sequence scrambled by a cover code, respectively, and a root of the length-131 ZC-sequence is determined based on the PCID and given by $u=(N_{ID}^{Ncell} \mod 126)+3$ where $N_{ID}^{cell}$ is the PCID.

In such embodiments, the cover code is determined based on a pseudo-noise (PN) sequence. In such embodiments, an initial condition of the PN sequence comprises a product item of the PCID, and time information of a paging occasion (PO) within a DRX cycle with which the first signal and the second signal are associated. In such embodiments, the initial condition of the PN sequence is given by $c_{init}=a \cdot (N_{ID}^{Ncell}+1) \cdot (I_t+1)+b \cdot N_{ID}^{Ncell}$ where $I_t$ is information included in the first set of resources and the second set of resources, and a and b are constant integers.

In such embodiments, the first set of resources comprises at least one resource block (RB) and the second set of resources comprises at least two consecutive RBs, the second sequence being repeated in the at least two consecutive RBs.

In such embodiments, the first sequence is identical to the second sequence when the first type of UE and the second type of UE are configured with same information including the PCID. In such embodiments, the first set of resources and the second set of resources comprise at least same configured transmission duration and a time information of a PO within the DRX cycle with which the first signal and the second signal are associated, respectively.

In step 1210, the UE receives a signal over a downlink channel.

In step 1215, the UE identifies a sequence based on the identified set of resources and the PCID.

In step 1220, the UE detects information carried by the received signal based on the identified sequence. In step 1220, the identified sequence is one of a first sequence generated based on the first set of resources and the PCID, or a second sequence generated based on the second set of resources and the PCID.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
a processor configured to identify at least one set of resources configured for the UE; and
a transceiver operably connected to the processor, the transceiver configured to receive a signal over a downlink channel,
wherein the processor is further configured to identify a sequence from the received signal based on the identified set of resources, wherein when the signal is a wakeup signal (WUS) associated with a paging occasion (PO), the identified sequence is a WUS sequence (w(m)) with a length of 132, where m=0, . . . , 131 and w(m) is a product of three components and given by w(m)=c1(n')·c2(n)·c3(m), and wherein:
c1(n') is a scrambling sequence constructed from a pseudo-noise (PN) sequence with an initial condition that includes at least a nonlinear term such that $a*(N_{ID}^{Ncell}+1)(I_t+1)$, where $N_{ID}^{Ncell}$ an identity of a cell, $I_t$ is determined based on a frame index and a slot index of the PO, and a is a predetermined constant,
c2(n) is derived from a length-131 ZC-sequence, where $$c2(n) = e^{-\frac{\pi\mu n(n+1)}{131}},$$

n=m mod 131, μ is a root of the length-131 ZC-sequence, and
c3(m)=$e^{2\pi\theta m}$, where θ is a constant.

2. The UE of claim 1, wherein the processor is further configured to:
determine whether or not a UE group identifier (ID) for the WUS is received,
identify that the initial condition of the scrambling sequence is based on an identity of a cell, timing information of the PO, and the UE group ID when the UE group ID is received, and
identify that the initial condition of the scrambling sequence is based on the identity of the cell and the timing information of the PO when the UE group ID is not received.

3. The UE of claim 1, wherein:
the transceiver is further configured to receive a UE group ID for the WUS; and
the processor is further configured to identify that the constant, θ, is based on the UE group ID, $N_{ID}^{UEgroup}$ such that θ=c*($N_{ID}^{UEgroup}$+1), where c is a predetermined constant.

4. The UE of claim 3, wherein:
the root is determined based on a cell identity and given by u=($N_{ID}^{Ncell}$ mod 126)+3, where $N_{ID}^{Ncell}$ the cell identity.

5. The UE of claim 1, wherein the WUS is mapped into configured resource elements (REs) excluding REs for a physical downlink control channel (PDCCH) or cell-specific reference signal (CRS) in order of frequency and time.

6. The UE of claim 1, wherein:
when the UE is configured for narrowband Internet of Things (NB-IoT), the WUS comprises one resource block (RB); and
when the UE is configured for Machine Type Communication (MTC), the WUS comprises at least two consecutive RBs, the WUS being repeated in the at least two consecutive RBs.

7. The UE of claim 6, wherein:
when the UE is configured for the MTC, the transceiver is configured to receive a resynchronization signal (RSS) constructed from a PN sequence with quadrature phase shift keying (QPSK) modulation, and an initial condition of the PN sequence is based on an identity of a cell, and
the RSS is mapped into configured REs in one or more subframes, excluding REs from first three symbols of the one or more subframes.

8. A base station (BS) in a wireless communication system, the BS comprising:
a processor configured to:
identify at least one set of resources for a user equipment (UE);
generate a wakeup signal (WUS) sequence (w(m)) based on the identified set of resources, wherein:
the WUS sequence (w(m)) is a sequence with a length of 132, where m=0, . . . , 131 and w(m) is a product of three components and given by w(m)=c1(n')·c2(n)·c3(m),
c1(n') is a scrambling sequence constructed from a pseudo-noise (PN) sequence with an initial condition that includes at least a nonlinear term such that $a*(N_{ID}^{Ncell}+1)(I_t+1)$, where $N_{ID}^{Ncell}$ is an identity of a cell, $I_t$ is determined based on a frame index and a slot index of a paging occasion (PO), and a is a predetermined constant,
c2(n) is derived from a length-131 ZC-sequence, where $$e^{-\frac{\pi\mu n(n+1)}{131}},$$

n=m mod 131, µ is a root of the length-131 ZC-sequence, and c3(m)=$e^{2\pi\theta m}$, where θ is a constant; and generate, using the WUS sequence, a WUS to be transmitted to the UE in the at least one set of resources, wherein the WUS is associated with the PO; and a transceiver operably connected to the processor, the transceiver configured to transmit, to the UE, the WUS over a downlink channel.

9. The BS of claim 8, wherein:

the processor is further configured to determine whether or not to transmit a UE group identifier (ID) for the WUS, the initial condition of the scrambling sequence is indicated based on an identity of a cell, timing information of the PO, and UE group ID when the UE group ID is transmitted, and the initial condition of the scrambling sequence is indicated based on the identity of the cell and the timing information of the PO when the UE group ID is not transmitted.

10. The BS of claim 8, wherein:

the transceiver is further configured to transmit a UE group ID for the WUS; and the constant, θ, is based on the UE group ID, $N_{ID}^{UEgroup}$ such that θ=$c*(N_{ID}^{UEgroup}+1)$, where c is a predetermined constant.

11. The BS of claim 10, wherein:

the root is determined based on a cell identity and given by u=$(N_{ID}^{Ncell}$ mod 126)+3 where $N_{ID}^{Ncell}$ the cell identity.

12. The BS of claim 8, wherein the WUS is mapped into configured resource elements (REs) excluding REs for a physical downlink control channel (PDCCH) or cell-specific reference signal (CRS) in order of frequency and time.

13. The BS of claim 8, wherein:

when the UE is configured for narrowband Internet of Things (NB-IoT), the WUS comprises one resource block (RB); and when the UE is configured for Machine Type Communication (MTC), the WUS comprises at least two consecutive RBs, the WUS being repeated in the at least two consecutive RBs.

14. The BS of claim 13, wherein:

when the UE is configured for the MTC, the transceiver is configured to transmit a resynchronization signal (RSS) constructed from a PN sequence with quadrature phase shift keying (QPSK) modulation, and an initial condition of the PN sequence is based on an identity of a cell, the RSS is mapped into configured REs in one or more subframes, excluding REs from first three symbols of the one or more subframes.

15. A method of operating a user equipment (UE) in a wireless communication system, the method comprising:

identifying at least one set of resources configured for the UE;

receiving a signal on a downlink channel; and identifying a sequence from the received signal based on the identified set of resources, wherein when the signal is a wakeup signal (WUS) associated with a paging occasion (PO), the identified sequence is a WUS sequence (w(m)) with a length of 132, where m=0, . . . , 131 and w(m) is a product of three components and given by w(m)=c1(n')·c2 (n)·c3 (m) and wherein:

c1(n') is a scrambling sequence constructed from a pseudo-noise (PN) sequence with an initial condition that includes at least a nonlinear term such that $a*(N_{ID}^{Ncell}+1)(I_t+1)$, where $N_{ID}^{Ncell}$ an identity of a cell, $I_t$ is determined based on a frame index and a slot index of the PO, and a is a predetermined constant, c2(n) is derived from a length-131 ZC-sequence, where $$c2(n) = e^{-\frac{\pi\mu n(n+1)}{131}},$$

n=m mod 131, µ s a root of the length-131 ZC-sequence, and c3(m)=$e^{2\pi\theta m}$, where θ is a constant.

16. The method of claim 15, further comprising:

determining whether a UE group identifier (ID) for the WUS is received;

identifying that the initial condition of the scrambling sequence is based on an identity of a cell, timing information of the PO, and the UE group ID based on a determination that the UE group ID for the WUS is received; and identifying that the initial condition of the scrambling sequence is based on the identity of the cell and the timing information of the PO based on a determination that the UE group ID for the WUS is not received.

17. The method of claim 15, further comprising:

receiving a UE group ID for the WUS; and identifying that the constant, θ, is based on the UE group ID, $N_{ID}^{UEgroup}$ such that θ=$c*(N_{ID}^{UEgroup}+1)$, where c is a predetermined constant.

18. The method of claim 17, wherein:

the root is determined based on a cell identity and given by u=$(N_{ID}^{Ncell}$ mod 126)+3 where $N_{ID}^{Ncell}$ is the cell identity; and the WUS is mapped into configured resource elements (REs) excluding REs for a physical downlink control channel (PDCCH) or cell-specific reference signal (CRS) in order of frequency and time.

19. The method of claim 15, wherein:

when the UE is configured for narrowband Internet of Things (NB-IoT), the WUS comprises one resource block (RB); and when the UE is configured for Machine Type Communication (MTC), the WUS comprises at least two consecutive RBs, the WUS being repeated in the at least two consecutive RBs.

20. The method of claim 19, further comprising, when the UE is configured for the MTC, receiving a resynchronization signal (RSS) constructed from a PN sequence with quadrature phase shift keying (QPSK) modulation, and an initial condition of the PN sequence is based on an identity of a cell, and the RSS is mapped into configured REs in one or more subframes, excluding REs from first three symbols of the one or more subframes.

* * * * *